(12) United States Patent
Gao et al.

(10) Patent No.: US 12,331,000 B2
(45) Date of Patent: Jun. 17, 2025

(54) SYSTEM AND METHOD FOR AUTOMATICALLY GENERATING ORGANIC COMPOST FROM WASTE

(71) Applicant: VCycene Inc., Markham (CA)

(72) Inventors: Huayi Gao, Markham (CA); Xiangdong Yin, King (CA); Janusz Wielgosz, Toronto (CA); Ming Lam Timothy To, Scarborough (CA)

(73) Assignee: VCycene Inc., Markham (CA)

( * ) Notice: Subject to any disclaimer, the term of this patent is extended or adjusted under 35 U.S.C. 154(b) by 0 days.

(21) Appl. No.: 18/902,756

(22) Filed: Sep. 30, 2024

(65) Prior Publication Data

US 2025/0019317 A1 Jan. 16, 2025

Related U.S. Application Data

(63) Continuation of application No. PCT/CA2023/051760, filed on Dec. 22, 2023.
(Continued)

(51) Int. Cl.
*C05F 17/957* (2020.01)
*C05F 9/02* (2006.01)
(Continued)

(52) U.S. Cl.
CPC .............. *C05F 17/957* (2020.01); *C05F 9/02* (2013.01); *C05F 9/04* (2013.01); *C05F 17/15* (2020.01);
(Continued)

(58) Field of Classification Search
IPC ..................... C05F 17/957,17/60, 17/70, 17/15, C05F 17/80, 17/986, 17/964, 17/993, 17/979,
(Continued)

(56) References Cited

U.S. PATENT DOCUMENTS 4,499,614 A 2/1985 Yeagley
5,766,935 A 6/1998 Seagren
(Continued)

FOREIGN PATENT DOCUMENTS

CA 2913379 C 10/2017
CA 3228837 A1 2/2023
(Continued)

OTHER PUBLICATIONS

International Search Report and Written Opinion mailed Mar. 11, 2024 in International Patent Application No. PCT/CA2023/051760 (9 pages).

*Primary Examiner* — Michael L Hobbs
*Assistant Examiner* — Lenora A Abel
(74) *Attorney, Agent, or Firm* — SMART & BIGGAR LP; Tonino Rosario Orsi; Shaivi Bhatt

(57) ABSTRACT

Various embodiments are described herein for an apparatus that implements one or methods for producing compost. The method may include receiving waste in a composting apparatus, the waste having a first moisture content; pre-treating the waste to produce pre-treated waste; storing the pre-treated waste into a storage chamber for a pretreatment time period to produce stored waste; and composting the stored waste in a compost chamber to produce a batch of output compost having a second moisture content, wherein the second moisture content is less than the first moisture content.

27 Claims, 56 Drawing Sheets

Related U.S. Application Data

(60) Provisional application No. 63/463,313, filed on May 2, 2023, provisional application No. 63/434,630, filed on Dec. 22, 2022.

(51) Int. Cl.

| | | |
|---|---|---|
| *C05F 9/04* | (2006.01) | |
| *C05F 17/10* | (2020.01) | |
| *C05F 17/60* | (2020.01) | |
| *C05F 17/70* | (2020.01) | |
| *C05F 17/80* | (2020.01) | |
| *C05F 17/95* | (2020.01) | |
| *C05F 17/964* | (2020.01) | |
| *C05F 17/979* | (2020.01) | |
| *C05F 17/986* | (2020.01) | |
| *C05F 17/993* | (2020.01) | |

(52) U.S. Cl.
CPC .............. *C05F 17/60* (2020.01); *C05F 17/70* (2020.01); *C05F 17/80* (2020.01); *C05F 17/95* (2020.01); *C05F 17/964* (2020.01); *C05F 17/979* (2020.01); *C05F 17/986* (2020.01); *C05F 17/993* (2020.01)

(58) Field of Classification Search
IPC .................................................. 17/95
See application file for complete search history.

(56) References Cited

U.S. PATENT DOCUMENTS

| | | | |
|---|---|---|---|
| 5,925,321 | A | 7/1999 | Koyamoto |
| 6,284,528 | B1 | 9/2001 | Wright |
| 6,569,673 | B1 | 5/2003 | Nakagawa |
| 7,632,164 | B2 | 12/2009 | Sakai |
| 8,129,177 | B2 | 3/2012 | Cohn |
| 9,308,535 | B2 | 4/2016 | Delgado |
| 10,226,546 | B2 | 3/2019 | Leonaggeo |
| 10,501,381 | B2 | 12/2019 | Buzruk |
| 10,590,046 | B2 | 3/2020 | Buzruk |
| 10,611,699 | B2 | 4/2020 | Halbleib |
| 10,617,783 | B2 | 4/2020 | Leonaggeo |
| 10,759,717 | B2 | 9/2020 | Stearns |
| 10,822,289 | B2 | 11/2020 | Buzruk |
| 10,835,854 | B2 | 11/2020 | Münster-Swendsen |
| 10,898,604 | B2 | 1/2021 | Benedek |
| 10,906,847 | B2 | 2/2021 | Buzruk |
| 11,241,694 | B2 | 2/2022 | Crepeau |
| 11,583,801 | B2 | 2/2023 | Naito |
| 11,667,589 | B2 | 6/2023 | Buzruk |
| 11,680,025 | B2 | 6/2023 | Rogers |
| 2002/0158011 | A1 | 10/2002 | Yamada |
| 2004/0127355 | A1 | 7/2004 | Manu |
| 2013/0157346 | A1* | 6/2013 | Kerouac .............. C05F 17/70 435/267 |
| 2015/0040625 | A1 | 2/2015 | Devine |
| 2022/0001389 | A1 | 1/2022 | Maxwell |
| 2022/0242799 | A1 | 8/2022 | Ying |
| 2022/0362701 | A1 | 11/2022 | Chirayath |
| 2022/0381756 | A1 | 12/2022 | Baxter |
| 2023/0065538 | A1 | 3/2023 | Lee |
| 2023/0081656 | A1 | 3/2023 | Rogers |
| 2023/0081670 | A1 | 3/2023 | Rogers |
| 2023/0083105 | A1 | 3/2023 | Rogers |
| 2023/0083366 | A1 | 3/2023 | Rogers |
| 2023/0084646 | A1 | 3/2023 | Rogers |
| 2023/0201768 | A1 | 6/2023 | Moon |
| 2023/0233726 | A1 | 7/2023 | Rosenørn |
| 2023/0242853 | A1 | 8/2023 | Ukai |
| 2023/0265022 | A1 | 8/2023 | Rogers |
| 2023/0271894 | A1 | 8/2023 | Gärtner |
| 2023/0286878 | A1 | 9/2023 | Henry |
| 2023/0313111 | A1 | 10/2023 | Heligman |

FOREIGN PATENT DOCUMENTS

| | | |
|---|---|---|
| CN | 205340576 U | 6/2016 |
| CN | 104692840 B | 12/2017 |
| CN | 207394991 U | 5/2018 |
| CN | 210127199 U | 3/2020 |
| CN | 210506136 U | 5/2020 |
| CN | 111348951 A | 6/2020 |
| CN | 111484358 A | 8/2020 |
| CN | 211946841 U | 11/2020 |
| CN | 212504634 U | 2/2021 |
| CN | 213977466 U | 8/2021 |
| CN | 214327587 U | 10/2021 |
| CN | 215855823 U | 2/2022 |
| CN | 114213172 A | 3/2022 |
| CN | 112871992 B | 5/2022 |
| CN | 216890703 U | 7/2022 |
| CN | 115504822 A | 12/2022 |
| CN | 218321174 U | 1/2023 |
| CN | 218507706 U | 2/2023 |
| CN | 115867524 A | 3/2023 |
| EP | 0611742 B1 | 6/1997 |
| EP | 1081100 B1 | 10/2006 |
| EP | 3246271 B1 | 11/2019 |
| EP | 3246270 B1 | 4/2020 |
| EP | 3252029 B1 | 8/2021 |
| EP | 3889123 A1 | 10/2021 |
| KR | 20220084668 A | 6/2022 |
| WO | 2006040943 A1 | 4/2006 |
| WO | 2023034172 A1 | 3/2023 |

* cited by examiner

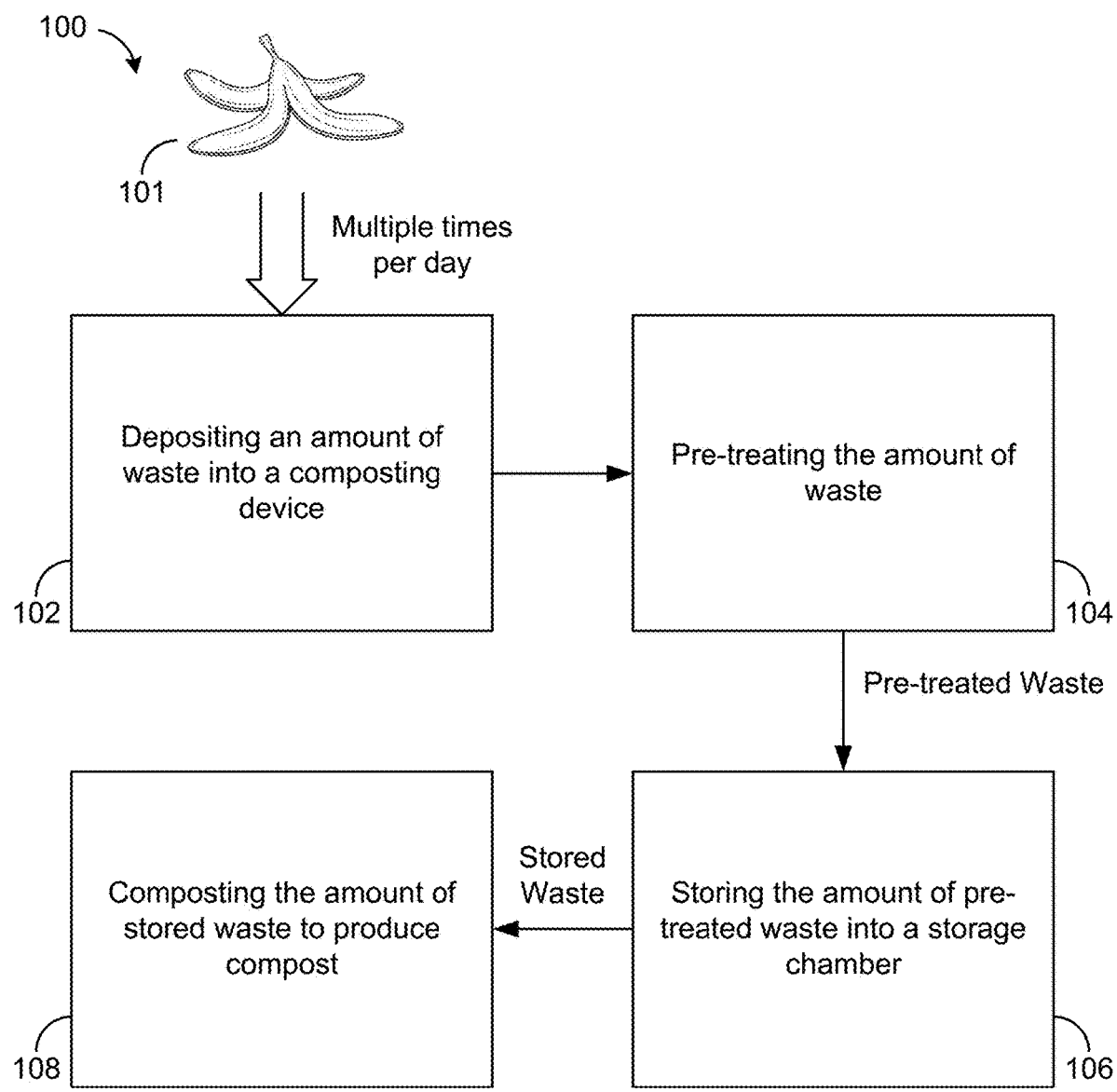
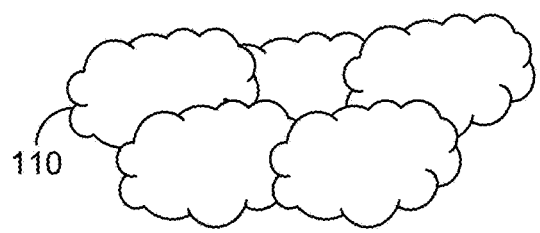
FIG. 1

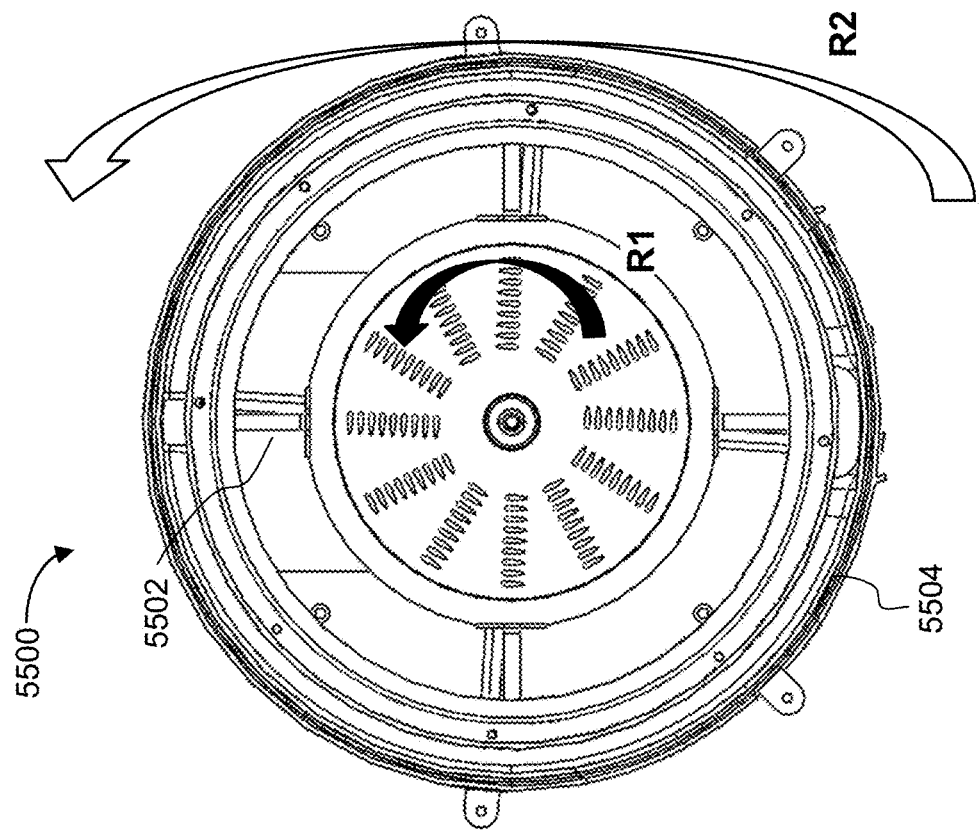
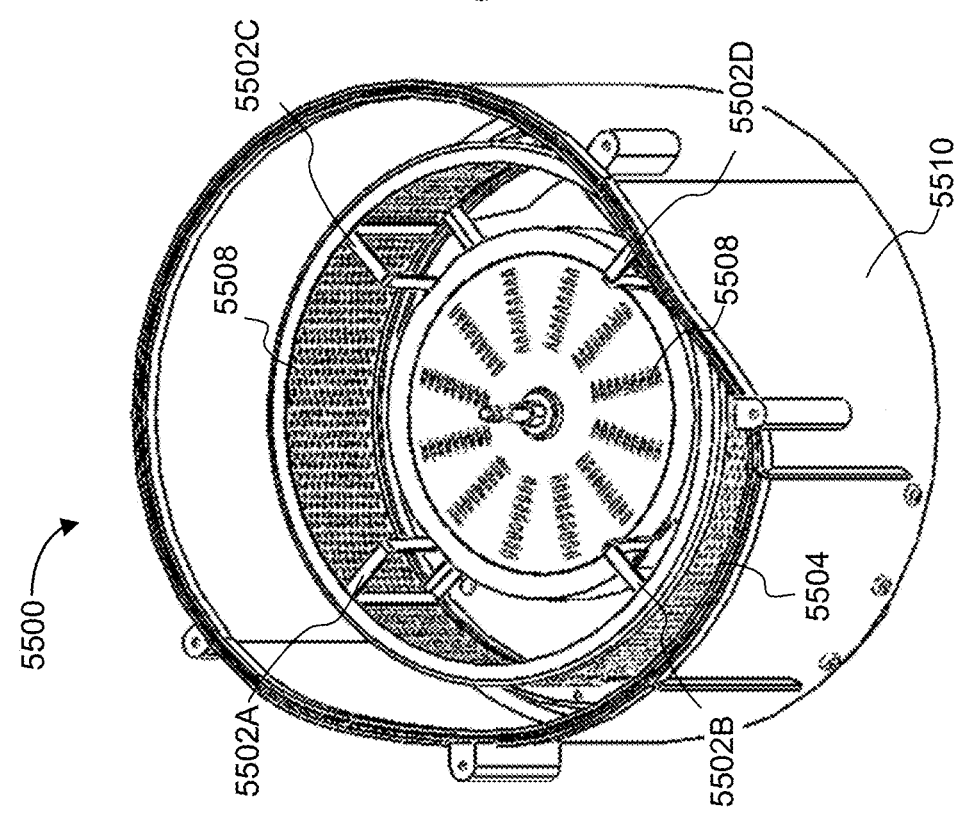
FIG. 55A
FIG. 55B

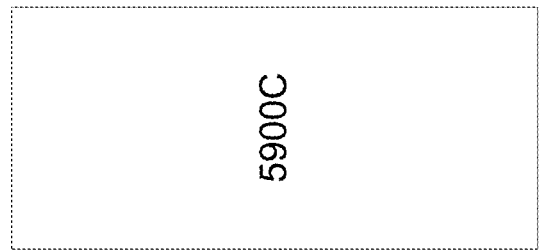
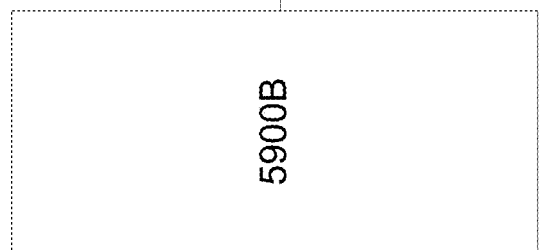
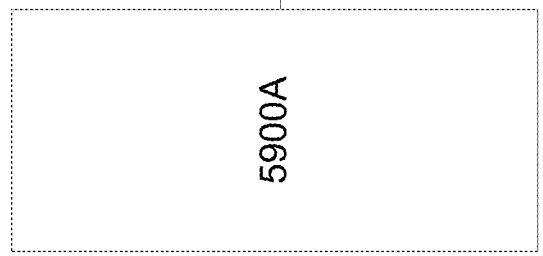
FIG. 59B
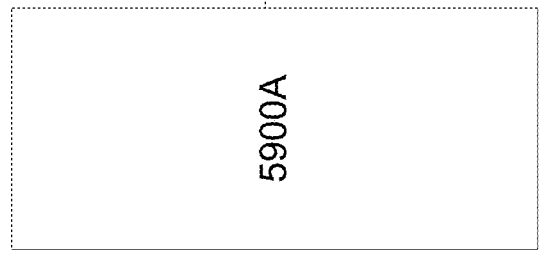
FIG. 59A

SYSTEM AND METHOD FOR AUTOMATICALLY GENERATING ORGANIC COMPOST FROM WASTE

CROSS-REFERENCE TO RELATED APPLICATIONS

This application is a continuation of International Application No. PCT/CA2023/051760 filed Dec. 22, 2023 (which designates the U.S.), which claims priority from U.S. Provisional Patent Application No. 63/434,630 filed Dec. 22, 2022; and U.S. Provisional Patent Application No. 63/463,313 filed May 2, 2023, the entire contents of International Application No. PCT/CA2023/051760, U.S. Provisional Patent Application No. 63/434,630 and U.S. Provisional Patent Application No. 63/463,313 are hereby incorporated herein by reference in their entirety.

FIELD

The various embodiments described herein generally relate to systems and methods for generating organic compost from waste such as, but not limited to, food remains, as well as paper products, cardboard products, and some plastics.

BACKGROUND

The following paragraphs are provided by way of background to the present disclosure. They are not, however, an admission that anything discussed therein is prior art or part of the knowledge of persons skilled in the art.

Composting is the natural process of recycling organic matter, such as leaves and food scraps, into compost that can be used to enrich soil and plants. All organic discards decompose eventually however, composting can be used to speed up the process by providing an ideal environment for composting to occur. In simple composters, ideal humidity and temperature conditions can be maintained to complete the composting process. In some more complex composters, decomposing organisms (such as bacteria, fungi, worms, sowbugs, and/or nematodes) may be used to compost the organic matter. In other composters, chemicals may be used to compost the organic matter.

Organic discards can be processed in industrial-scale composting facilities, in smaller-scale community composting systems, in anaerobic digesters, and in home composters, among other options.

A drawback of small-scale composting systems is that it is difficult to obtain a sizeable volume of compost as only a small number of organic materials are produced in a given period. For instance, if a user deposits a small amount of organic material into a composter at one time, the amount of useable output compost may only be a fraction of the original deposited volume. In this example, the user may have to continuously deposit a small amount of organic material resulting in a continuous amount of compost, which is why this process is called continuous composting. Continuous composting may produce only a small amount of compost which may not be useable for growing plants as most plants require a significant amount of compost to grow.

In order to avoid generating small amounts of compost, users typically have to collect food scraps for longer periods of time before inputting the larger volume of scraps into the composter, which is why this process is known as batch composting. However, batch composting requires users to collect and store decomposing organic matter, prior to composting, which may produce odors and other allergens such as mold and dust which can cause discomfort in the home or outdoor spaces.

SUMMARY OF VARIOUS EMBODIMENTS

In one aspect, in at least one embodiment described herein, there is provided a method of producing compost, wherein the method comprises: receiving waste in a composting apparatus, the waste having a first moisture content; pre-treating the waste to produce pre-treated waste; storing the pre-treated waste into a storage chamber for a pretreatment time period to produce stored waste; and composting the stored waste in a compost chamber to produce a batch of output compost having a second moisture content, wherein the second moisture content is less than the first moisture content.

In at least one embodiment, the stored waste may be composted to produce intermediate compost and the intermediate compost is gathered to produce the batch of output compost.

In at least one embodiment, the pre-treating step may comprise separating the waste into solid waste and liquid waste; reducing a volume of the solid waste; and drying the reduced volume of solid waste.

In at least one embodiment, reducing the volume of solid waste may comprise: crushing, milling, grinding, or mulching the volume of solid waste to reduce individual particle size in the volume of solid waste.

In at least one embodiment, drying the volume of solid waste may comprise heating and/or aerating the volume of solid waste to reduce moisture content.

In at least one embodiment, the liquid waste may be obtained by mechanically removing liquid from the waste via pressing, tumbling, or centrifugation.

In at least one embodiment, receiving the waste may be done multiple times before the output compost is generated.

In at least one embodiment, pre-treating the amount of waste may be performed once during the pretreatment time period.

In at least one embodiment, composting the stored waste may comprise using naturally occurring microbes and/or introducing microbes into the compost chamber and producing one or more conditions to increase an activity of the microbes for performing an aerobic decomposition process on the waste within the compost chamber.

In at least one embodiment, the step of producing the one or more conditions within the compost chamber may comprise: (a) flowing air through the waste in the compost chamber to provide a desired amount of oxygen to the microbes to undergo an aerobic decomposition process; (b) maintaining a desired moisture content level by spraying or misting liquid into the compost chamber; (c) maintaining a desired temperature in the compost chamber; (d) adding additional microbes in powder, capsule or liquid form; or any operable combination of (a) to (d), wherein the desired amount of oxygen and the desired moisture content are determined through experimentation.

In at least one embodiment, the method may further comprise: maintaining an airflow through the waste in the compost chamber and using a mixer to mix the waste in the compost chamber.

In at least one embodiment, the method may further comprise the step of post-treating the output compost by maintaining the output compost in a chamber that is temperature and humidity controlled and has an airflow, where the temperature in the chamber is above room temperature.

In at least one embodiment, the method may comprise removing the compost chamber for retrieving the output compost and reinserting the compost chamber for performing subsequent composting.

In at least one embodiment, the method may comprise performing a sterilization sequence.

In at least one embodiment, the method may comprise operating at least one first light source of a plurality of ultraviolet light sources at between about 100 nm and about 240 nm wavelength for generating ozone for destruction of odors.

In at least one embodiment, the method may comprise operating at least a second light source of the plurality of ultraviolet light sources at between about 240 nm and about 315 nm wavelength to control growth of undesired organisms and destroy ozone.

In at least one embodiment, the method may comprise using an active carbon filter for filtering volatile compounds and gases left from the destruction of the ozone.

In at least one embodiment, the method may comprise providing a positive airflow through the waste in the compost chamber for preventing odors from escaping outside of the composting apparatus.

In another aspect, in accordance with at least one embodiment described herein, this is provided a composting apparatus comprising: a main device body; control and power electronics including a processor and memory; a compost chamber cavity located within the main device body; and a compost chamber for performing composting of waste, the compost chamber being located in the compost chamber cavity, wherein the processor is configured to perform one of the methods described herein when software instructions stored in the memory are executed by the processor.

In at least one embodiment, the composting apparatus may further comprise: a pre-treatment tank that includes at least one fan, at least one mixer, optionally at least one condenser, and optionally at least one heater.

In at least one embodiment, the compost chamber may further comprise at least one mixer.

In at least one embodiment, the at least one mixer is a ribbon impeller comprising a first helical fin configuration and a second helical fin configuration; wherein the first and second helical fin configurations are at opposing angular directions and; wherein the first and second helical fin configurations are mirror images with respect to a central slicing plane.

In at least one embodiment, the first and second helical fins comprise continuous helices.

In at least one embodiment, the first and second helical fins comprise discrete segments of helices.

In at least one embodiment, the impeller may be configured operate by rotating the first and second helical fin configurations in opposite direction to produce a homogenous mixture of solid compost particles with a range of particle sizes between about 0.5 mm to about 20 mm.

In at least one embodiment, the composting may apparatus comprise: a plurality of adaptors disposed at one end of the compost chamber cavity; and the compost chamber comprises a plurality of couplers for releasably inserting the compost chamber in the compost chamber cavity by releasably coupling the plurality of couplers with the plurality of adaptors.

In at least one embodiment, the plurality of couplers include mechanical couplers.

In at least one embodiment, the plurality of couplers further includes fluidic couplers, and/or electronic couplers.

In at least one embodiment, the composting apparatus may further comprise at least one sensor coupled to the compost chamber for obtaining sensor data for one more parameters inside the compost chamber, the at least one sensor being communicatively coupled to the processor.

In at least one embodiment, the at least one sensor may comprise a temperature sensor, a moisture sensor, a relative humidity sensor, a gas sensor, a level sensor, a proximity sensor, a weight sensor, an image sensor or any operable combination thereof.

In at least one embodiment, the composting apparatus may comprise a plurality of ultraviolet light sources for destruction of odors and control of undesired organisms.

In at least one embodiment, at least a first light source of the plurality of ultraviolet light sources is configured to operate at between about 100 nm and about 240 nm wavelength for generating ozone for destruction of odors.

In at least one embodiment, at least a second light source of the plurality of ultraviolet light sources is configured to operate between about 240 nm and about 315 nm wavelength to control growth of undesired organisms and destroy ozone.

In at least one embodiment, the generated ozone is delivered to the compost chamber for reducing odors in the compost chamber by exposing the odors to the generated ozone.

In at least one embodiment, the generated ozone is delivered to the liquid chamber for reducing odors in the liquid chamber by exposing the odors to the generated ozone.

In at least one embodiment, the composting apparatus may further comprise an active carbon filter for filtering volatile compounds and gases left from the destruction of the ozone.

In at least one embodiment, the composting apparatus may be further configured to provide a positive airflow through the waste in the compost chamber for preventing odors from escaping outside of the composting apparatus.

In another aspect, in accordance with at least one embodiment described herein, there is provided a system for composting food waste, wherein the system comprises: a composting apparatus that is defined according to any of the embodiments described herein, wherein existing external fluidic couplers and/or external electrical connectors in a food-preparation environment, a juice shop, or a coffee shop are connected to the composting apparatus.

In at least one embodiment, the existing external fluidic couplers may comprise drain connectors, sink connectors, pulp waste outputs, ground waste outputs or dishwashing connectors.

In another aspect, in accordance with at least one embodiment described herein, there is provided a mixer for a compost chamber that is used in a composting apparatus, wherein the mixer is a ribbon impeller comprising: a first helical fin configuration; and a second helical fin configuration; wherein the first and second helical fin configurations are at opposing angular directions; and; wherein the first and second helical fin configurations are mirror images with respect to a central slicing plane.

In another aspect, in accordance with at least one embodiment described herein, there is provided a composting apparatus comprising: a main device body; control and power electronics including a processor and memory; a compost chamber cavity located within the main device body; a plurality of adaptors disposed at one end of the compost chamber cavity; and a compost chamber for performing composting of waste, the compost chamber being located in the compost chamber, the compost chamber including a plurality of couplers for releasably inserting the compost chamber in the compost chamber cavity by releasably coupling the plurality of couplers with the plurality of adaptors.

In another aspect, in accordance with at least one embodiment described herein, there is provided a method of producing compost, wherein the method comprises: collecting a first portion of waste in a composting apparatus; processing the first portion of waste in the composting apparatus; transferring the first portion of waste into a first compost chamber located within the composting apparatus; pre-treating the first portion of waste to produce a first portion of pre-treated waste; composting the first portion of pre-treated waste in the first compost chamber to produce a first batch of output compost; collecting a second portion of waste in the composting apparatus; processing the second portion of waste in the composting apparatus; transferring the second portion of waste into a second compost chamber located within the composting apparatus; pre-treating the second portion of waste to produce a second portion of pre-treated waste; and composting the second portion of pre-treated waste in the second compost chamber to produce a second batch of output compost; wherein collecting the second portion of waste in the composting apparatus occurs once the first compost chamber is filled.

In another aspect, in accordance with at least one embodiment described herein, there is provided a method of producing compost, wherein the method comprises: receiving a first amount of waste in a composting apparatus; pre-treating the first amount of waste to produce a first amount of pre-treated waste; storing the first amount of pre-treated waste into a first storage chamber for a pretreatment time period to produce a first amount of stored waste; composting the first amount of stored waste in a first compost chamber to produce a first batch of output compost; subsequently receiving a second amount of waste in the composting apparatus; pre-treating the second amount of waste to produce a second amount of pre-treated waste; storing the second amount of pre-treated waste into a second storage chamber for a pretreatment time period to produce a second amount of stored waste; and composting the second amount of stored waste in a second compost chamber to produce a second batch of output compost; wherein a processor determines if the first amount of pre-treated waste should instead enter the second storage chamber if the first storage chamber meets a specified criteria; and wherein the processor determines if the second amount of pre-treated waste should instead enter the first storage chamber if the second storage chamber meets a specified criteria.

In at least one embodiment, the specified criteria comprise the storage chamber being full or based on a count-down timer.

In at least one embodiment, the pre-treating step may comprise: separating the waste into solid waste and liquid waste; reducing a volume of the solid waste; and drying the reduced volume of solid waste or performing dewatering on the volume of solid waste.

In at least one embodiment, reducing the volume of solid waste may comprise: crushing, milling, grinding, or mulching the volume of solid waste to reduce individual particle size in the volume of solid waste.

In at least one embodiment, drying the volume of solid waste may comprise heating and/or aerating the volume of solid waste to reduce moisture content.

In at least one embodiment, liquid waste may be obtained by performing the dewatering which includes mechanically removing liquid from the waste via pressing, tumbling, or centrifugation.

In at least one embodiment, composting the stored waste may comprise using naturally occurring microbes and/or introducing microbes into the first and second compost chamber and producing one or more conditions to increase an activity of the microbes for performing an aerobic decomposition process on the waste within the first and second compost chambers.

In at least one embodiment, the method may further comprise: maintaining appropriate airflow through the waste in the first and second compost chambers and using a mixer to mix the waste in the first and second compost chambers.

In at least one embodiment, the method may comprise removing the first compost chamber for retrieving the output compost and reinserting the first compost chamber, while the second compost chamber continues composting.

In another aspect, in accordance with at least one embodiment described herein, there is provided a composting apparatus comprising: a main device body; control and power electronics including a processor and memory; a first compost chamber cavity located within the main device body; a first compost chamber for performing composting of waste, the first compost chamber being located in the first compost chamber cavity, a second compost chamber cavity located within the main device body, adjacent to the first compost chamber cavity; a second compost chamber for performing composting of waste, the second compost chamber being located in the second compost chamber cavity; and a dam moveable between a first position and a second position; wherein the first position of the dam covers the second compost chamber, and the second position of the dam covers the first compost chamber; and wherein the processor is configured to perform a method of producing compost when software instructions stored in the memory are executed by the processor.

In at least one embodiment, the main device body may further comprise a folding mesh strainer that is configured to separate liquid waste from solid waste, the folding strainer having perforations; wherein the folding mesh strainer comprises an open state for receiving food waste; and a closed state for collecting solid waste while the liquid waste is expelled from the perforations.

In at least one embodiment, the liquid waste expelled from the perforations collects in a liquid chamber for storage until disposal.

In at least one embodiment, the composting apparatus may comprise a plurality of ultraviolet light sources for destruction of odors and control of undesired organisms.

In at least one embodiment, at least a first light source of the plurality of ultraviolet light sources is configured to operate at between about 100 nm and about 240 nm wavelength for generating ozone for destruction of odors.

In at least one embodiment, at least a second light source of the plurality of ultraviolet light sources is configured to operate between about 240 nm and about 315 nm wavelength to control growth of undesired organisms and destroy ozone.

In at least one embodiment, the generated ozone is delivered to the first and second compost chambers for reducing odors in the first and second compost chambers by exposing the odors to the generated ozone.

In at least one embodiment, the composting apparatus may further comprise an active carbon filter for filtering volatile compounds and gases left from the destruction of the ozone.

In at least one embodiment, the composting apparatus may be further configured to provide a positive airflow through the waste in the compost chamber for preventing odors from escaping outside of the composting apparatus.

In at least one embodiment, the composting chambers may be insertable and removable horizontally, vertically or from the side of the composting apparatus.

In at least one embodiment, the composting apparatus may further comprise a liquid chamber that is insertable and removable horizontally, vertically or from the side of the composting apparatus.

In another aspect, in accordance with at least one embodiment described herein, there is provided a composting apparatus comprising: a main device body; control and power electronics including a processor and memory; a first compost chamber cavity located within the main device body; a first compost chamber for performing composting of waste, the first compost chamber being located in the first compost chamber cavity, a second compost chamber cavity located within the main device body, adjacent to the first compost chamber cavity; a second compost chamber for performing composting of waste, the second compost chamber being located in the second compost chamber cavity; and a solid diversion assembly for diverting solids between the first compost chamber and the second compost chamber; wherein the processor is configured to perform a method of producing compost when software instructions stored in the memory are executed by the processor.

In at least one embodiment, the composting apparatus may further comprise a crushing assembly, the crushing assembly comprising a hopper having a first opening for receiving input organic waste, and a second opening opposite the first opening for expunging output waste; a set of choppers located within the hopper for chopping the input organic waste into size-reduced particles; and a bottom plate placed to seal the second opening of the hopper, and leaving a gap that allows smaller particles that are smaller than the gap to be expunged, while preventing larger particles that are larger than the gap from being expunged, thereby re-circulating the larger particles into the hopper for further chopping and size reduction.

In at least one embodiment, the composting apparatus may further comprise a dewatering assembly, the dewatering assembly comprising a filter mesh assembly and a mesh wiper assembly for reducing the water content of the particles.

In at least one embodiment, the filter mesh assembly may rotate at a first angular velocity and the mesh wiper assembly rotates at a second angular velocity.

In at least one embodiment, the first angular velocity is equal to the second angular velocity during a dewatering stage of the composting.

In at least one embodiment, the first angular velocity is not equal to the second angular velocity during a cleaning phase of the composting.

In at least one embodiment, the composting apparatus further comprises a liquid diversion assembly configured to collect liquid obtained during the dewatering stage of the composting, and divert the liquid towards a liquid tank.

In at least one embodiment, the solid diversion assembly comprises a dam moveable between a first position and a second position; wherein the first position of the dam covers the second compost chamber, and the second position of the dam covers the first compost chamber.

In at least one embodiment, the composting apparatus may further comprise an air filtering assembly.

In at least one embodiment, the air filtering assembly may comprise a plurality of ultraviolet light sources for destruction of odors and control of undesired organisms.

In at least one embodiment, at least a first light source of the plurality of ultraviolet light sources is configured to operate at between about 100 nm and about 240 nm wavelength for generating ozone for destruction of odors.

In at least one embodiment, at least a second light source of the plurality of ultraviolet light sources is configured to operate between about 240 nm and about 315 nm wavelength to destroy ozone.

In at least one embodiment, the generated ozone is delivered to the first and second compost chambers for reducing odors in the first and second compost chambers by exposing the odors to the generated ozone.

In at least one embodiment, the generated ozone is delivered to the liquid chamber for reducing odors in the liquid chamber by exposing the odors to the generated ozone.

In at least one embodiment, the composting apparatus may further comprise an active carbon filter for filtering volatile compounds and gases left from the destruction of the ozone.

In at least one embodiment, the composting apparatus may be further configured to provide a positive airflow through the waste in the compost chamber for preventing odors from escaping outside of the composting apparatus.

Other features and advantages of the present application will become apparent from the following detailed description taken together with the accompanying drawings. It should be understood, however, that the detailed description and the specific examples, while indicating preferred embodiments of the application, are given by way of illustration only, since changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 1 is a flowchart showing a method of producing compost, according to an example embodiment.

FIG. 55A is a front perspective view of the dewatering assembly of the composting apparatus of FIG. 48.

FIG. 55B is a top view of the dewatering assembly of the composting apparatus of FIG. 48.

FIG. 59A is a block diagram of a two composting apparatus system.

FIG. 59B is a block diagram of a three composting apparatus system.

Figures 2, 3:
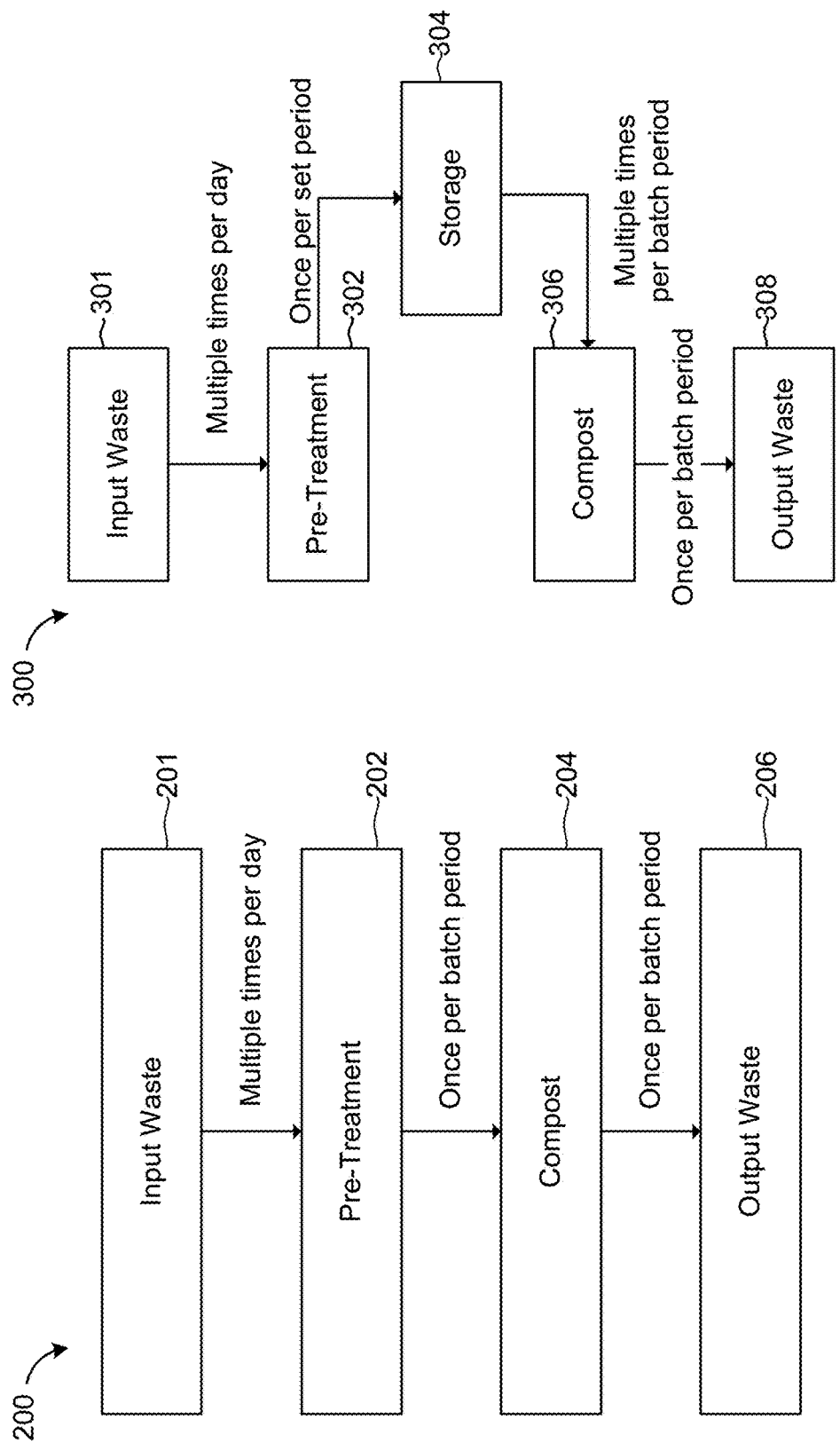
FIG. 2 is a flowchart showing how by-products are transferred according to a continuous to batch process to produce compost, according to an example embodiment.
FIG. 3 is a flowchart showing how by-products are transferred according to a continuous to batch process to produce compost, according to another example embodiment.

Further aspects and features of the example embodiments described herein will appear from the following description taken together with the accompanying drawings.

DESCRIPTION OF VARIOUS EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled", or "coupling" as used herein can have several different meanings depending in the context in which these terms are used. For example, the terms coupled, or coupling can have a mechanical, electrical or fluidic connotation. For example, as used herein, the terms coupled or coupling can indicate that two elements or devices can be directly connected to one another or connected to one another through one or more intermediate elements or devices via an electrical signal, electrical connection, fluidic pathway or a mechanical element depending on the particular context.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any operable combination thereof. Accordingly, the term "any combination thereof" is meant to cover any operable combination of the elements which precede the phrase. For example, the phrase "A, B, C, D or any combination thereof" includes A; B; C; D; A and B; A and C; A and D; B and C; B and D; C and D; A, B and C; A, B and D; A, C and D; B, C and D as well as A, B, C and D assuming that all such combinations are operable (i.e., they can be used together in practice in a working embodiment).

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect" "to, at least, provide," "to, at least, transmit," and so on.

A portion of the example embodiments of the systems, devices, or methods described in accordance with the teachings herein may be implemented as a combination of hardware or software. For example, a portion of the embodiments described herein may be implemented, at least in part, by using one or more computer programs, executing on one or more programmable devices comprising at least one processing element, and at least one data storage element (including volatile and non-volatile memory). These devices may also have at least one input device (e.g., a keyboard, a mouse, a touchscreen, other input elements or any operable combination thereof) and at least one output device (e.g., a display screen, a printer, a wireless radio, other output elements or any operable combination thereof) depending on the type of device.

It should also be noted that there may be some elements that are used to implement at least part of the embodiments described herein that may be implemented via software that is written in a high-level procedural language such as object-oriented programming. The program code may be written in C, C++ or any other suitable programming language and may comprise modules or classes, as is known to those skilled in object-oriented programming. Alternatively, or in addition thereto, some of these elements implemented via software may be written in assembly language, machine language, or firmware as needed.

At least some of the software programs used to implement at least one of the embodiments described herein may be stored on a storage media or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions, such as program code, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

Accordingly, any device described herein that executes software instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto.

The various embodiments described herein generally relate to apparatuses and methods for composting food waste, as well as paper products, cardboard products, and some plastics. Composting is the natural process of recycling organic matter, such as garden waste, yard waste and food scraps, into compost that can be used to enrich soil and plants. All organic discards decompose eventually; however, composting can be used to speed up the process by providing an ideal environment for composting to occur.

On the other hand, users typically have to collect food scraps for longer periods of time before inputting the larger volume of scraps into the composter to produce a larger batch of compost. This is known as batch composting. However, batch composting requires the users to collect food scraps prior to placing a larger batch of food scraps into the composter. This may produce odors and other allergens such as mold and dust which can cause discomfort in the home or outdoor spaces.

It is beneficial to have a composter in which users may continuously deposit a small amount of food scraps and yet obtain a large batch of compost. The continuous-to-batch process combines the freedom to add waste at any time while producing a controlled quality of batched output. Food waste from meal preparation, meal leftovers and snack leftovers can be added to the device as soon as they are generated, yet still able to generate a useable batch of output compost.

Referring now to FIG. 1, shown therein is a flowchart of a method 100 of producing compost, according to an example embodiment. At 102, an amount of waste 101 is deposited into a composting apparatus. The amount of input waste 101 can be any amount of food scraps, food, organic matter, biodegradable material, paper products, cardboard products, some plastics or any other suitable waste. At 104, the amount of waste 101 can be pre-treated to produce an amount of pre-treated waste. At 106, the amount of pre-treated waste can be stored into a storage chamber for a set period of time (e.g., a pretreatment storage time) to produce an amount of stored waste. The pretreatment storage time depends on the application of the composting apparatus. For example, for residential users, this period may typically be several days up to 2 weeks since the capacity may not be too large for household composting apparatuses. However, for commercial units that have a larger capacity, the pretreatment storage time may vary from weeks to even months, in some cases, as long as the pretreated waste does not rot.

At 108, the amount of stored waste can be composted to produce a batch of output compost 110. The batch of output compost 110 can be any volume of compost depending on the size of the composting apparatus. Alternatively, the output compost may be considered to be intermediate compost that is gathered together over successive composting cycles to form a batch of output compost that may then be removed from the composting apparatus.

Moisture content refers to the amount of water present in a product. The input waste 101 may have a first moisture content level; and the batch of output compost 110 may have a second moisture content level. In at least one embodiment, depending on the operating parameters of the composting apparatus, the components of the composter and its method of operation, the second moisture content level can be less than the first moisture content level; therefore, the batch of output compost 110 typically contains less moisture, or typically has a lower moisture content level than the amount of input waste 101.

In another embodiment, depending on the operating parameters of the composting apparatus, the components of the composter and its method of operation, the amount of output compost 109 may have a third moisture content level. In this embodiment, the third moisture content level may be less than the first moisture content level, and/or the third moisture content level may be greater than the second moisture content level.

The pre-treating step 104 can include separating the amount of waste 101 into a volume of solid waste and a volume of liquid waste. Separating the amount of waste into a volume of liquid waste can involve: mechanically removing liquid from the amount of waste via any suitable method. For example, the mechanical removal of liquid can be done by applying mechanical pressure via, but not limited to, pressing, tumbling, or centrifugation, as well as by a dewatering filter. In at least one embodiment, the separation of solid waste and liquid waste may be optional.

In at least one embodiment, the pre-treating step 104 can also include reducing the volume of solid waste. Reducing the volume of solid waste can include, but is not limited to: crushing, milling, grinding, mulching, another suitable reduction method or any operable combination thereof. As a result of reducing the volume of the solid waste, the individual particle size of the volume of solid waste can also be reduced. Volume reduction may be optional as there may be at least one embodiment where the daily waste may just fall down into the tank 910, for embodiments with a physically larger tank.

A crush sequence may also be used for reducing the volume of solid waste in order to have smaller particle sizes, by e.g., breaking up larger particles into smaller particles, in the pre-treated waste such as, but not limited to, about 1 mm to about 20 mm, for example. In at least one embodiment, the crush sequence may involve turning a crushing component ON for a set period of time and then turning the crushing component OFF for another set period of time. The crush sequence may be repeated for any number of cycles such as one, two, three or more for a given amount of waste. Alternatively, crushing can be performed until all pre-treated waste material passes through the chamber. In another alternative, crushing may be performed for a longer period of time than usual depending on the type of material that is being crushed. The set period of time (e.g., the crushing time period) may be any period of time including, but not limited to, 5 seconds, 10 seconds, 15 seconds, 30 seconds, 45 seconds, 60 seconds, 90 seconds, or any other suitable period of time.

In at least one embodiment, the pre-treating step 104 can further include drying the volume of solid waste. Drying the volume of solid waste can involve heating the volume of solid waste to reduce the moisture content. Drying can be done by radiative heating, convective heating, conductive heating, solar heating, another suitable drying method or any operable combination thereof. It should be noted that the drying step may be optional in some cases where the dewatering step provides sufficient reduction of water content, such as to a level below about 50%, for example.

Drying the volume of solid waste may be done by applying a drying which involves turning the drying component(s) ON for a set period of time and then turning the drying component(s) OFF for another set period of time. The drying sequence may be repeated for any number of required cycles such as one, two, three or more. The set period of time may be any period of time including, but not limited to, 5 seconds, 10 seconds, 15 seconds, 30 seconds, 45 seconds, 60 seconds, 90 seconds, or any other period of time. The drying sequence may also be triggered by a threshold temperature using closed loop temperature control logic to determine when the drying heater is on or off. For instance, the drying sequence may be turned ON when the drying temperature reading is below a threshold temperature limit. Similarly, the drying sequence may be turned OFF when the drying temperature reading is above a threshold temperature limit. The threshold temperature may be selected such that the threshold temperature results in temperature control that maintains healthy growth of the microbes so as not to kill them and prevents the growth of bad microbes such as fungi. In addition, in at least one embodiment, aeration (e.g., providing an airflow from a fan) can be used to prevent mold growth and maintain the healthy growth of the microbes. The amount of air flow that is used may be determined experimentally based on the type and quantity of microbes that are used.

At 106, the pre-treated waste is stored in a storage chamber of the composting apparatus for a certain period of time which can be referred to as a storage time. At this point the pre-treated waste is referred to as storage waste. At this point, heating may be employed such that the storage chamber also functions as a drying chamber (optionally). There may also be a mixer in the storage chamber in at least one embodiment to slowly turn the waste (continuously or intermittently) to prevent small particles from cementing into larger chunks which may impact the transfer of this material into the compost chamber after the storage time is compete. The storage time may vary depending on how often input waste is provided to the composting apparatus by the user and how full the storage chamber is. For example, a level sensor such as, but not limited to, an ultrasound sensor may be used to monitor the fullness of the storage chamber, and to prevent users from adding more when the storage chamber is full. Once the storage time ends, the storage waste is provided to a compost chamber at the method 100 moves to 108.

The composting generally involves having microbes in the compost chamber and producing one or more favourable conditions for the microbes within the compost chamber to aid with the composting of the stored waste. Producing one or more favourable conditions within the compost chamber can involve: flowing air through the volume of stored waste to ensure an appropriate concentration of oxygen is received for the microbes to undergo an aerobic decomposition process (which may also be referred to as an aerobic digestion process). This may be achieved using a fan, for example. Another favorable condition is maintaining an appropriate moisture content level within the compost chamber by spraying or misting liquid into the compost chamber. The compost chamber may be misted periodically, which may be dependent on a moisture sensor reading. For example, if the humidity or moisture sensor in the compost chamber detects that the moisture level within the compost chamber is lower than desired, a microcontroller may send a control signal to one or more actuators to spray or mist liquid into the compost chamber until the desired humidity level (e.g., moisture threshold) is reached. The air relative humidity in the compost chamber may be used to infer the moisture content of the material in the compost chamber.

The step of producing one or more favourable conditions within the compost chamber can also involve: maintaining appropriate airflow through the batch of compost by mixing the batch of compost. In at least one embodiment, this may be achieved using an impeller located within the compost chamber. In at least one embodiment, a combination of an impeller and a fan may be used to both provide a desired amount of mixing and airflow.

The step of producing one or more favorable conditions within the compost chamber may involve maintaining a desired temperature in the compost chamber.

The step of producing one or more favorable conditions within the compost chamber may involve adding additional microbes in powder, capsule or liquid form.

In at least one embodiment, at 110, the method 100 may further involve the step of post-treating the gathered amount of compost. The post-treatment, or curing step, typically involves maintaining the compost inside a chamber that's temperature and humidity controlled, with some level of airflow. This is similar to the composting process, but the temperature may be set to be much lower, but still higher than room temperature such as about 18° C. to 30° C. or higher. However, the temperature in this chamber is preferably less than about 40° C. In at least one embodiment, aeration (e.g., air flow provided by a fan) may also be used during curing to produce higher quality compost. The amount of air flow for a desired level of quality compost can be determined experimentally.

Referring now to FIG. 2, shown therein is a flowchart of a composting method 200 along with cycle times for transferring by-products to produce the output compost, according to at least one embodiment. The cycle times may include an input storage cycle time, a pre-treatment processing cycle time, a post-treatment storage cycle time, a composting cycle time, a post-composting storage cycle time or any operable combination thereof. For example, depositing the amount of waste at 201 can be done multiple times per day. Any amount of input waste up to a certain limit depending on the capacity of the composting apparatus may be deposited at any time by the user. For instance, the user may first deposit a banana peel; three hours later deposit some rice; and two hours later deposit a broccoli stalk. Therefore, the user does not have to batch collect the waste in order to make a large deposition to the composting apparatus. Rather, the user can deposit even a small amount of input waste if they wish.

At 202, pre-treating the amount of waste can be done once during a set period of time even though the user may make several deposits of waste material into the composting apparatus during that set period of time, which may be referred to as a pre-treatment processing cycle time. The pre-treatment step may include the steps as described at 104. In one embodiment, the pre-treatment step 102 may start as soon as the first deposition of input waste is made, in which case the input storage cycle time is zero, or when a trigger action occurs. The set period of time may be user defined. The trigger action can include, but is not limited to: opening or closing of the lid, a weight sensor sensing an amount of waste 101 has been placed within an input compartment (e.g., hopper), a user actuating a button, a count-down timer to trigger based on a user defined time, any other suitable trigger or a combination thereof may be used to start the pre-treatment step 202.

The trigger action may also trigger the start of a real-time clock. The real-time clock can be used to measure the cycle times. These cycle times may be adaptive depending on the various types of food waste inputs that are being composted and the different number of times that may be needed for certain stages of the compost process that depend on the type of food waste input. The real-time clock may also feed time data to a processor to determine whether a transfer of waste should occur, or if a cycle/sequence should begin. Examples of sequences that may be triggered by the real-time clock include, but are not limited to, a crushing sequence, a drying sequence, a mixing sequence, a cleaning sequence, and/or a composting sequence.

The pre-treated waste can be converted into compost at 204 using the steps described at 108. The conversion from pre-treated waste to compost can occur once per batch period. A batch period can be defined as the amount of time that it takes the input waste to become compost 110. Therefore, the pre-treatment to compost conversion may occur once per batch period. The conversion 108 may also occur at a faster or slower frequency. For instance, the pre-treatment to compost conversion may occur twice every batch period or any other frequency.

At 206, the composted material can be provided as a batch of output compost 110 using the steps described at 108 for each batch period. Alternatively, the composted material may be collected as intermediate compost that is then gathered together following successive composting cycles to produce the batch of output compost that is provided once per batch period.

Referring now to FIG. 3, shown therein is a flowchart of a composting method 200 along with cycle times for transferring by-products to produce the output compost, according to at least one embodiment. The cycles may be similar to what was described for method 200. In this example embodiment, depositing the amount of waste at 301 can be done multiple times per day similar to 201 of method 200 and the pre-treatment 302, compost 306 and output waste 308 steps can be done in a similar fashion as corresponding steps 202, 204 and 206, respectively, of method 200 with a few differences. For example, at 306, the conversion from the stored pre-treated waste to compost can occur multiple times per batch period.

Figure 4:
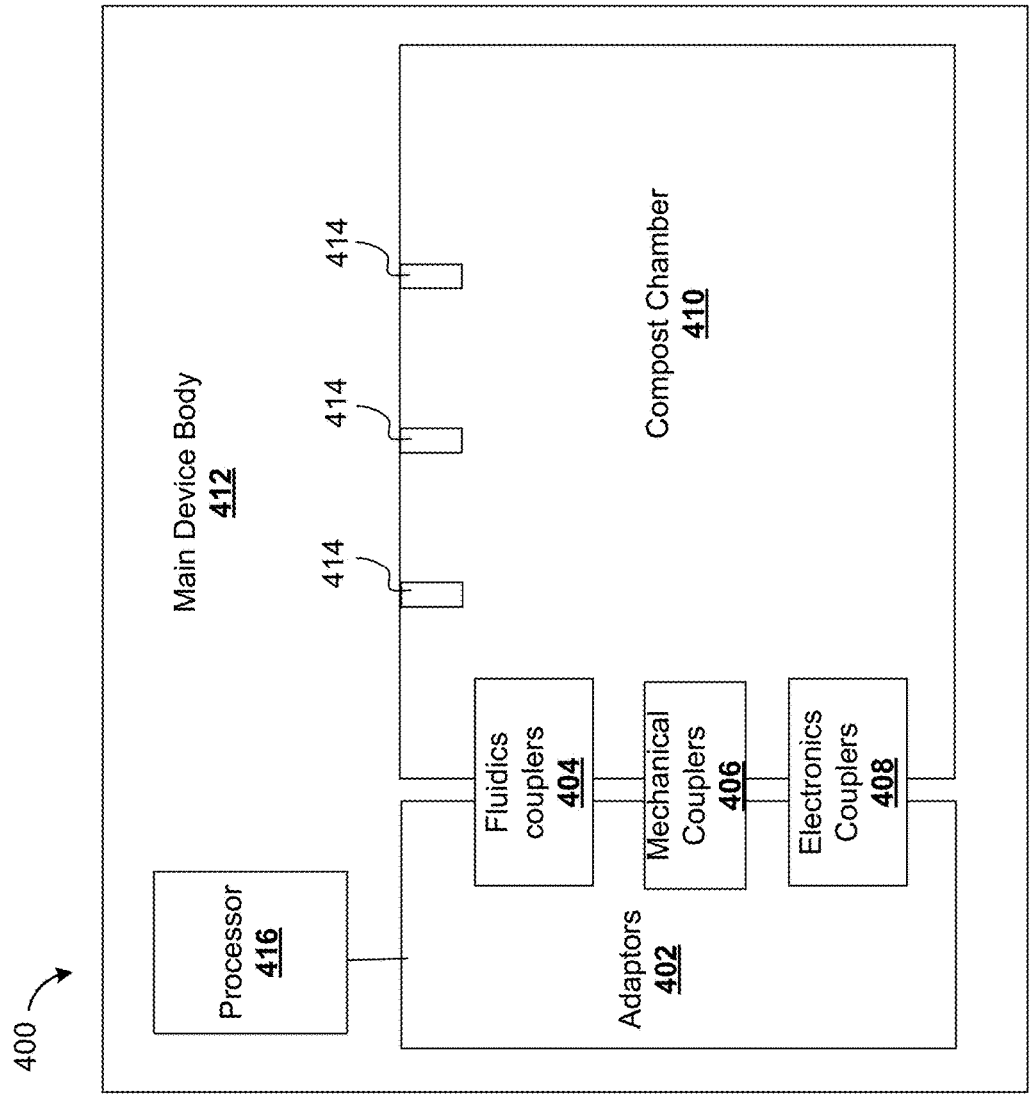
FIG. 4 is a block diagram of a composting apparatus, according to an example embodiment.
Figure 5:
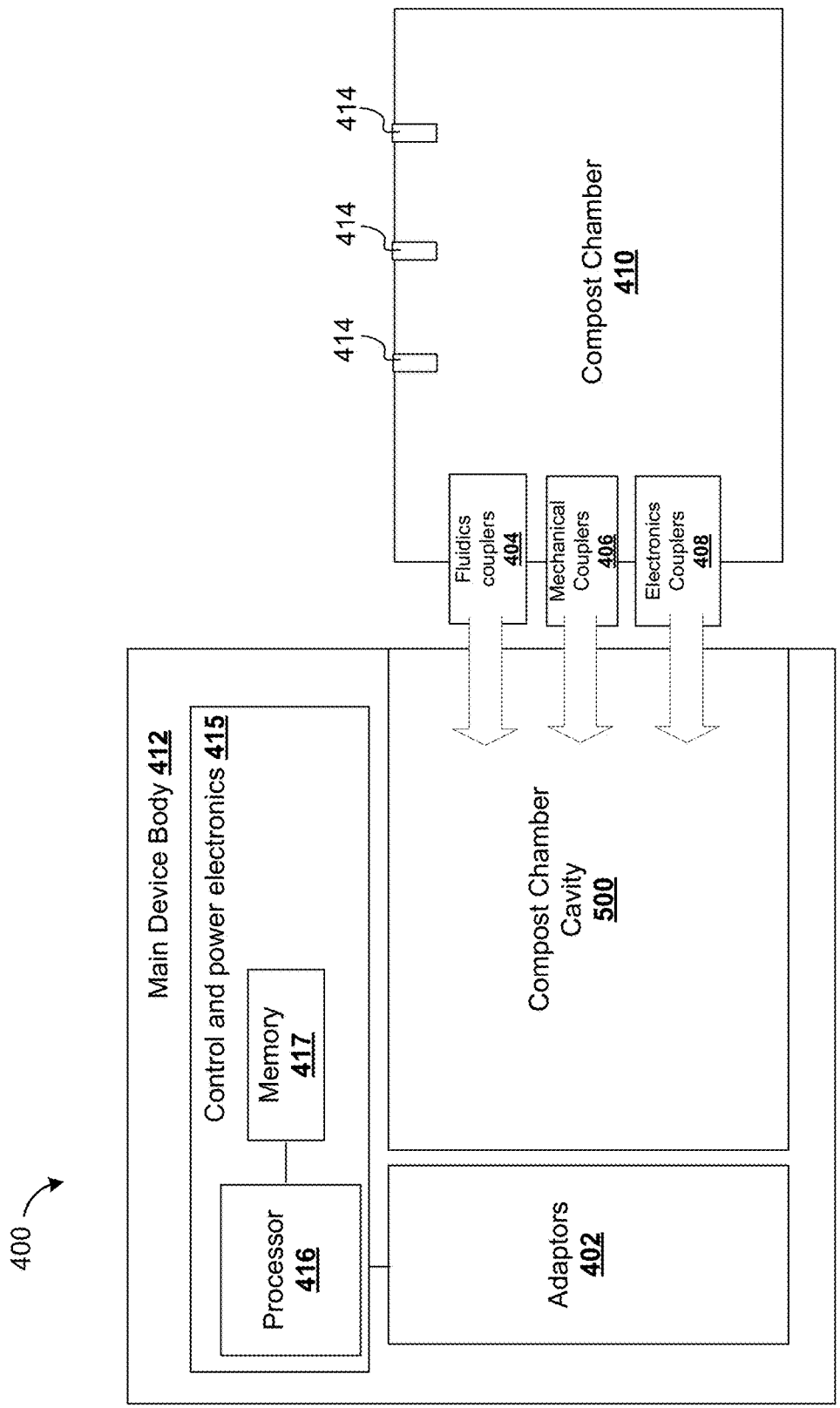
FIG. 5 is a block diagram of a composting apparatus, where the compost chamber is separated from the composting apparatus body, according to an example embodiment.

Referring now to FIGS. 4 and 5, shown therein is a block diagram of a composting apparatus 400, according to an example embodiment. The composting apparatus 400 may include: a main device body 412 (e.g., housing), control and power electronics 415, a processor 416, memory 217, a compost chamber cavity 500 located within the main device body 412, a plurality of adaptors 402 disposed at one end of the compost chamber cavity 500, a compost chamber 410, and at least one sensor 414 coupled to the compost chamber 410 for obtaining sensor data that is used to measure/monitor certain condition in the compost chamber. The one or more sensors 414 are communicatively coupled to the processor 416 for transmitting sensor data thereto. The compost chamber 410 includes a plurality of couplers 404, 406, 408 for coupling various elements of the compost chamber 410 to the plurality of adaptors 402. The compost chamber 410 can receive one or more of the following, including but not limited to: fluids, liquids, a mechanical agitation signal, and a heat signal, via the plurality of couplers 404, 406, and 408 which are in turn coupled to the plurality of adaptors 402. In at least one embodiment, the plurality of couplers can include, but are not limited to, fluidic couplers 404, mechanical couplers 406 and/or electronic couplers 408. It should be noted that in at least one embodiment the fluidic couplers 404 and/or the electronic couplers 408 may be optional.

In this example embodiment, the compost chamber 410 is removeable. In at least one alternative embodiment, the compost chamber may be fixed but there might be an entrance port that can be used to clean it or an output compost storage chamber in the form of a drawer may be pulled out by the user for removing the output compost and cleaning the compost chamber. The removable compost chamber 410 can be removed from the main device body 412, which might occur for cleaning and/or maintenance of the compost chamber 410. However, the various couplers and adaptors are implemented such that the couplers can removably engage the adaptors in a controlled and predictable manner so that once the compost chamber 410 can be reinserted into the main device body 412 with on effect on functionality. In other words, after reinserting the compost chamber 410 into the main device body 412, the couplers engage the adaptors so that the functional components residing inside the compost chamber 410 remain functional.

The functional components may include, but are not limited to mechanical components, electrical and electronic components, fluidic components or any operable combination thereof. The mechanical components include, but are not limited to, mixing components, motor shafts, transfer components, trap doors, windows, spring-loaded contraptions or any operable combination thereof. Electrical and electronic components include, and are not limited to, electrical motors, heaters, fans, pumps, temperature sensors, moisture sensors, oxygen sensors, load sensors, position sensors, level sensors, image sensors, LEDs or any operable combination thereof. Fluidic components include, but are not limited to, nozzles, tubing, fittings, sprayers, atomizers, filters, valves, aerators, reservoirs or any operable combination thereof.

The removable compost chamber 410 maintains the composting condition for a set batch period. Once the composting cycle is completed, the compost chamber 410 can be removed from the main device body 412 with the compost inside. The compost can then be transferred from the compost chamber 410 to an outside area (usually into a separate container). The compost chamber 410 can be returned to the main device body 412. The functional components inside the compost chamber 410 can be reconnected to the adaptors 402 of the main device body 412 for the next composting cycle.

Fluidic couplers 404 can be coupled to a fluidic adapter. The fluidic couplers 404 and fluidic adapter can be used to transfer fluids in and out of the compost chamber 410. Examples of fluids that may be transferred into the compost chamber 410 include, but are not limited to, water, oxygenated water, alcohol, oxygen gas, nitrogen gas, air, compressed air, ethylene, carbon dioxide, any other fluid required during the composting process, or any operable combination thereof that is operable. Examples of fluids that may be transferred out of the compost chamber 410 include, but are not limited to, clean water, oxygenated water, grey water (also referred to as "juice"), alcohol, oxygen gas, nitrogen gas, air, compressed air, ethylene, carbon dioxide, any other fluid emitted during the composting process, or any operable combination thereof. The term juice may be used If the dewatering process happens through use of mechanical means where particulates float inside the fluid media, since the result is a "juice-like" liquid. This juice is quite common at the bottom of the composting buckets of composting systems and is concentrated with high nutrient contents. This juice may also be sometimes referred to as leachate or compost tea.

Mechanical couplers 406 can be coupled to corresponding mechanical adapters. For example, the mechanical coupler 406 and corresponding mechanical adapter can be used to transfer power from a motor to drive a shaft. The shaft may be connected to any driven mechanism such as, but not limited to, one of an: impeller, pedal, auger, piston, blade, juicer, or any other crushing, grinding, mixing, transfer, or pulverizing mechanism. The motor is typically located outside chambers in which moveable elements/driven mechanisms are housed that are driven by the motor. Such chambers may include the pre-treatment, the storage chamber, and/or the compost chamber. In at least one embodiment, two or motors may be used for driving corresponding shafts.

In at least one embodiment, one motor may be used along with belts and/or gear assemblies/gear boxes to device multiple shafts.

The driven mechanism may be removably connected to the shaft so that the driven mechanism may be removed for cleaning and/or maintenance or also interchanged for another type of drive device. For instance, an impeller may be used to crush pre-treated waste; however, a specialized crusher may be required for grinding hard foods such as bones or fruit pits. As such, the impeller may be replaced with a blade crusher to crush hard foods. For example, the user can change different impeller attachments depending on the type of food. Alternatively, different attachments coupled to the shaft can be used depending on the function needed. For instance, a brush attachment may be coupled to the shaft to clean the inside of the chamber, a blunt impact blade may be removably coupled to a shaft to provide a crushing function, a pedal blade may be removably coupled to a shaft to sweep up material and carry them upwards or move them in another direction, an aerated blade may be removably coupled to a shaft to provide further aeration through injected air streams, an injection blade may be removably coupled to a shaft to inject water as it rotates, a heatable blade may be removably coupled to a shaft to provide conductive heating, or any operable combination thereof.

Electronic couplers 408 may be used for transmitting signals between the compost chamber 410 and the processor 416. In one embodiment, the sensors 414 can collect sensor data about the conditions of the compost chamber 410 and the sensor data can be sent for storage on the memory 417 and/or to the processor 416 for processing. The sensor data may be sent as electric signals that may be transmitted via the electronic couplers 408 and the electronic adaptor 402. In another embodiment, the signals collected from sensors 414 may be sent directly to the processor 416 for processing. This may occur where the processor 416 has an analog input I/O pin to read the voltage measured by a given sensor, and then uses an Analog to Digital Converter (ADC) to convert the analog reading into a digital reading, and then process the digital reading using an algorithm to convert the digital reading into a corresponding physical reading. The physical reading may then be stored inside memory. The one or more sensors 414 may include, but are not limited to, a temperature sensor, a moisture sensor, a relative humidity sensor, a gas sensor, a level sensor, a hall effect sensor, load cells (i.e., sensors for weight measurement), an image sensor or any operable combination thereof. In an alternative embodiment, other weight sensors may be used rather than load cells. In another alternative embodiment, other proximity sensors may be used other than hall effect sensors. In at least one embodiment, at least one level sensor may be used. Examples of other proximity and level sensors that may be used include, but are not limited to, inductive, capacitive, ultrasonic, and/or infrared sensors. Examples of other weight sensors that may be used include, but are not limited to, pressure/strain sensors.

In at least one embodiment, the compost chamber 410 may further comprise a pre-treatment tank. The pre-treatment tank may include, but is not limited to, at least one condenser or dewatering mechanism, at least one fan, at least one crushing mechanism, or any operable combination thereof. In at least one embodiment a heater may also be included in the pre-treatment tank.

Figure 6:
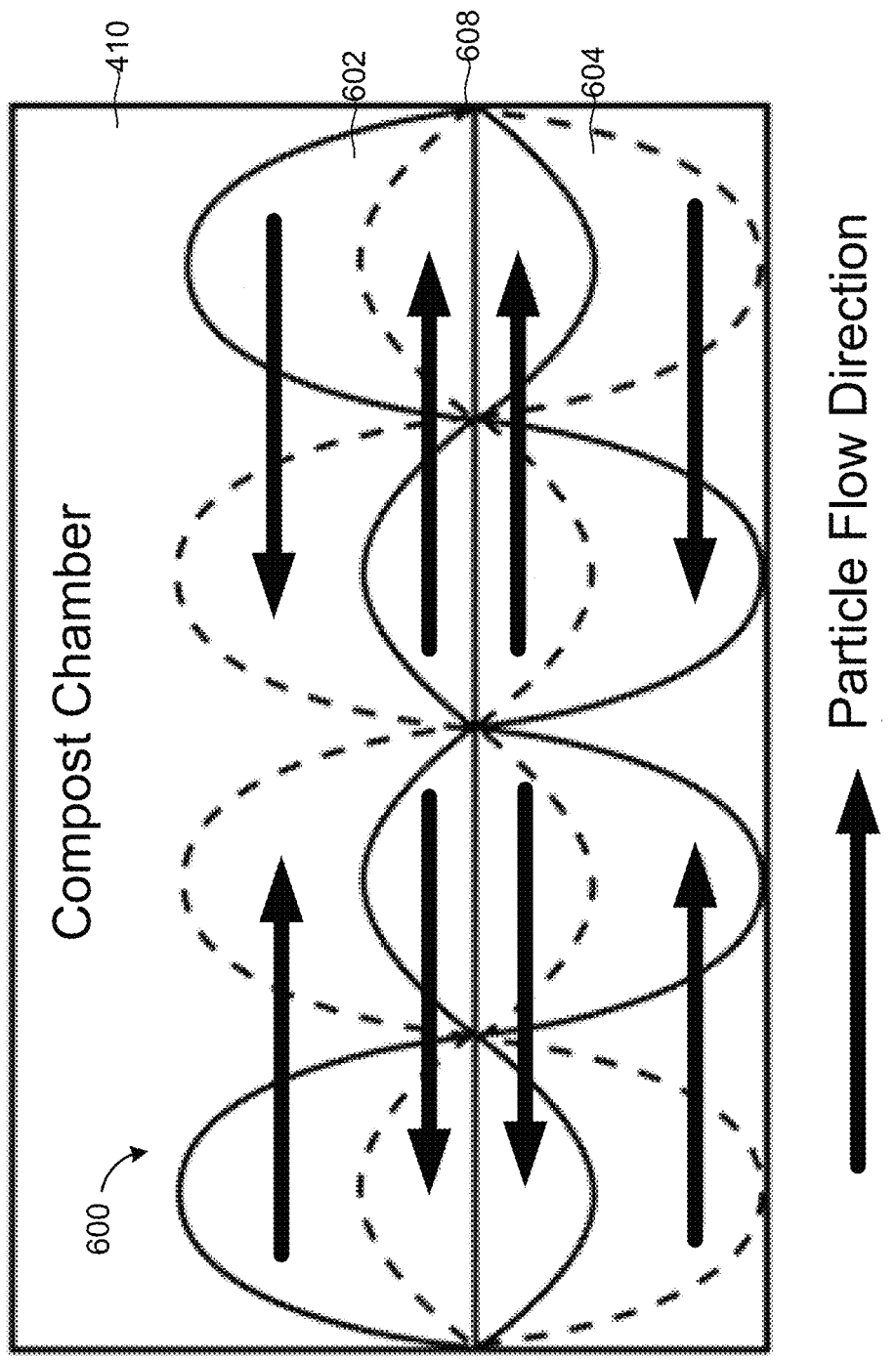
FIG. 6 is a cross-sectional diagram of a portion of the compost chamber comprising an impeller according to an example embodiment.

Referring now to FIG. 6, shown therein is a cross-sectional diagram of a portion of the compost chamber 410 comprising an impeller 600 according to at least one example embodiment. Alternatively, in at least one embodiment, the compost chamber 410 may have multiple impellers that are disposed side by side (e.g., laterally offset from one another) with multiple shafts driving them, which allows for scaling horizontally without changing the height of the composting apparatus.

Referring again to FIG. 6, the impeller 600 is a type of ribbon impeller that includes a first helical fin configuration 602 and a second helical fin configuration 604. The first and second helical fin configurations 602 and 604 are typically operating at opposing angular directions, e.g., the inner helix and the outer helix always rotate in opposite directions, resulting in opposite particle flows. In at least one embodiment, the first and second helical fin configurations 602 and 604 may also be concentrically disposed. Alternatively, in at least one embodiment, the first and second helical fin configurations 602 and 604 may be arranged so that their longitudinal axes are perpendicular to one another. In at least one embodiment, the first and second helical fin configurations can have structures that are mirror images with respect to a central slicing plane 608. In at least one embodiment, the first and second helical fin configurations 602 and 604 may form continuous helices. Alternatively, in at least one embodiment, the first and second helical fin configurations 602 and 604 may for discrete segments of helices. In one embodiment, operating the impeller produces a homogenous mixture of solid compost particles. The particle sizes may vary between 0.5 mm to 20 mm or greater. Homogenous mixtures of varying particles sizes may be beneficial for composting quality control.

The outer helices of the impeller 600 mix the particles by continuously transferring particles from the walls of the compost chamber 410 towards the center, of the compost chamber 410 while the inner helices transfer particles from the center of the compost chamber 410 towards the walls of the compost chamber 410. When a double helical ribbon impeller is used it may produce a particle flow that is lemniscate in nature, which is particularly useful to thoroughly mix particles of various sizes. Alternatively, when the ribbon impeller is made of discrete segments of helices, these discrete segments act as paddles (so that the impeller operates similar to a paddle mixer) but still facilitates a lemniscate particle flow.

The direction of rotation of the impeller 600 may be changed depending on where the particles are transferred out of the compost chamber 410. For example, if there is an exit door at one end of the compost chamber 410, the direction of rotation for the impeller 600 may be alternated periodically so that particles may travel towards the sides of the compost chamber 410 to be transferred outside the compost chamber 410. In embodiments, where the exit door is at the center of the compost chamber 410, then the impeller 600 may be operated so that particles accumulate in the middle of the compost chamber 410 where they may be transferred out of the compost chamber when the exit door is opened.

The particular structure and size of the impeller 600 may be selected depending on the application such as, but not limited to, the diameters of the helices, the pitch, and the number of cycles on each side from its center. For example, the diameter may range from about 5 cm to about 100 cm for residential composting apparatuses, and up to about 10 meters for commercial composting apparatus (e.g., used in a food manufacturing facility). In at least one embodiment, the ribbon impeller operates horizontally with respect to the central slicing plane 608.

Figure 7:
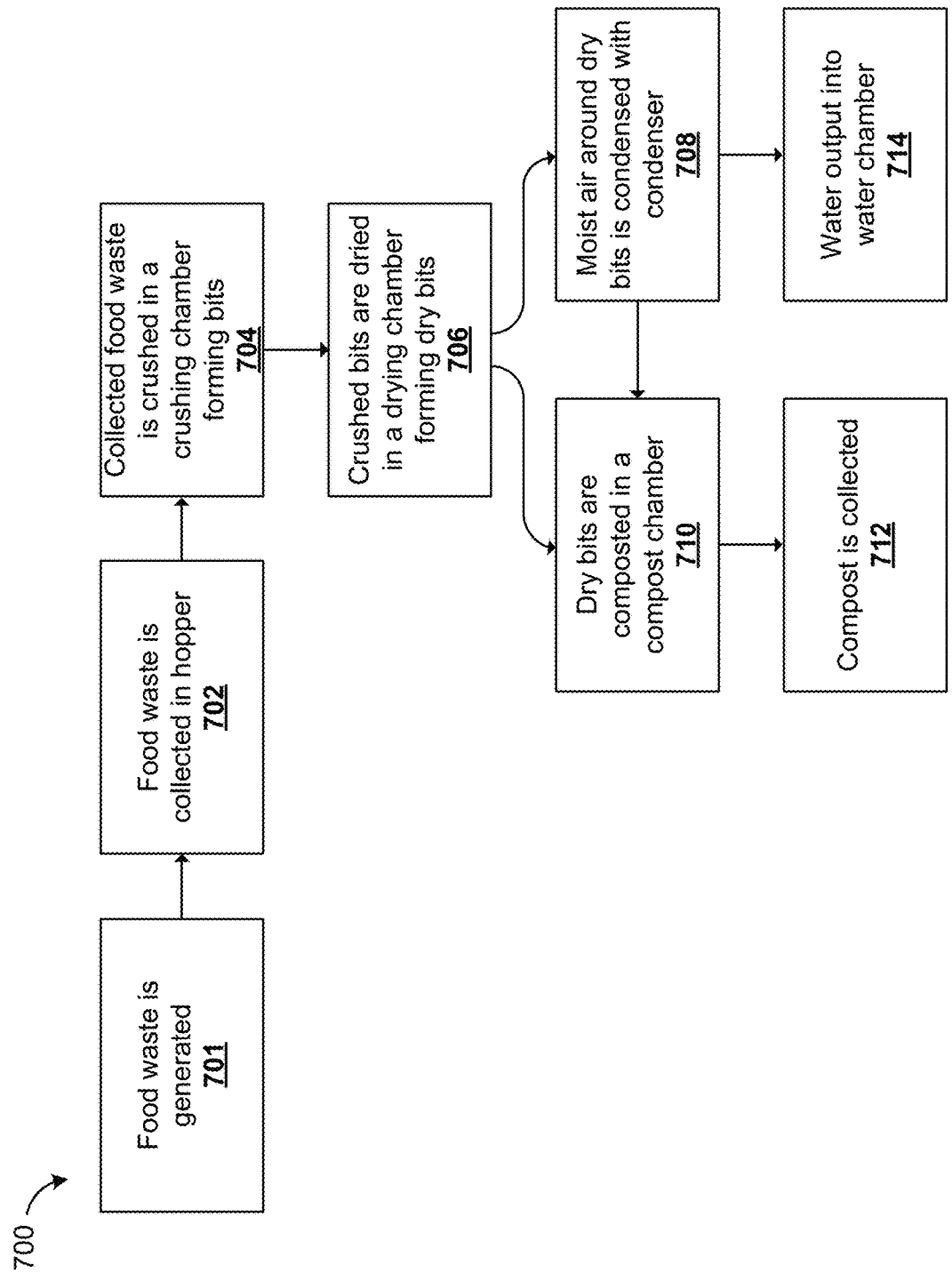
FIG. 7 is a process-flow diagram showing a method of producing compost, according to an example embodiment.

Referring now to FIG. 7, shown therein is a block diagram showing a method 700 of producing compost, according to an example embodiment. At 701, food waste is generated. At 702, food waste is collected. In one embodiment, the food waste is collected in a hopper (which may also be known as an input compartment or input storage compartment). At 704, the collected food waste is crushed to form bits using a suitable crushing component such as those described herein. In at least one embodiment, dewatering may also be performed at 704 by applying pressing, centrifuging and/or tumbling through a filter. At 706, the crushed bits can then be pre-treated inside the pre-treatment chamber continuously under controlled conditions (e.g., desired temperature, desired humidity, etc.) for a pre-treatment time period for dried food bits to be generated. Typically, close loop logic control based on temperature control or Relative Humidity control may be used to determine the time length of the pre-treatment time period. For example, during the composting stage water may be injected into the compost chamber if the conditions in the compost chamber are too dry. During a set period (ranging from at least one hour to one or more months), the dried bits can accumulate inside the pre-treatment chamber. After the set pre-treatment period, the dried bits may be transferred from the pre-treatment chamber to the compost chamber. In an alternative embodiment, at least some of the dried bits may also be further dried by condensing any moist air that surrounds the dried bits. From 706 and optionally 708, the method 700 proceeds to 710, where the batch of dried bits can then be composted for another set period, e.g., a compost period ranging from at least one hour to one or more months, inside the compost chamber. In an alternative embodiment, the dried bits can be pre-treated for a set period shorter than the total batch period and transferred into a pre-treatment storage compartment inside the pre-treat chamber, or into a separate chamber, such as chamber 806, chamber 916 and/or chamber 910, for example. Dried bits may be accumulated inside this compartment or separate chamber with multiple transfer cycles before all materials are transferred into the compost chamber once the batch period is over. For example, this transfer may occur every 24 hours based on daily routines, since the composting apparatus may be operated according to the user's daily cycle of being active and sleeping.

Figure 8:
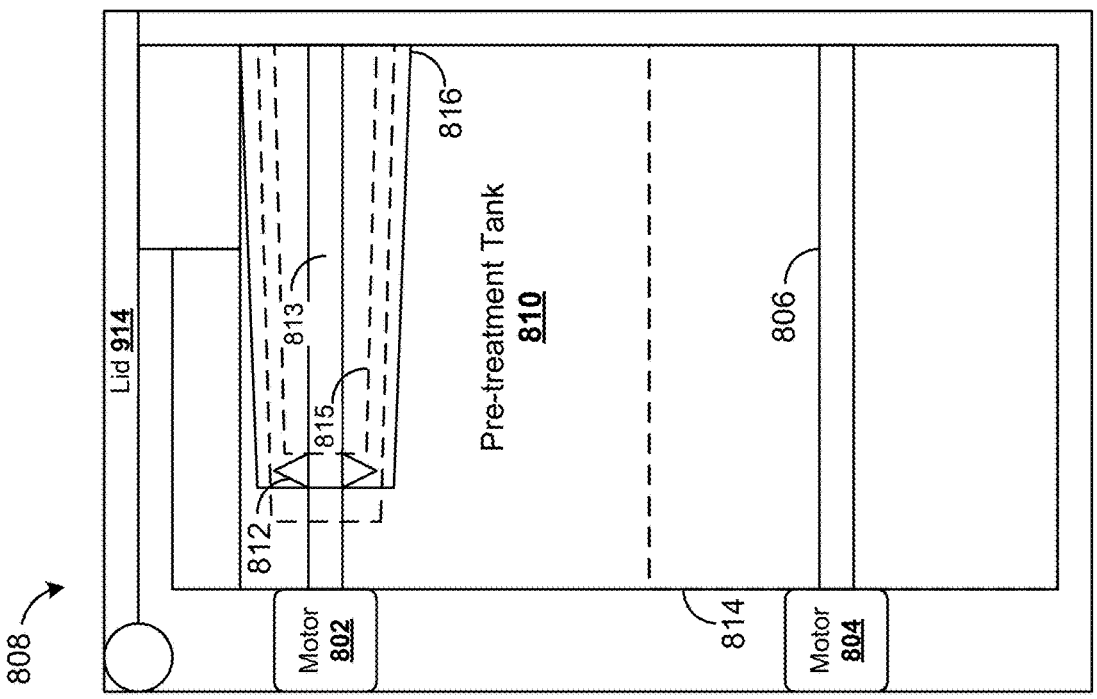
FIG. 8 is a side cross-sectional view of a portion of the composting apparatus, according to an example embodiment.

Referring now to FIG. 8, shown therein is a cross-sectional view of an example embodiment of a composting apparatus 808. The composting apparatus 808 include a pre-treatment tank 810, a first motor 802 coupled to a shaft 813 of a dewatering mechanism 812. The dewatering mechanism 812 may be situated within the pre-treatment tank 810. The dewatering mechanism 812 may include filters 815 (shown by dashed lines in FIG. 8) and the pressure increases from the right to left in the figure. Liquid will go through the filter 815 and through a flow channel 816 while the solids will flow into a waste collection chamber (which may also be called the pretreatment storage chamber). The compositing apparatus 808 further comprises a compost chamber 814. The compost chamber 814 may include a second motor 804 coupled to a shaft 806. In at least one embodiment, the second motor 804 may be used to drive the shaft 806 that has mixing pedals and/or blades attached to turn the pre-treated bits during the composting stage to avoid clumping of the pre-treated bits. The operation of the motor 804 may be modulated in a similar manner as the motor 802 although a different OFF/ON sequency may be used. The composting apparatus 808 may include the removable compost chamber 410 and the sensors, fluidic couplers and adaptors of the composting apparatus 400 and/or the impeller 600.

The shaft 806 may be connected to any one of, but not limited to, a mixer, a piston, a blade, a juicer, or any other suitable crushing, grinding, or pulverizing mechanism. The crushing, grinding, or pulverizing mechanism may be removably connected to the shaft 806 such that the mechanism may be interchangeable. For instance, an impeller may be used to crush the pre-treated waste, however a specialized crusher may be required for grinding hard foods such as bones or eggshells. As such, the mixer may be replaced with a blade crusher to crush hard foods. For example, the user can use different impeller attachments depending on the type of food. Alternatively, different attachments may be coupled to the shaft 806 so that can be selectively used depending on the function needed. For instance, a brush attachment may be coupled to the shaft 806 to clean the inside of the pre-treatment chamber.

Figure 9:
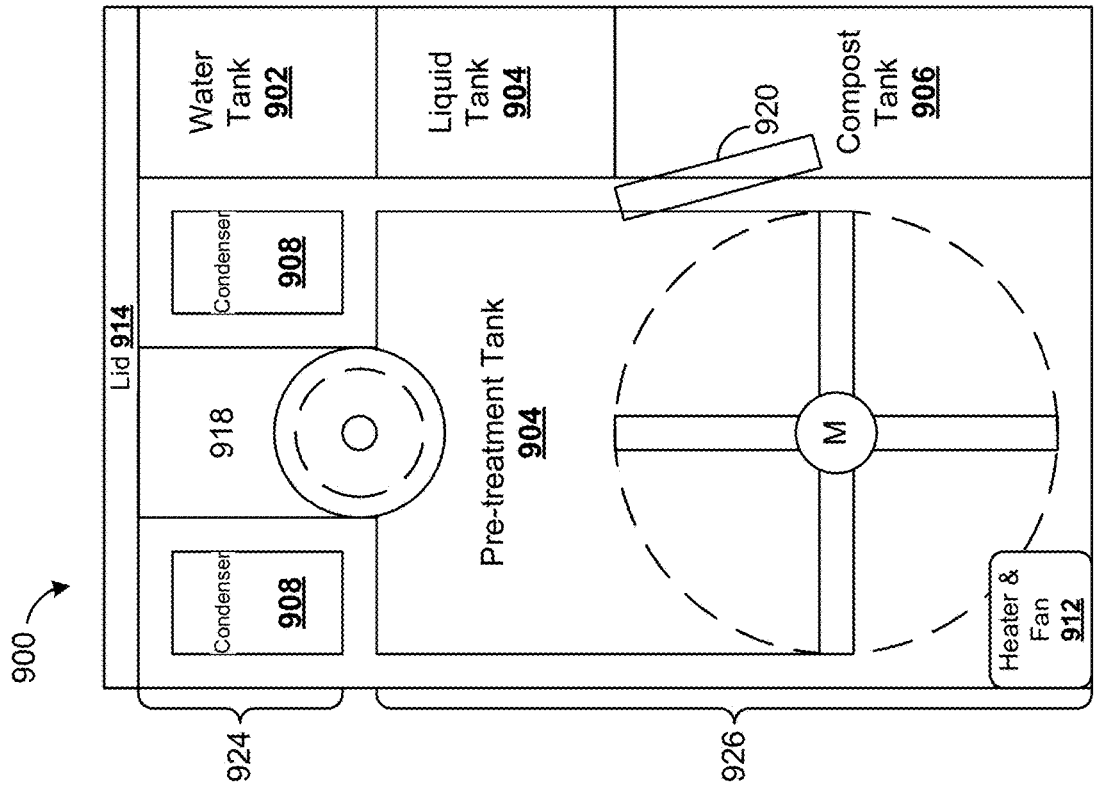
FIG. 9 is an end cross-sectional view of a composting apparatus, according to an example embodiment.

FIG. 9 is a block diagram of a composting apparatus, according to another example embodiment. In this embodiment, a composting apparatus 900 is shown. The composting apparatus 900 may include a water tank 902, a liquid tank 904, a compost tank 906, a condenser 908, a pre-treatment tank 910, a heater and fan 912, a lid 914, a first motor 916, a second motor 918 and a door 920. The composting apparatus 900 may include the removable compost chamber 410 and the sensors, fluidic couplers and adaptors of the composting apparatus 400, the impeller 600 and/or the dewatering mechanism 812. The condenser 908 may be a single unit that has a toroidal shape. In at least one embodiment, the condenser 908 may be replaced with an air filter.

The pre-treatment tank 910 may have an upper chamber 924 and a lower chamber 926. The upper chamber may have a lid 914 coupled thereto where the lid 914 can be opened so that the user can deposit food waste. The upper chamber 924 may also include the first motor 918. The first motor 918 can be removably coupled to a pretreatment device (not shown), which may be used during pretreatment for crushing, volume reduction squeezing, centrifuging for dewatering, or any operable combination thereof. The pretreatment device may be removed for cleaning purposes. For example, in at least one embodiment, the motor 918 may be coupled to a dewatering mechanism. The food waste that is deposited by opening the lid 914 can be pre-treated by the pretreatment device that is coupled to the motor 918. Post pre-treatment, the pre-treated bits may be transferred to the lower chamber. The lower chamber 926 may include the second motor 916 (e.g., the second motor 916 may be the same as motor 804 (e.g., the pre-treatment mixing motor)). The motor 916 may be coupled to an impeller or ribbon mixer 917. The impeller or ribbon mixer 917 can also be used as a transfer mechanism to transfer the compost through a door 920 that is situated at the center of a lower wall of the compost chamber 906. This may be done by the impeller or mixer transferring all particles toward the center of the compost chamber continuously. The composting apparatus 900 may optionally include the water tank 902 for storing clean water. In an alternative embodiment, a filter may be used instead of the door 920 where the filter has a screen that only allows particles of a certain size to pass through.

In at least one embodiment, the composting apparatus 900 may optionally include the liquid tank 904 for storing liquid or grey water. For example, in embodiments where dewatering is performed, as the crushed food waste is dewatered, liquid will come out and flow into the liquid tank 904. This liquid is not clear or pure like the condensed water that is in the water tank 902. Rather, this liquid may be referred to as liquid compost (also called compost tea). This liquid may be stored in the liquid tank 904 to be converted into liquid compost or compost tea or may be thrown out by the user periodically.

In at least one embodiment, the composting apparatus 900 may optionally include the condenser 908 with or without the liquid tank 904. The condenser 908 use either only a fan, or a fan and a Peltier element that has a hot side and a cold side where the hot side may be cooled by the fan. In such embodiments, as moist warm air passes from the bottom up to the condenser 908, the colder surface of the condenser 908 will cool the air resulting in water condensation that may then flow to the water tank 904. A fan may also be used to produce a temperature difference between a condensing block and the ambient air. The air comes into contact with the condensing block (usually a heat sink shape) and gets condensed.

In at least one embodiment, a sterilization sequence may be included to kill off pathogens. For example, UV lights may be included to provide disinfection/sanitation. The UV sterilization may be performed using UV lights inside the condenser or, in embodiments without a condenser, using UV lights inside air-filters that may be positioned where the condenser would have otherwise been located. In at least one embodiment, UV lights may also be placed above the liquid tank to prevent odor generation or molding. UV LEDs may be used to provide increased lifetime. UV lights may also be preferably sealed off so that they cannot be accessed by users who may otherwise damage them. In at least one embodiment, there may also be additional sterilization that is performed at the end of the composting cycle which may be done either by illuminating the compost with UV light from UV LEDs and/or exposing the compost to an elevated temperature of about 80 to 90° C. However, this may not be needed if the pathogen level is low in the composted material.

Figure 10:
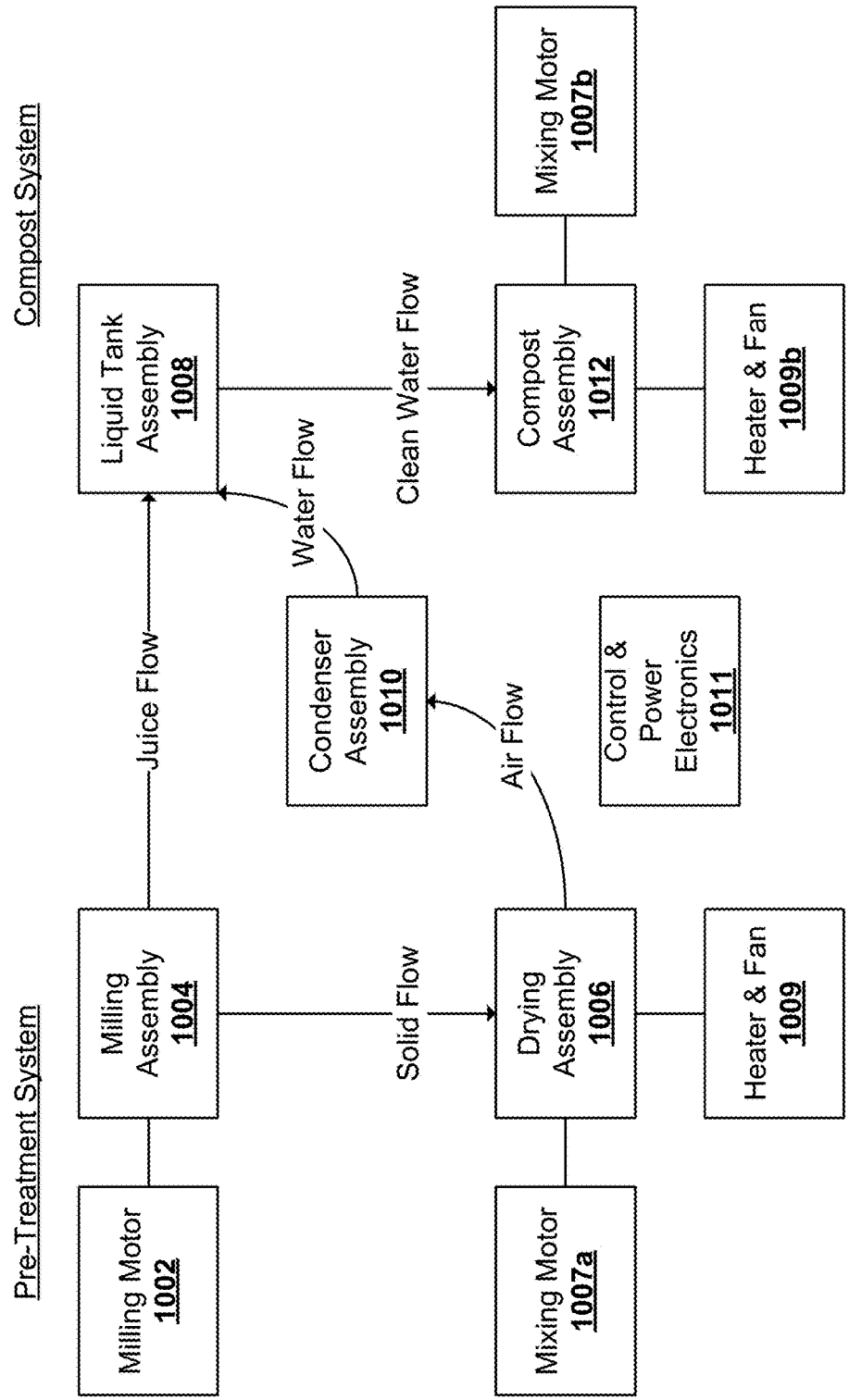
FIG. 10 is a process-flow diagram for a waste treatment process showing the interaction of various components of a composting apparatus according to an example embodiment.
Figure 11:
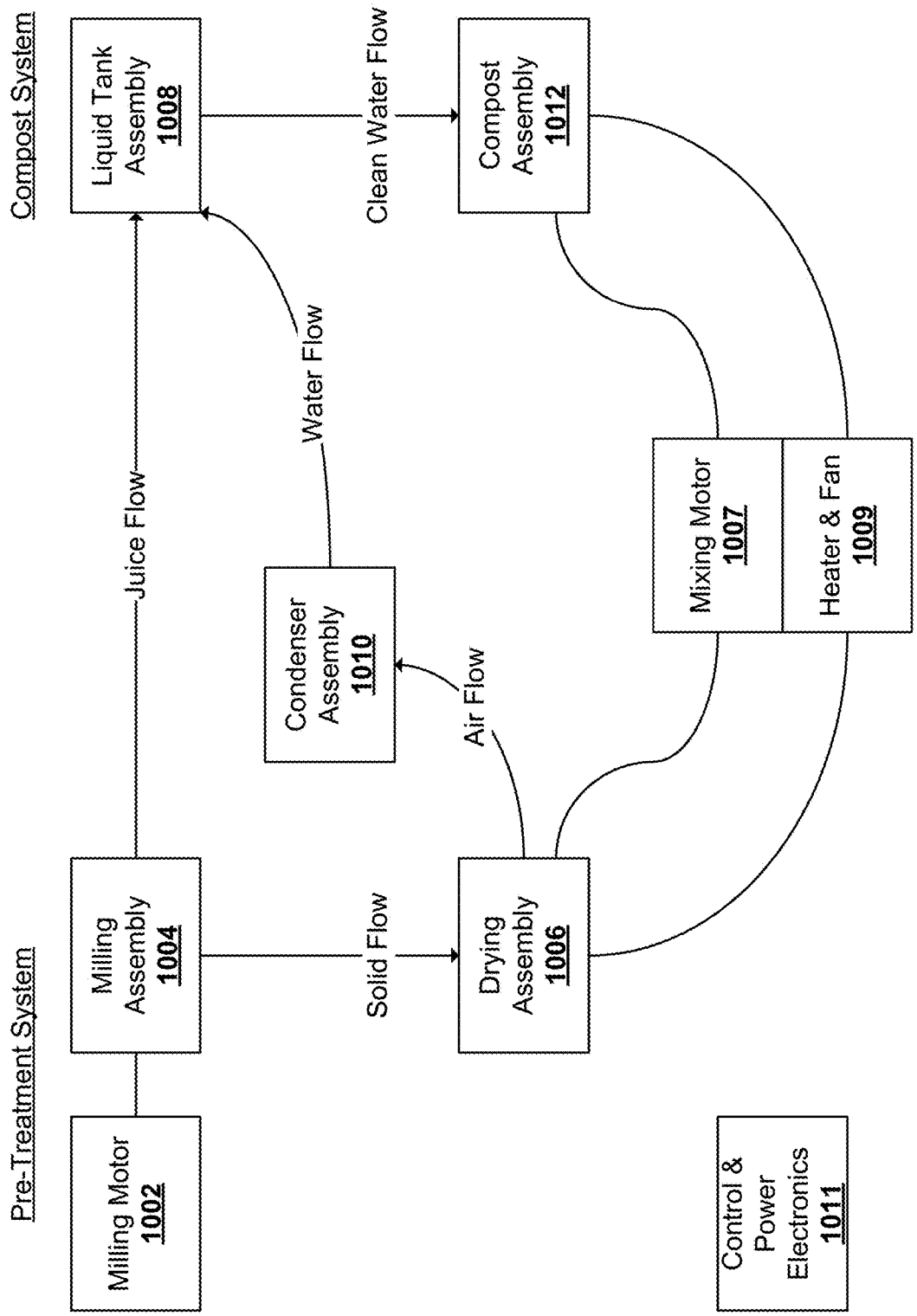
FIG. 11 is a process-flow diagram for a waste treatment process showing the interaction of various components a composting apparatus according to another example embodiment.

FIGS. 10 and 11 provide a process-flow diagram for a waste treatment process showing the interaction of various components a composting apparatus according to an example embodiment. The waste treatment process follows the process flow diagram, where food waste is pre-treated and composted in a two-stage process including a pre-treatment stage and a composting stage.

For good quality composting, the input to the composting stage may be roughly about 3 mm to about 5 mm in size and about 50% in water content. If the input waste is already at these conditions (e.g., if the input waste are coffee grounds from espresso machines, or carrot cake from juicing machines), the input waste was already pre-treated by other devices. In such cases, such input waste may be inputted directly into the composter to produce the output compost. For example, the input (e.g., hopper) of the composting apparatus may be connected to the ground waste output of a coffee machine or pulp waste output of a juicer, so that the coffee grinds or pulp automatically drops into the input of the composting apparatus. However, for other input food waste that hasn't been crushed and/or dewatered, such input food waste undergoes the pre-treatment processing steps otherwise it may be difficult for effective aerobic composting to take place during the composting stage.

The pre-treatment stage may follow a sequential or simultaneous flow. In a simultaneous flow, new input waste is mixed continuously with pre-treated waste. In at least one embodiment, the pre-treatment steps can be executed in a sequential manner.

During pre-treatment, input food waste undergoes a volume reduction step where crushing, or milling, or grinding, or mulching processes are performed using the milling assembly 1004 and milling motor 1002. For example, as food waste passes through the chamber where it is crushed, it can then be milled, then cut and then grinded. The volume reduction step ensures a reduced overall volume, increased bulk density, and reduced individual particle sizes.

In at least one embodiment, a dewatering step can be optionally performed, where liquid molecules surrounding food waste particles are mechanically removed via pressing, tumbling or centrifugation. This results in a reduction of the bulk moisture content. The removed liquid follows the juice flow to the liquid tank assembly 1008. Optionally, dewatering may be applied during the milling step as milled food waste bits are pressed as they are milled and crushed. Optionally, any grey water that is output from the dewatering step may go through a filter such as a metal mesh. The filtered water may then flow into the liquid tank assembly 1008 to be stored. The liquid tank assembly 1008 may include a combination of a water tank and a liquid tank.

Simultaneously to dewatering or alternatively to dewatering, the food waste particles may be dried using a drying assembly 1006, operated by a heater (optional) and fan 1009*a*. The drying step includes using (hot) air to convectively remove moisture from the food waste particles as the (hot) air passes around the surface of the food waste particles and evaporates water into water vapor. This step further reduces the bulk moisture content of the food waste bits, turning food waste bits into drier bits.

A mixing process using mixing motor 1007*a* may also take place during this convective drying stage where the food waste bits are homogenized constantly so that the decrease in moisture content is homogenous across the batch.

In at least one embodiment, the pre-treatment steps may happen simultaneously as new food waste inputs are added into the composting apparatus and travel through various elements of the pre-treatment stage. In at least one embodiment, a condenser assembly 1010 may be used to provide airflow to the drying assembly. The dried bits may then be transferred to the compost chamber 1012. The compost chamber 1012 may include a mixing motor 1007*b* and/or a heater and fan 1009*b*.

At the composting stage, a favorable condition for microbes in the compost chamber 1012 to digest the dried food waste bits is created. For example, natural microbes may be used such as, but not limited to, the Bacillaceae, Enterobacteriaceae, and Oxalobacteraceae microbe families. For example, in this stage, hot-air may be caused to flow through the dried bits to ensure ample oxygen for the aerobic decomposition process, while a desirable moisture content level is maintained through sporadic injection of water spray or mist onto the dried waste bits, so as to form a thin film of water that wraps around the waste bits, creating a desirable local environment for the microbial species to habituate and multiply. In some cases, the microbes are provided by the input waste that is provided by the user. To maintain ample airflow through the batch, a constant mixing may be used so as to break-up clumping particles with varying particle sizes into smaller sized particles, and create pathways for air to flow through, removing water vapor and supplying fresh air with oxygen. The operational parameters used to provide a favorable condition for the microbes may be determined through experimentation and may vary depending on the type of food waste that is deposited in the composting apparatus.

Clean water inside the liquid tank assembly 1008 may be used for the composting stage inside the compost chamber 1012. Clean water may be atomized or sprayed onto the previously dried bits as they are turned by the mixer or impeller, which is actuated by a mixing motor 1007*b*. A heater and a fan 1009*b* can supply hot air that flows through the compost chamber 1012 constantly for removing excessive water vapor and supplying oxygen to the microbes that reside on the surface water thin film of the dried bits. Alternatively, in at least one embodiment, the fan may be continuously operated, and the heater is turned on only when the temperature drops below a compost temperature threshold to produce good quality compost. Although, it may not be necessary that the air is always hot.

FIG. 11 depicts functional mechanical and electrical blocks with flow direction for three phases of food waste processing in an example embodiment. A milling electric motor may be used to generate torque that is employed for the volume reduction operation. Once complete, the milled solids will transfer to the drying assembly where convective drying takes place with constant mixing. Accordingly, a mixing motor may be run intermittently during mixing cycles during the convective drying step to prevent dewatered food from clumping/adhering together. However, in some cases drying cycles may be optional and independent from the mixing cycles. A heater and fan may be used to generate hot air flow to warm the particles up to their wet temperature for evaporation of surface water into water vapor. This airflow then travels through the pre-treatment chamber into the condenser assembly, where water vapor condenses into liquid water due to a temperature gradient. This water then flows into the liquid tank assembly. The relative humidity of the hot air drops during the condensation step. The output air may then be made to flow back into the drying assembly for recirculation.

In at least one embodiment, the mixing motors 1007, heaters and/or fans 1009 may be used for both the drying assembly and the compost chamber 1012, as shown in FIG. 11. In other words, the one set of motors, heaters and/or fans may be used for both the pre-treatment chamber and the compost chamber.

Figure 12:
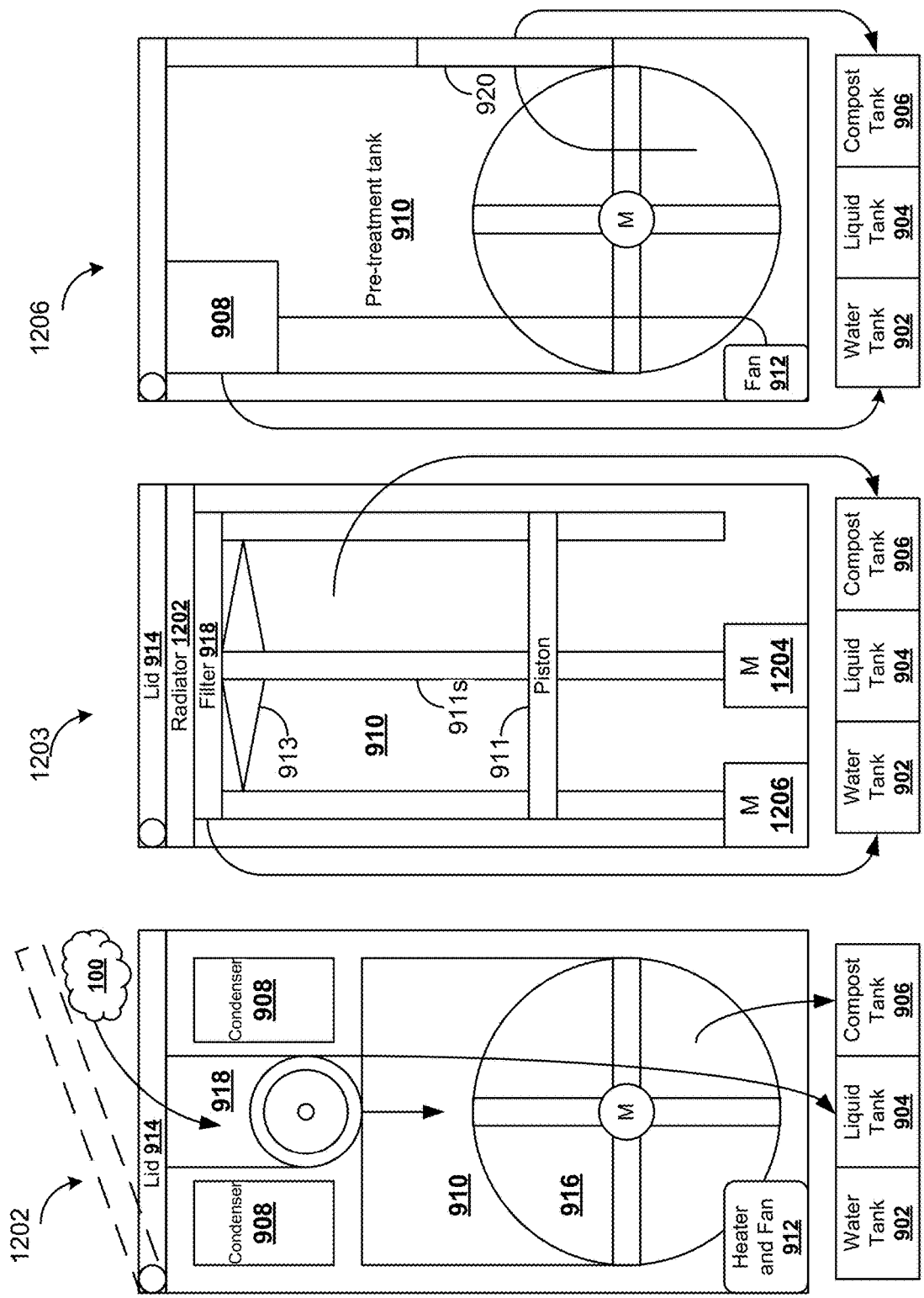
FIG. 12A is a block diagram of a composting apparatus according to an example embodiment.
FIG. 12B is a block diagram of a composting apparatus according to another example embodiment.
FIG. 12C is a block diagram of a composting apparatus according to another example embodiment.

FIG. 12A provides a block diagram of a composting apparatus 1202 according to an example embodiment. The relative locations of the functional chambers or tanks are depicted in FIG. 12A. Food waste inputs 101 are added into the apparatus 1202 when the top lid 914 opens. As the lid 914 closes, the milling motor 918 operates to transfer food waste inputs 101 towards a milling blade (not shown). As the food waste 101 passes through the milling blade, the food waste inputs 101 are milled into smaller size particles and are optionally dewatered due to a higher pressure generated as they pass through the milling blade and are pressed together. The dried bits fall down into the drying assembly 916, and the juice flows into the liquid tank 904. The dried bits are then convective dried using the heater and fan 912 to reach a desirable level of moisture content within a set amount of time. This process can be repeated at any frequency such as multiple times a day, or multiple times a week, or depending on the requirement of the user.

FIG. 12B is a block diagram of a composting apparatus 1203 according to another example embodiment in which the composting apparatus 1203 can include a radiator 1202, a motor 1204 and a filter 918. Motor 1204 is connected to shaft 806 which is coupled to a piston 911. The head of the piston 911 is labeled "Piston" and it has a vertical shaft 911*s*. The shaft 911*s* is a screw-like shaft and the piston 911 is mounted to the shaft 911*s* such that the piston 911 may move up and down depending on which direction the shaft 911*s* is rotated. Food waste inputs 101 are added into the composting apparatus 1203 when the lid 914 opens. As the lid 914 closes, the motor 1204 operates the piston 911 to apply mechanical pressure and also to transfer food waste inputs 101 towards a milling blade 913. As the food waste 101 passes through the milling blade 913, the food waste inputs 101 are milled into smaller size particles to form pre-treated bits. Dewatering is realized through the mechanical pressure created by the piston 911. Accordingly, the new input food waste gets crushed at the milling blade 913 as the piston 911 moves upward while also applying pressure for dewatering and the milling blade 913 may direct the pre-treated bits towards and out a trap door to the compost chamber. Alternatively, or in addition thereto, the piston 911 may aid in transferring the pre-treated bits into the compost chamber. Afterwards, as the piston 911 moves downward, more new input food waste is received, and this cycle is repeated as the piston 911 moves upward again. In some cases, the upper portion of the pretreatment chamber 910 may be tilted so as to allow liquid to pass through and flow into the liquid tank 904 through the filter 918 after crushing and dewatering and the tilted orientation also allows the pretreated solids to pass through a trap door (not shown) on the side of the pretreatment chamber 910 to be transferred into the compost chamber (not shown).

FIG. 12C is a block diagram of a composting apparatus 1206 according to yet another embodiment. Food waste inputs 101 are added into the composting apparatus when the top lid 914 opens. As the lid 914 closes, the motor M operates the grinding apparatus, which may be a mixer (not shown). As the food waste 101 passes through the mixer, the food waste inputs 101 are grinded into smaller size particles to form pre-treated bits. Dewatering may also be done through adding dry material into the pre-treatment tank 910 such as soil, paper products, wheat bran, or previous batches of pre-treated bits.

The pre-treated dried bits may then be stored inside the pre-treatment tank 910 to be transferred into the compost chamber 906. As the water vapor gets condensed inside the condenser after they travel from the bottom of the drying assembly, the may water flow into the water tank 902 to be stored for composting stage. The condenser may be implemented in a similar manner as the condenser 908 in FIG. 12A.

After a set period of time, or as the last batch of pretreatment is completed, the pre-treated bits may be transferred into the compost chamber 906. In one embodiment, a door 920 can be used, and the pre-treated bits may be transferred using the mixing mechanism as explained earlier. Optionally, a ribbon impeller mixer may be used to both mix and transfer pre-treated bits into the compost chamber 906.

The composting stage takes place inside the compost chamber 906. It may take any number of days for the pre-treated bits to mature into mature compost that may be outputted. Once the composting stage is complete, the compost chamber 906 may be detached from the main device body, and compost may be transferred as output of the composting apparatus. An example embodiment of the removeable compost chamber is shown in FIG. 6. In one embodiment, the liquid tank 904 and the water tank 902 may also be detached from the main device body, perhaps for cleaning and/or maintenance, and then reattached again. In at least one embodiment, the liquid tank 904 may be used to store waste water from cleaning cycles. In another example, there may be a condensation storage chamber into which condensed water flows into. The condensation storage chamber may either have an opening to receive water or has a check-valve to establish flow when inserted into composting apparatus. Either way, the condensation storage chamber may be pulled out by hand horizontally. Once the water is emptied, the user can push the condensation storage chamber back into the main device body.

Figure 13:
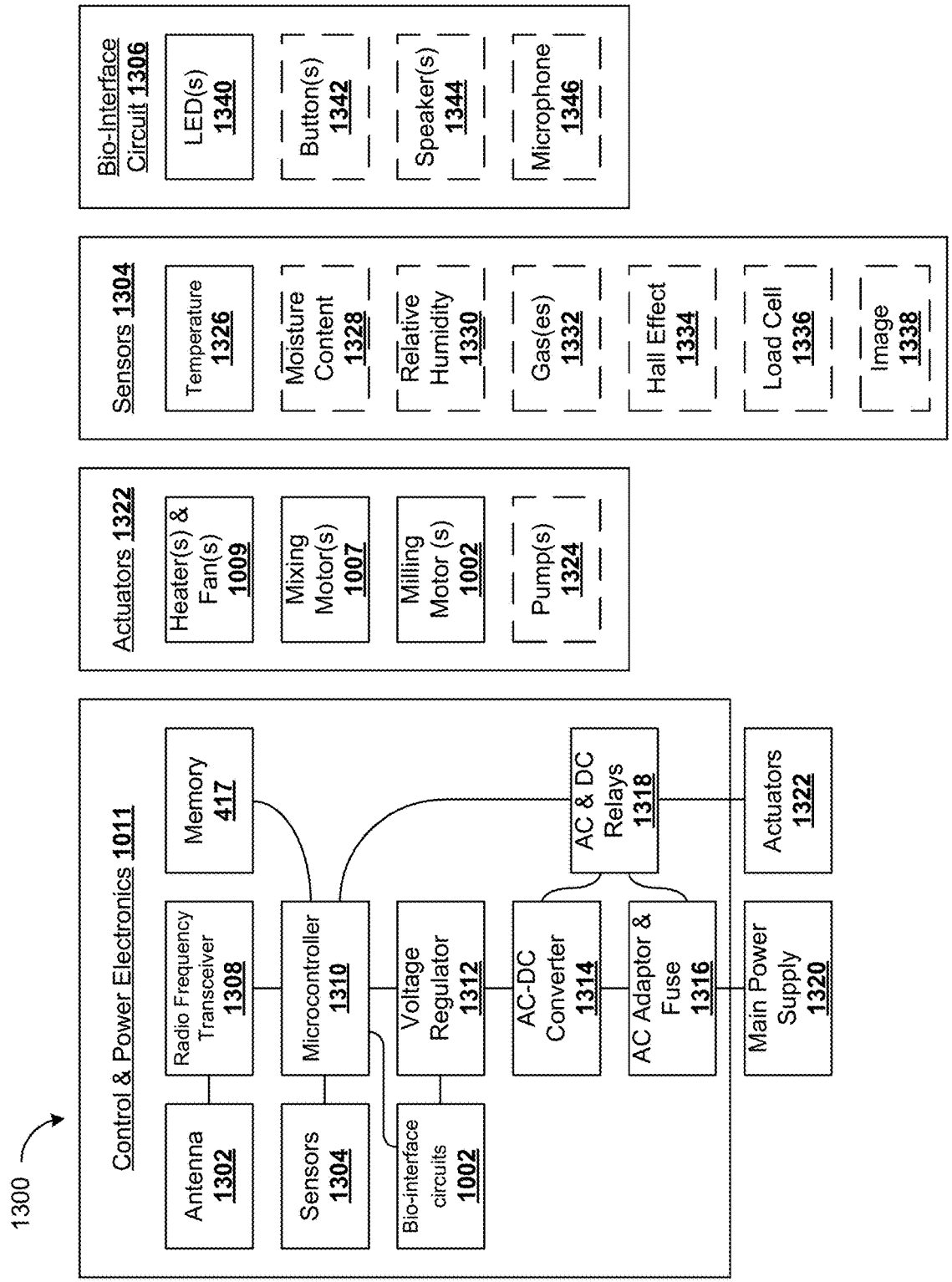
FIG. 13 is a block diagram of the hardware components of a composting apparatus according to an example embodiment.

Referring now to FIG. 13, shown therein is a block diagram of the hardware architecture 1300 of a composting apparatus according to an example embodiment. The hardware architecture 1300 generally includes control & power electronics 1011, actuators 1322, sensors 1304 and a bio-interface circuit 1306.

The control & power electronics 1011 supplies power to the composting apparatus and controls the operations of various components. Power is supplied through the mains power supply 1320 to the AC adaptor and fuse 1316. An AC-DC converter 1314 is used to convert AC voltage into DC voltage. This DC voltage is then regulated by a voltage regulator 1312 to power various electronics such as a microcontroller 1310 (which may be the same as the processor 416 of FIG. 4) and the bio-interface circuit 1306. Alternatively, in at least one embodiment, a battery pack may instead be used to provide power. Alternatively, the battery pack may also be included to provide backup power. AC & DC relays 1318 may be used to control the actuators 1322 inside the composting apparatus. The sensors 1304 are communicatively coupled to the microcontroller 1310 to transmit sensed data to be processed and/or stored. The memory 417 can be used to store a real-time operating system and programs for controlling and/or analyzing certain aspects of the pre-treatment and/or composting process.

The composting apparatus may also communicate with external devices via radio frequency transceiver 1308 and antennas 1302. In another embodiment, network hardware may be additionally included for communication to devices connected to a wired network. In another embodiment, the composting apparatus may include both the radio and the network hardware.

Actuators 1322 inside the composting apparatus may include, but are not limited to, heaters and fans 1009, mixing motors 1007, a milling motor 1002 and pumps 1324. The operation of these actuators 1322 have been provided in the description of various embodiments of composting apparatuses and composting processes described herein.

Sensors 1304 inside the composting apparatus comprises of, and are not limited to, a temperature sensor 1326, a moisture sensor 1328, a relative humidity sensor 1330, a gas sensor 1332, a hall effect sensor 1334, a load cell 1336, and an image sensor 1338. In at least one embodiment, there may be multiple gas sensors 1332, multiple hall effect sensors 1334, multiple load cells 1336, and multiple image sensors 1338, The hall effect sensor 1334 is magnetic detector that recognize the presence of magnets and gives a binary output or linear output based on distance. The hall effect sensor 1334 may be used to determine if a device is in position or not. The load cell 1336 converts a mechanical load signal into an analog signal, typically a voltage level, which can then to read by the microcontroller 1310 to measure weight of an item. For example, the amount of food waste input inside the hopper, the pre-treatment storage chamber, and/or compost chamber may be weighed. In at least one embodiment, the image data may be obtained to record videos and image sequences to allow the user or another individual to observe a time-lapse of the composting process. The operation of the sensors 1304 have been provided in the description of various embodiments of composting apparatuses and composting processes described herein.

The bio-interface circuit 1306 includes, but is not limited to, light emitting diodes (LEDs) 1340, buttons 1342, speakers 1344 and microphone 1346. The bio-interface circuit

1306 can be used for communication with the user of the composting apparatus. For example, the LEDs 1340 may be used to visually communicate with the user should as visually indicating status and/or operational errors. Similarly, the speakers 1344 may be used to provide audio messages to the user regarding status and/or operation. The user may use the buttons 1342 and the microphone 1346 to provide inputs or control instructions to the composting apparatus.

The microprocessor 1310 may be a dual core microprocessor and the memory 417 stores software instructions for implementing a Real-Time Operating System (RTOS) framework. This allows for independent sequences (which implement tasks in RTOS terms) to be performed asynchronously meaning that the sequences may be started, executed and end through logic checks that are specific to the task at hand and incorporated a timing component, such as elapsed time. This allows, for example, each process (i.e., asynchronous computer program sequence) may have a time limit and therefore have a timed countdown that is performed to determine which the sequence should be ended. For example, the pre-treatment process may have a time limit of about 24 hours, the composting process may have a time limit of about 7 days, and the crush sequence may have a time limit of about 5 minutes. However, other time limits may be used in some cases. Some of the sequences may be timed to follow one another, while some of the sequences may be performed in parallel as described previously. The microprocessor 1310 may provide a clock that is used to count time for timing the various sequences. Alternatively, a real-time counter may be used to count time.

The RTOS implementation takes the hardware implementation into account. For example, if the overall number of actuators and sensors that are used in the composting apparatus are reduced, then it may be possibly to execute simpler embedded sequences for pre-treatment and composting. However, there may also be embodiments in which more sophisticated sensors may be used which can sense multiple conditions (e.g., temperature, RH) and/or detect particular items (e.g., gases.) that requires more sophisticated RTOS sequences that may need higher processing power.

In addition, there are looped sequences that are running simultaneously to implement closed loop control logic, which may include, but is not limited to, temperature control logical loops for use during the pretreatment and composting sequences. The temperature control logical loops can use different timing for the pretreatment and composting sequences. In such looped sequences, sensor input data (e.g., sensor readings) obtained by certain sensors may be used to toggle switches (e.g., MOSFETs) that are coupled to actuators to turn the actuators on or off according to the closed loop control logic. Some sensor input data may also be used to control the duration that these actuators are ON or OFF. For example, a load cell may be used to obtain sensor data that is used to determine the weight of the input waste. The weight of the input waste may be used to determine the moisture content in the input waste. The moisture content in the input waste may then be used to determine how much water may be injected by a sprayer in the pre-treatment stage.

In addition, user inputs may be provided when the user interacts with the bio-interface circuit 1306 and these user inputs may be used to start or stop one or more of the asynchronous sequences. For example, the user may press a button on the main device housing that provides user input to run the crushing sequence. Alternatively, the user may press another button which closes the lid which in turn triggers the hall effect sensor 1334 to automatically start the crush sequence. For example, a magnet may be attached to the lid, and when this lid is closed, the magnet comes into close proximity to the hall effect sensor, which sends a signal to the processor as a trigger. Similar operations may be performed during the or composting process such as, but not limited to, the situation in which the compost chamber is put back inside the main device body, which may be sensed by another hall effect sensor 1334 which then automatically starts a computer program sequence that allows pre-treated bits to be transferred into the compost chamber thereby starting the next composting cycle.

The bio-interface circuit 1306 may also provide status signals to certain components on the exterior of the main device housing, such as LEDs 1340 and/or speakers 1344 to provide a status identifier to the user to indicate an operational status of the composting apparatus. For example, status identifiers may be used to indicate when a particular tank is full, such as the water tank or liquid tank, when a compost cycle is finished, when a pretreatment cycle is finished, when jamming has occurred, whether the composting apparatus is connected to wifi, a mobile phone, or an LTE network, and when other error modes are detected such as when an unfavorable composting condition is detected.

Figures 14A, 14B:
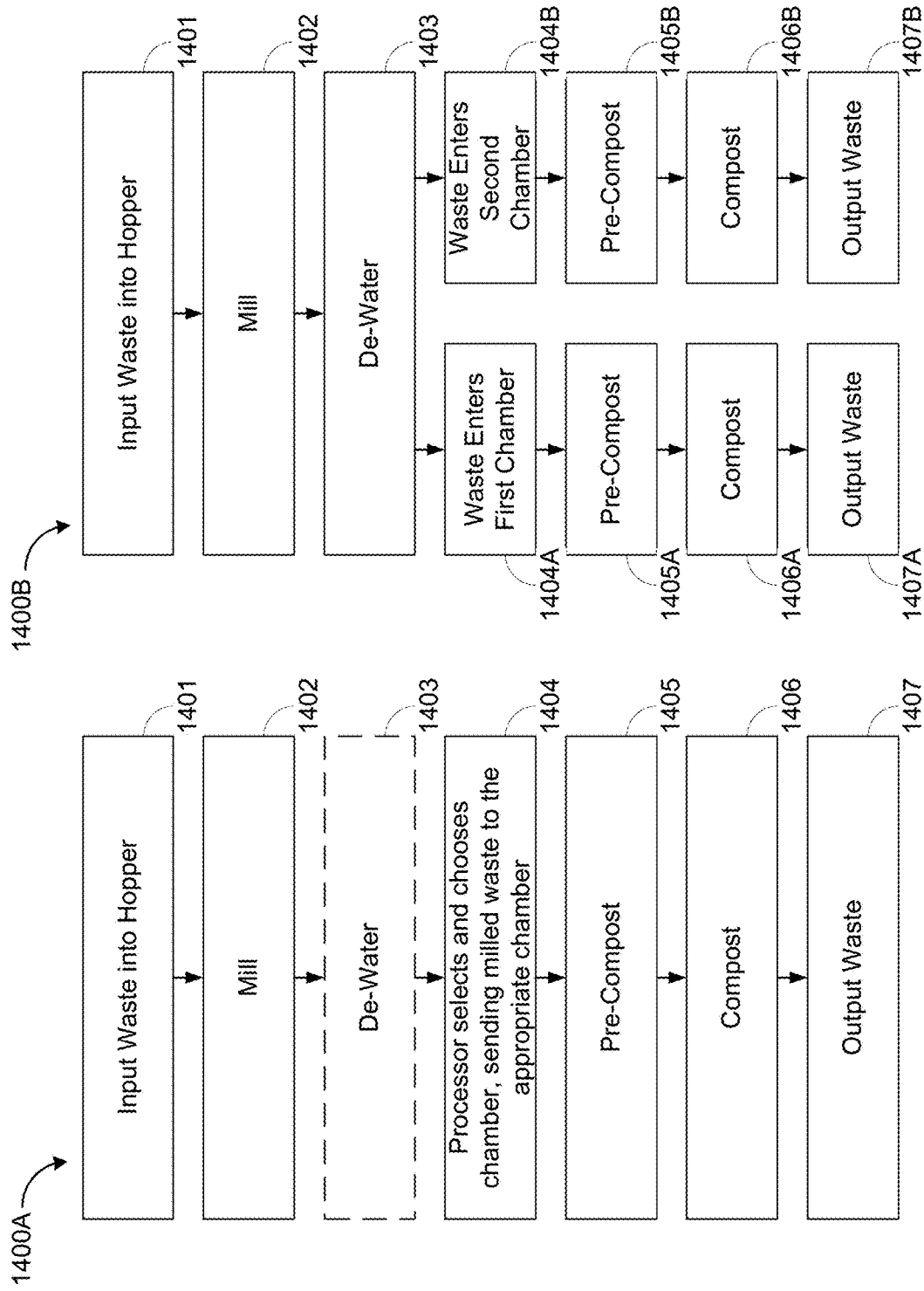
FIG. 14A is process-flow diagram showing a method of producing compost, according to an example embodiment.
FIG. 14B is process-flow diagram showing a method of producing compost, according to an example embodiment.

Referring now to FIGS. 14A and 14B, shown therein is a process-flow diagram showing a method 1400A of producing compost, according to an example embodiment. The use of method 1400 depends on the architecture of the composting apparatus. In this embodiment, a plurality of compost chambers can be located within the composting apparatus. At 1401, waste is input into the composting apparatus. At 1402, the volume of solid input waste can be milled, ground up, or mulched to reduce individual particle size in the volume of solid waste. At 1403, the milled waste can be dewatered.

In at least one embodiment, the dewatering step 1403 can be optionally performed, where liquid molecules surrounding food waste particles are mechanically removed via pressing, tumbling or centrifugation. This results in a reduction of the bulk moisture content. Optionally, dewatering may be applied during the milling step as milled food waste bits are pressed as they are milled and crushed. Optionally, any grey water that is output from the dewatering step 1403 may go through a filter such as a perforated metal mesh. The filtered water may then flow into the liquid tank assembly to be stored. The liquid tank assembly may include a combination of a water tank and a liquid tank.

At 1404, the milled waste can enter the appropriate composting chamber. In at least one embodiment, a processor can be used to determine which of the plurality of chambers is most suitable for the input waste. Alternatively, a user may select the chamber by directly moving an object, such as a dam, or using a control element to move the dam to direct compost to the chamber selected by the person. For instance, in one example, a user may input waste into the composting apparatus, and once the input waste is milled, the processor may determine and send the waste to a first chamber for composting. Subsequently, if the user again inputs waste into the composting apparatus, the processor may determine and send the waste into the second chamber. The processor selection criteria may be based on reasons, including but not limited at least one of the plurality of chambers being full, at least one of the plurality of chambers being unable to accept further waste, at least one of the plurality of chambers being in an inoperable state, at least one of the plurality of chambers being currently used, at least one of the plurality of chambers being in the middle of a composting sequence, and any other reason that may improve the efficiency of the composting device. For example, in one embodiment, the plurality of chambers may be operable in offset cycles. Therefore, as a first chamber is beginning the compost stage, the processor may determine to begin collecting the input waste into a subsequent compost chamber. In one embodiment, there can be one chamber at each stage of the composting process, including but not limited to, pre-composting 1405, composting 1406, and outputting waste 1407.

Referring now to FIG. 14B, shown therein is a process-flow diagram showing a method 1400B of producing compost, according to another example embodiment. The use of method 1500 depends on the architecture of the composting apparatus. In method 1500, the waste may enter a first chamber at 1404A, or a second chamber at 1404B, for one of the reasons described previously. The subsequent steps of the method 1500 may be carried out independently in each chamber. At 1405A and 1405B, the input waste may be pre-treated. At 1407A and 1407B, the output compost is generated. The steps of the method 1500 can occur as described herein.

The cycle times for each of the plurality of chambers may be offset in order to improve efficiency. In at least one embodiment, the cycle times may include an input storage cycle time, a pre-treatment processing cycle time, a post-treatment storage cycle time, a composting cycle time, a post-composting storage cycle time that occur temporally in the order given. In some cases, one of these cycles may be optional. For example, depositing the amount of waste at 1401 can be done multiple times per day. Any amount of input waste up to a certain limit depending on the capacity of a given chamber of the composting apparatus may be deposited at any time by the user. For instance, the user may first deposit a banana peel; three hours later deposit some rice; and two hours later deposit a broccoli stalk. Therefore, the user does not have to batch collect the waste in order to make a large deposition to the composting apparatus. Rather, the user can deposit even a small amount of input waste if they wish.

The pre-treated waste can be converted into compost at 1406A and 1407B. At 1407A and 1407B, the composted material can be provided as a batch of output compost for each chamber. Alternatively, the composted material from the plurality of chambers may be collected as intermediate compost that is then gathered together following successive composting cycles to produce the batch of output compost that is provided once per batch period.

Figure 15:
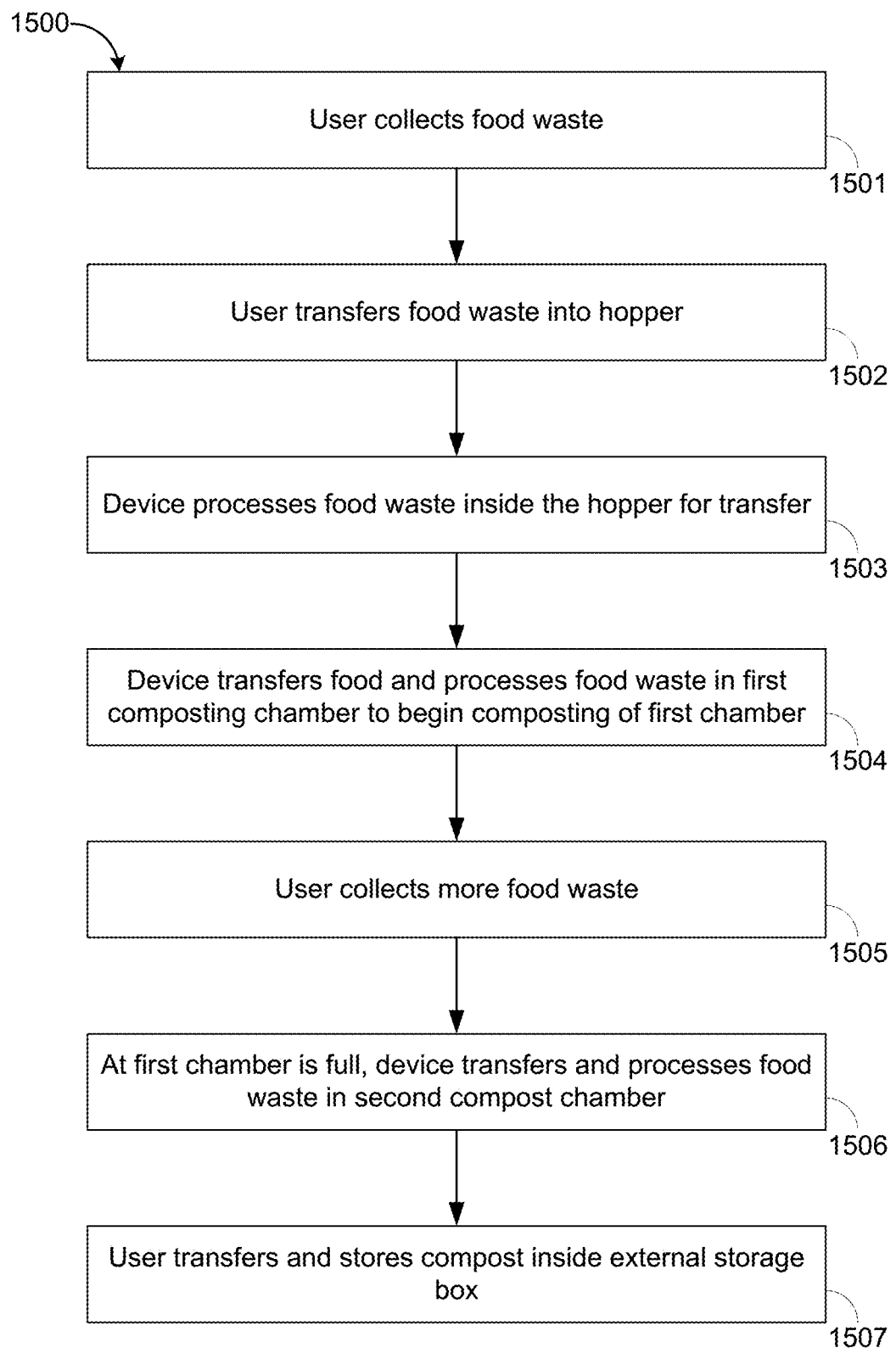
FIG. 15 is a process-flow diagram showing a method of producing compost, according to an example embodiment.

Referring now to FIG. 15, shown therein is a process-flow diagram showing a method 1500 of producing compost, according to an example embodiment. At 1501, a user can generate an amount of food waste. For example, the user may generate food scraps during meal preparation, meal leftovers, beverage leftovers, gardening or another other form of organic material generation. The user may collect the scraps into a container to collect. At 1502, the user can transfer the collected amount of food waste into a hopper of the composting apparatus. Alternatively, the user may enter scraps directly into the hopper of the composting apparatus. At 1503, the device can process the food waste inside the hopper for transfer. A processor, or the user, as previously described, can then determine which of the plurality of chambers the food waste should enter, based on a given criteria. At 1504, the device transfers the processed wood waste into one of the plurality of composting chambers to begin composting. In the meantime, the user may collect more food waste and transfer the food waste into the hopper. The processor can determine which of the plurality of chambers the second amount of food waste should enter. For example, if the first chamber is full, at 1506, the composting apparatus may push the food waste to a subsequent chamber. The various composting cycles described previously are performed in the various chambers. Once the composting cycles are complete for a given chambers, the user can obtain the output compost from the given chamber.

Figure 16:
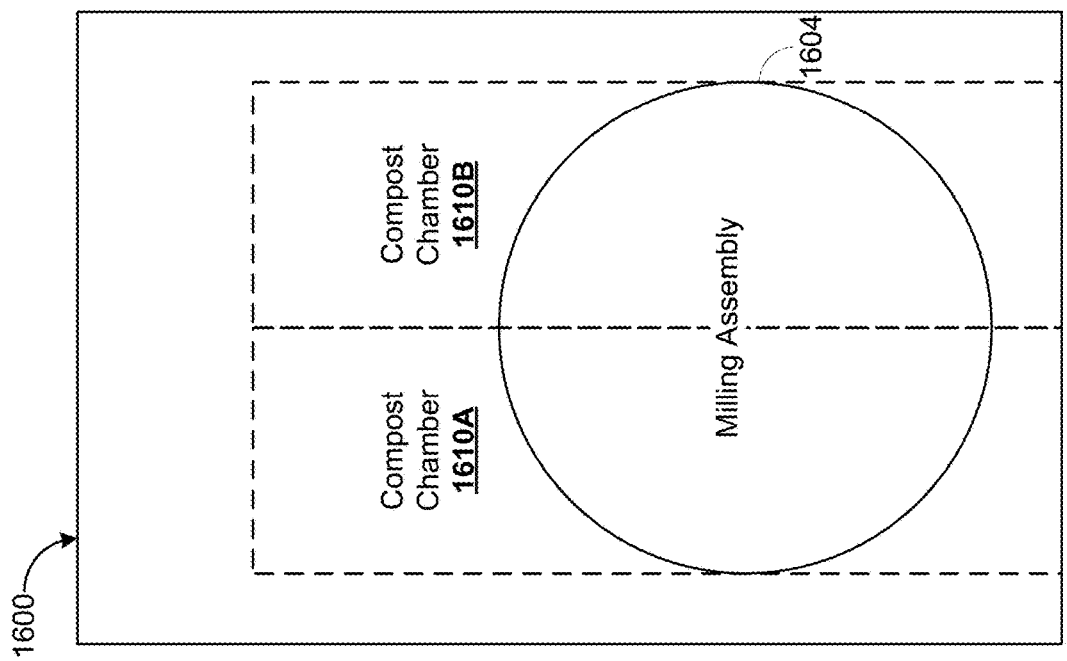
FIG. 16 is a top view of a block diagram of a composting apparatus according to another example embodiment.

Referring now to FIG. 16, shown therein is a top view of a block diagram of a composting apparatus 1600 according to another example embodiment. In this embodiment, the composting apparatus 1600 comprises a main device body 1606. The composting apparatus 1600 further comprises a first compost chamber cavity located within the main device body 1606; a first compost chamber 1610A for performing composting of waste, the first compost chamber being located in the first compost chamber cavity, a second compost chamber cavity located within the main device body, adjacent to the first compost chamber cavity; and a second compost chamber 1610B for performing composting of waste, the second compost chamber being located in the second compost chamber cavity. The composting apparatus 1600 further comprises a milling assembly 1604. For example, as food waste passes through the milling assembly 1604, where it is crushed, it can then be milled, then cut and then grinded. The volume reduction step ensures a reduced overall volume, increased bulk density, and reduced individual particle sizes.

Figure 17:
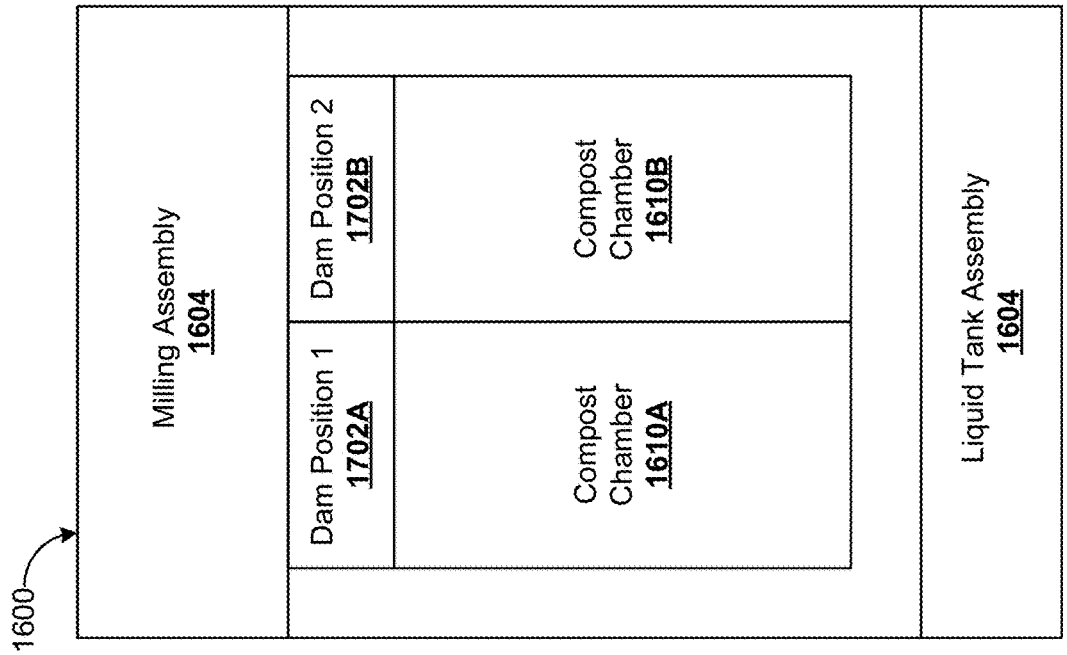
FIG. 17 is a front view of a block diagram of the composting apparatus of FIG. 16.

Referring now to FIG. 17, shown therein is a front view of a block diagram of the composting apparatus 1600. In this embodiment, the composting apparatus comprises a dam assembly having a dam 1702 (see FIG. 18) that is moveable between a first position 1702A and a second position 1702B. The first position 1702A of the dam 1702 covers the first compost chamber 1610A, and the second position 1702B of the dam 1702 covers the second compost chamber 1610B. A processor can be communicatively coupled the actuator that is connected to the dam 1702 to actuate the dam 1702 between the first and second positions 1702A and 1702B. Alternatively, the user may manually move the dam 1702 between those positions or interact with a control element, such as a switch, which then activates the actuator to move the dam 1702.

The processor can be used to determine which of the plurality of chambers is most suitable for the input waste, and accordingly actuate the dam 1702 to move between the first and second positions. For instance, in one example, the user may input waste into the composting apparatus 1600, and once the input waste is milled, the processor may determine and send the waste to the first compost chamber 1610A for composting. In this case, the processor may control an actuator (not shown) to actuate the dam 1702 to move to the second position 1702B to block the compost from entering the second chamber 1610B. Subsequently, if the user again inputs waste into the composting apparatus 1600, the waste is directed into the second chamber 1610B due the position of the dam 1702. In this case, the processor may control an actuator to actuate the dam 1702 to move to the first position 1702A to block the compost from entering the first chamber 1610A. The processor selection criteria may be based on reasons, including but not limited to, at least one of the plurality of chambers being full, at least one of the plurality of chambers being unable to accept further waste, at least one of the plurality of chambers being in an inoperable state, at least one of the plurality of chambers being currently used, at least one of the plurality of chambers being in the middle of a composting sequence, and any other reason that may improve the efficiency of the composting device.

In an example, one of the chambers 1610A and 1610B may be in a pre-compost cycle state and can be used for collection of fresh food waste, while the other of the chambers 1610A and 1610B is in a compost cycle state and composting the previously collected food waste and not able to accept any further waste. The roles can be switched between the plurality of compost chambers as the chamber with the composted food waste is removed and emptied. The process may be repeated as long as there is waste that needs to be composted. One chamber can be used for fresh food waste collection, while the second chamber processes previously collected food waste; the roles may be reversed as the second chamber empties the collected compost and is ready to begin accepted fresh food waste.

Food waste can be added at any time and can be collected in the chamber whose access thereto is left open by the dam 1702 for collection. The chamber blocked by the dam 1702 can be composting previously collected food waste. The dam 1702 can divert the flow into a second chamber directly, instead of having to pass through the first chamber, as the plurality of compost chambers can function as both the pre-treatment chamber as well as the compost chamber, alternatingly, depending on where a given chamber is in the compost cycle.

The dam assembly 1702 may involve a rigid sheet sized to fit the input entrance of each of the plurality of compost chambers and be configured to block the entrance of the compost chamber that it is moved to due to the actuator controlled by the processor. The sheet may be made of plastic or another suitable material.

In at least one embodiment, the dam 1702 can be actuated by an actuator that is controlled by a switch which may be manipulated by the user. In this embodiment, the user may select which chamber the food waste shall enter, blocking the remaining plurality of compost chambers.

In another embodiment, the dam 1702 may be biased to be shut at all times, and open under control by the processor or a user switch. In such embodiments, the first and second compost chambers 1610A and 1610B are covered by separately controllable elements of the dam assembly. For example, the dam assembly can comprise a gate for each compost chamber 1610A and 1610B that is moveable between an open position and a closed position. The open position of the gate may uncover the entrance to one of the plurality of compost chambers. The closed position of the gate may cover the entrance to one of the plurality of compost chambers. A processor can be communicatively coupled to an actuator that is connected to the gate to actuate the gate between the open and closed positions.

The composting apparatus 1600 may further comprise a liquid chamber or liquid tank assembly 1710 for collecting liquid. In at least one embodiment, a dewatering step can be optionally performed, where liquid molecules surrounding food waste particles are mechanically removed via pressing, tumbling or centrifugation. This results in a reduction of the bulk moisture content. The removed liquid (e.g., grey water) follows a flow path to the liquid tank assembly 1710. Optionally, dewatering may be applied during the milling step as milled food waste bits are pressed as they are milled and crushed. Optionally, any grey water that is output from the dewatering step may go through a filter such as a metal mesh. The filtered grey water may then flow into the liquid tank assembly 1710 to be stored. The liquid tank assembly 1710 may include a combination of a water tank for storing clean water and a liquid tank for storing grey water.

Figure 18:
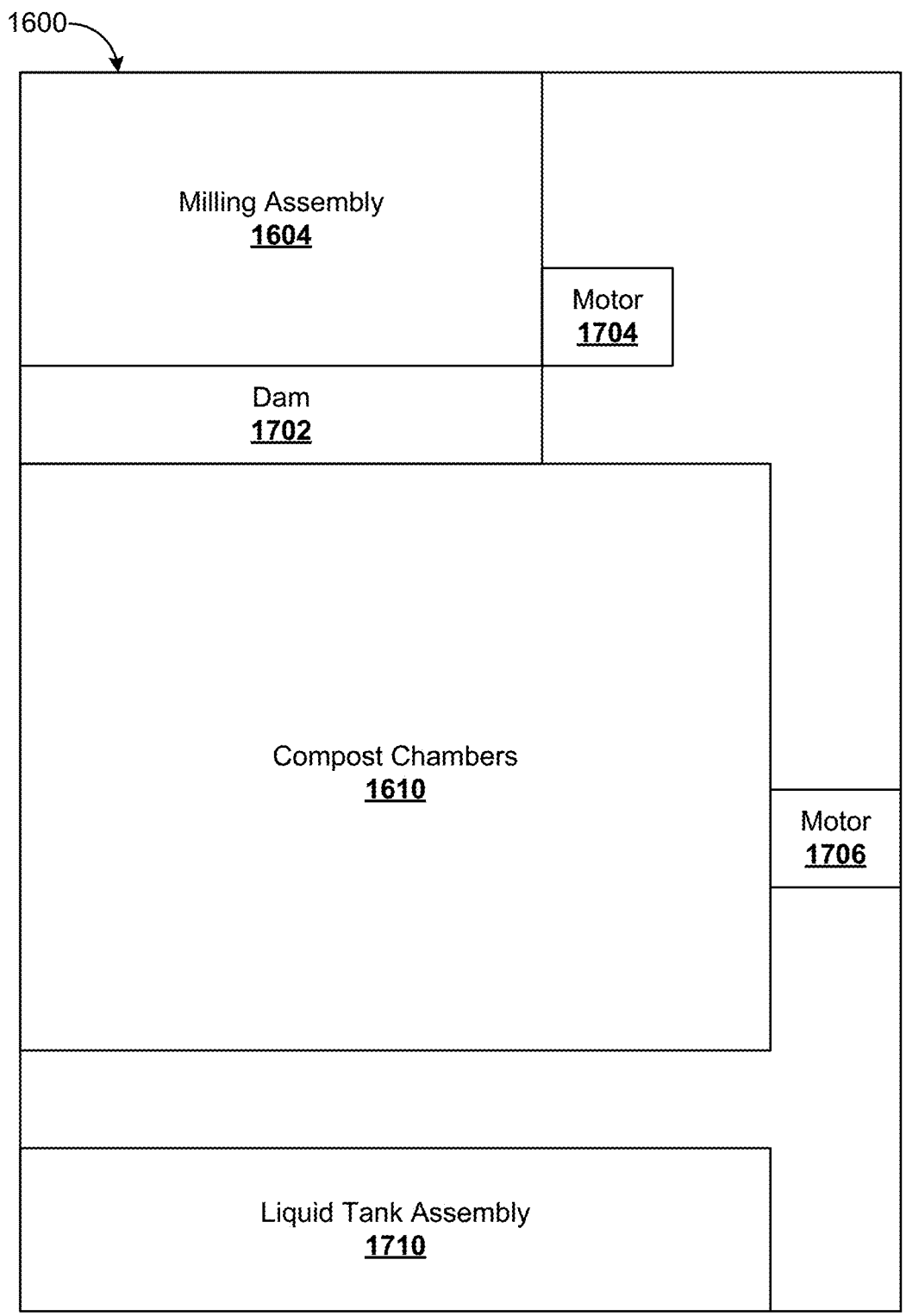
FIG. 18 is a side view of a block diagram of the composting apparatus of FIG. 16.

Referring now to FIG. 18, shown therein is a side view of a block diagram of the composting apparatus 1600 which includes the previously described elements of FIGS. 16-17 as well a first motor 1704, and a second motor 1706.

The first motor 1704 can be removably coupled to a pretreatment device (not shown), which may be used during pretreatment for crushing, volume reduction squeezing, centrifuging for dewatering, or any operable combination thereof. The pretreatment device may be removed for cleaning purposes. For example, in at least one embodiment, the pretreatment device may be the milling assembly 1604 or the dewatering mechanism and the motor 1704 is coupled to the milling assembly 1604 or a dewatering mechanism. The food waste that is deposited can be pre-treated by milling assembly 1604 through actuation by the motor 1704 to create pre-treated bits. Post pre-treatment, the pre-treated bits may be transferred to one of the plurality of compost chambers 1610, by the use of the dam assembly and the moveable dam 1702. The plurality of compost chambers 1610 may be coupled to the second motor 1706. The motor 1706 may be coupled to an impeller or ribbon mixer in the compost chambers, in at least one embodiment, as explained in one or more previous embodiments described herein. For example, a drive shaft may be configured to connect with multiple impellers with a single motor shaft.

In at least one embodiment, the composting apparatus 1600 may optionally include the liquid tank assembly 1710 for storing liquid or grey water. For example, in embodiments where dewatering is performed, as the crushed food waste is dewatered, liquid will be produced during dewatering and will flow into the liquid tank assembly 1710. This liquid may be referred to as liquid compost (also called compost tea). This liquid may be stored in the liquid tank assembly 1710 to be converted into liquid compost or compost tea or may be thrown out by the user periodically.

Figure 19A:
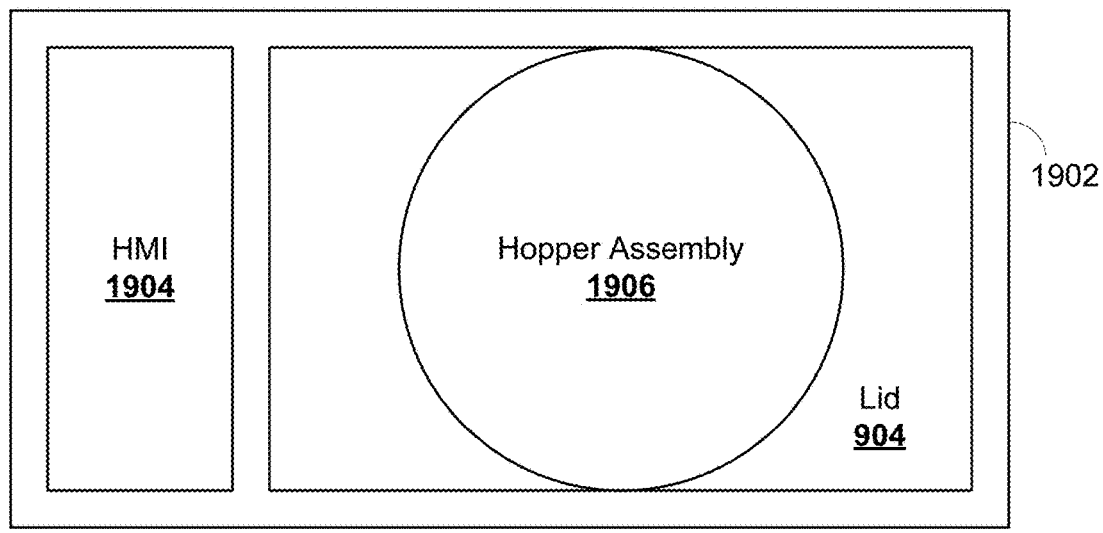
FIG. 19A is a top view of a block diagram of a composting apparatus according to another example embodiment.

Referring now to FIG. 19A, shown therein is a top view of a block diagram of a composting apparatus according to another example embodiment. From the top view, a removable lid 1902 covers at least a portion of a hopper assembly 1906 which comprises at least one hopper 1908. The hopper assembly 1906 and/or the hopper 1908 may be removeable. In such embodiments, the food waste may be collected in the hopper (which may also be known as an input compartment or input storage compartment). A human-machine-interface (HMI) 1904 may also be accessible to the user from the top of the composting apparatus. In another embodiment, the HMI 1904 may be accessible on a side panel of the compost chamber and/or via an external mobile device.

Figure 19B:
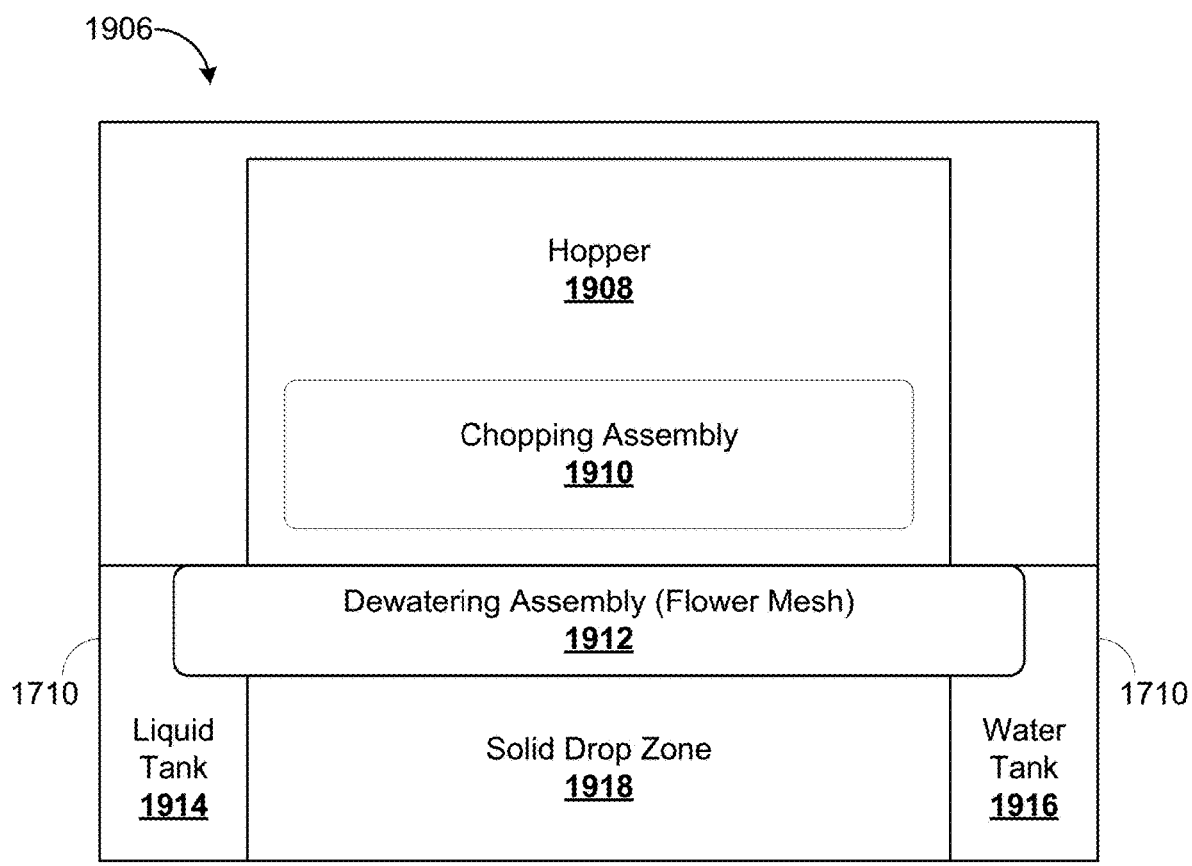
FIG. 19B is a block diagram of a hopper assembly according to an example embodiment.

Referring now to FIG. 19B, shown therein is a block diagram of the hopper assembly 1906 according to an example embodiment. The hopper assembly 1906 comprises the hopper 1908 for receiving organic waste at a first end and a chopping assembly 1910 at a second end, opposing the first end. When food waste is collected into the hopper 1908, it reaches the chopping assembly 1910, where the food waste becomes chopped, and has smaller particle sizes. In at least one embodiment, the chopping assembly 1910 may comprise rotating blades, grinders, mashers, crushers or any other suitable means of reducing the particle size and volume of food waste. Reducing the volume of food waste can include crushing, milling, grinding or mulching the volume of solid waste to reduce individual particle size in the volume of solid waste. Once the food waste has undergone a reduction in particle size by the chopping assembly 1910, the processed food waste can enter a dewatering assembly. In at least one embodiment, the dewatering assembly may comprise a perforated metal mesh. In at least one embodiment, a dewatering step can be optionally performed, where liquid molecules surrounding food waste particles are mechanically removed via pressing, tumbling or centrifugation. This results in a reduction of the bulk moisture content. Optionally, dewatering may be applied during the milling step as milled food waste bits are pressed to force out liquid as they are milled and crushed. Optionally, any grey water that is output from the dewatering step via the dewatering assembly 1912 may go through a filter such as a perforated metal mesh. The filtered water may then flow into the liquid tank assembly 1914 to be stored. The liquid tank assembly 1710 may include a combination of a water tank 1916 for storing clean water and a liquid tank 1914 for storing grey water.

The hopper assembly 1906 may further comprise a solid drop zone 1918. As the liquid molecules surrounding food waste particles are mechanically removed, the solid particles will drop into the solid drop zone 1918. The solid drop zone 1918 may optionally lead to the dam assembly 1702, which blocks solid particles from entering certain compost chambers prematurely as previously described.

Figure 20A:
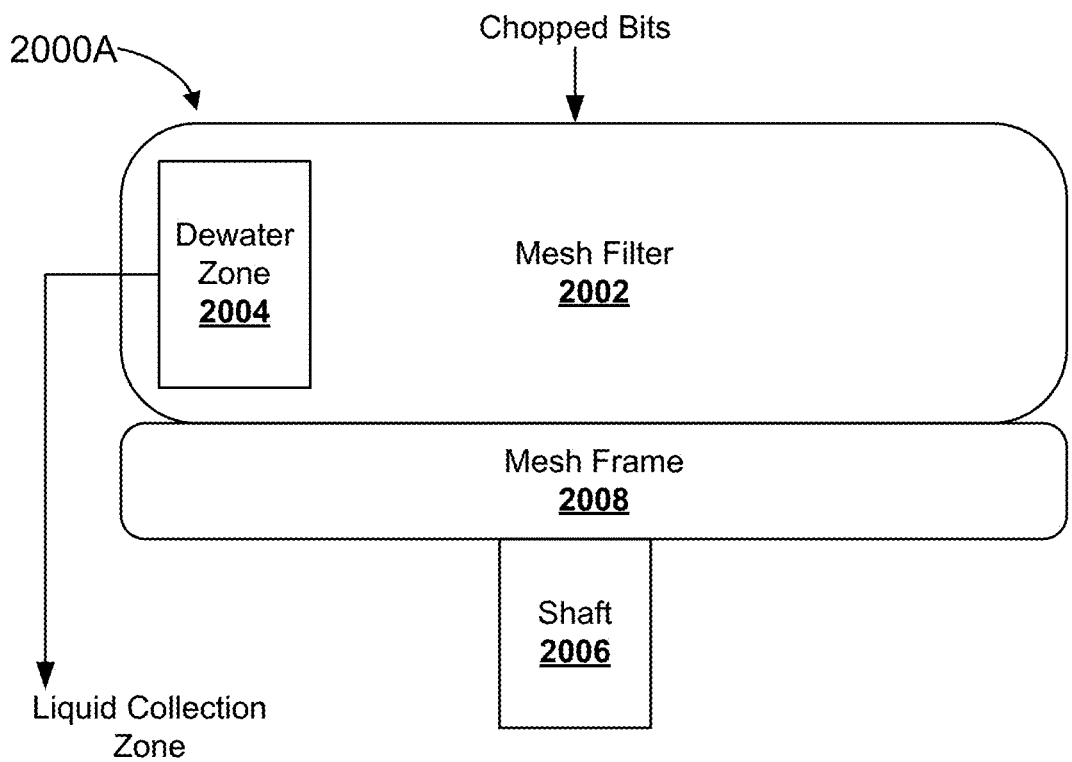
FIG. 20A is a block diagram of a mesh strainer according to an example embodiment, shown in an open state.
Figure 20B:
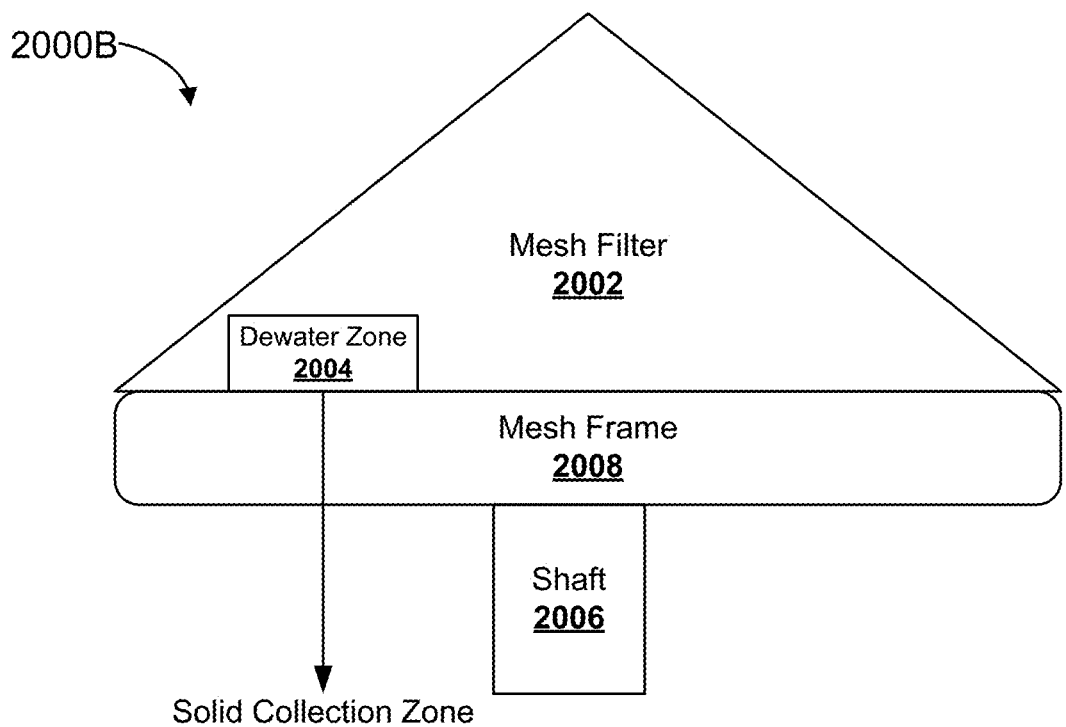
FIG. 20B is a block diagram of the mesh strainer of FIG. 20A shown in a closed state.

Referring now to FIGS. 20A and 20B, a block diagram 2000 of a mesh strainer 2002 according to an example embodiment, is shown in an open state in FIG. 20A, and a block diagram 2000B of the mesh strainer 2002 in a closed state is shown in FIG. 20B. The mesh strainer 2002, also referred to as a mesh filter, can be a strainer used for the separation of liquids from solids. For example, the mesh filter 2002 may be made of stainless steel or non-sticking perforated plastic. In either case, solid cannot pass through the mesh filter 2002 but liquid can during high rpm due to centrifuge forces. Dewatering will occur when the solid and liquid separates, as opposed to drying where heat is used. This can occur at the dewater zone 2004 such as shown in FIG. 20A and FIG. 20B. Thus, dewatering via the mesh strainer 2002 can be more energy efficient. The mesh strainer 2002 may be referred to as a foldable mesh strainer since it has two states and can fold into a closed state (FIG. 20B) and unfold into an open state (FIG. 20A). This allows the mesh strainer 2002 to avoid a jamming issue due to solid waste material. When active, the mesh strainer 2002 can be rotated via a motor (not shown), coupled to a shaft 2006 and a mesh frame 2008, to fold or unfold. In its active state, the mesh strainer 2002 is in the open state and collects solids on its inner surface. After food waste processing is finished, the rotating can stop, and the mesh strainer 2002 closes which allows solids to fall to one of the lower chambers that are not currently block by the dam (not shown). The dam can direct the solids to one of the compost chambers (not shown) for fresh food waste collection as previously described. The other chamber which has compost in progress can be blocked by the dam from receiving fresh food waste solids. The liquids from the separation stage can be directed to the liquid chamber (not shown) where they are stored until disposed be the user.

Figure 21:
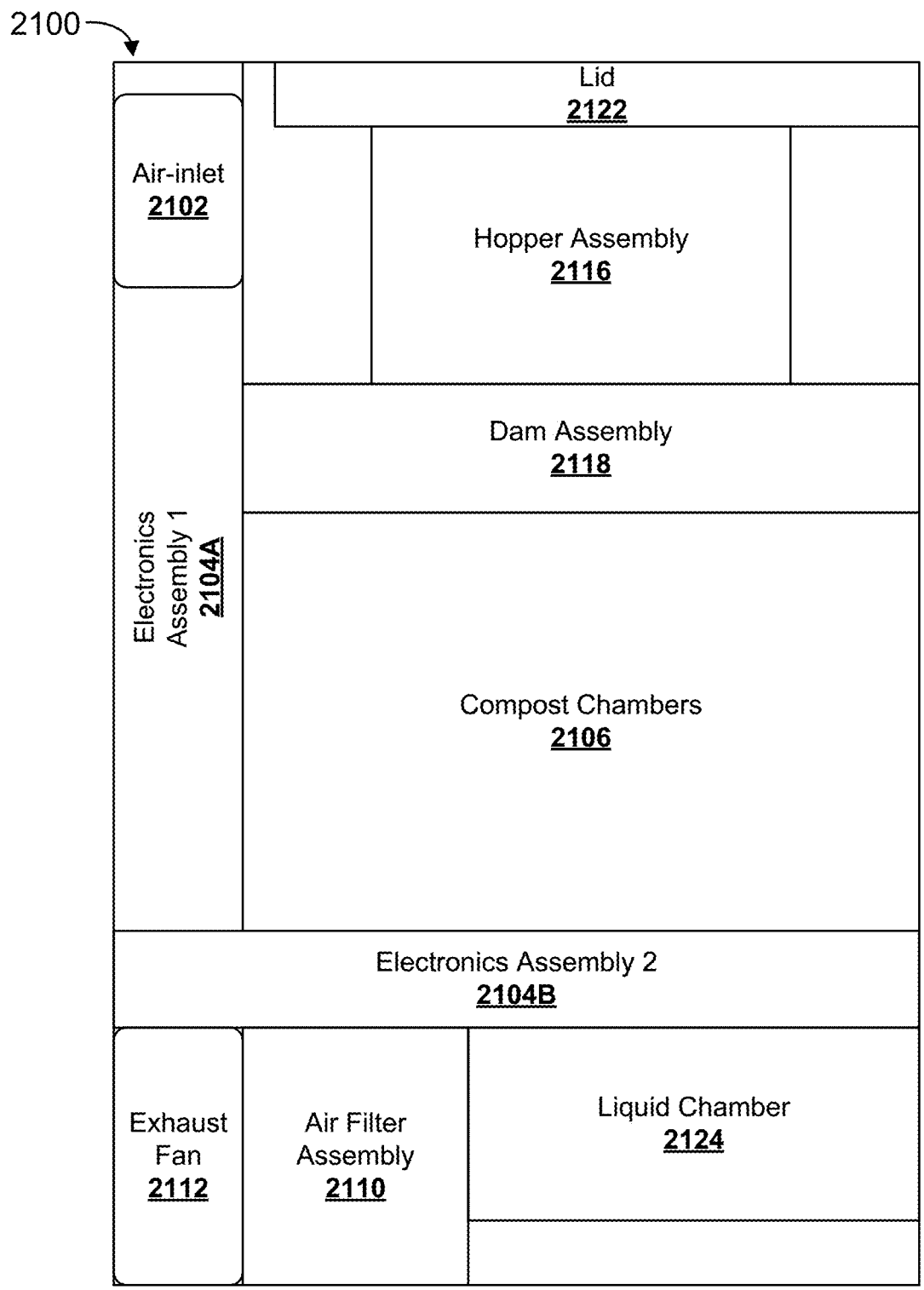
FIG. 21 is a side view of a block diagram of a composting apparatus according to another example embodiment.

Referring now to FIG. 21, shown therein is a side view of a block diagram of a composting apparatus 2100 according to another example embodiment. The composting apparatus 2100 may include a hopper assembly 2116, a dam assembly 2118, a lid 2122, and a liquid tank 2124 (also referred to as liquid chamber or liquid container), as previously described. The composting apparatus 2100 may further include at least one air-inlet 2102 with a first electronic assembly 1 2104A and a second electronic assembly 2 2104B. The second electronics assembly 2 2104B may be optional since it may include components that are used to provide additional heating to the compost chambers 2106 which might not be necessary in some cases. The electronics assemblies 2104 include electrical and electronic components including, and are not limited to, electrical motors, heaters, fans, pumps, sensors, LEDs and/or lamps or any operable combination thereof. The sensors may include at least one temperature sensor, at least one moisture sensor, at least one oxygen sensor, at least one load sensor, at least one position sensor, at least one level sensor, at least one image sensor, or any operable combination thereof. Fluidic components include, but are not limited to, at least one nozzle, tubing, fittings, at least one sprayer, at least one atomizer, filters, valves, at least one aerator, at least one reservoir or any operable combination thereof.

The airflow from the air-inlet 2102 is allowed to flow into the main device body and into the plurality of compost chambers 2106. The air-inlet 2102 allows any compost inside a given compost chamber 2106 to remain well-ventilated and temperature and humidity controlled, with some level of airflow. In at least one embodiment, aeration (e.g., air flow provided by a fan) may also be used during curing to produce higher quality compost.

The composting apparatus 2100 includes at least one air-outlet which may include an exhaust fan 2112. The airflow from the air-outlet allows air to flow out of the main device body from the plurality of compost chambers 2106. The air-outlet (not shown) allows any stale air to exit the compost chambers 2106. The air exiting the compost chambers 2106 may first be passed through an air filter assembly 2110 to reduce any odors in the air exiting the inside of the compost chambers 2106 so that this air remains as odor-free as possible. In at least one embodiment, the outlet air flow may be provided by a fan 2112.

In various embodiments described herein, providing a continuous positive airflow has several purposes depending on the particular embodiment of composting apparatus 2100 described herein where these purposes include, but are not limited to: 1) providing oxygen for aerobic composting 2) removing excessive water from dewatered bits, 3) removing odor and carrying the odor particles through an air filtration process, and/or 4) carrying ozone generated for odor reduction and compost maturation. The rate at which the air flows may depend on the internal structure of the airflow pathway.

Figure 22:
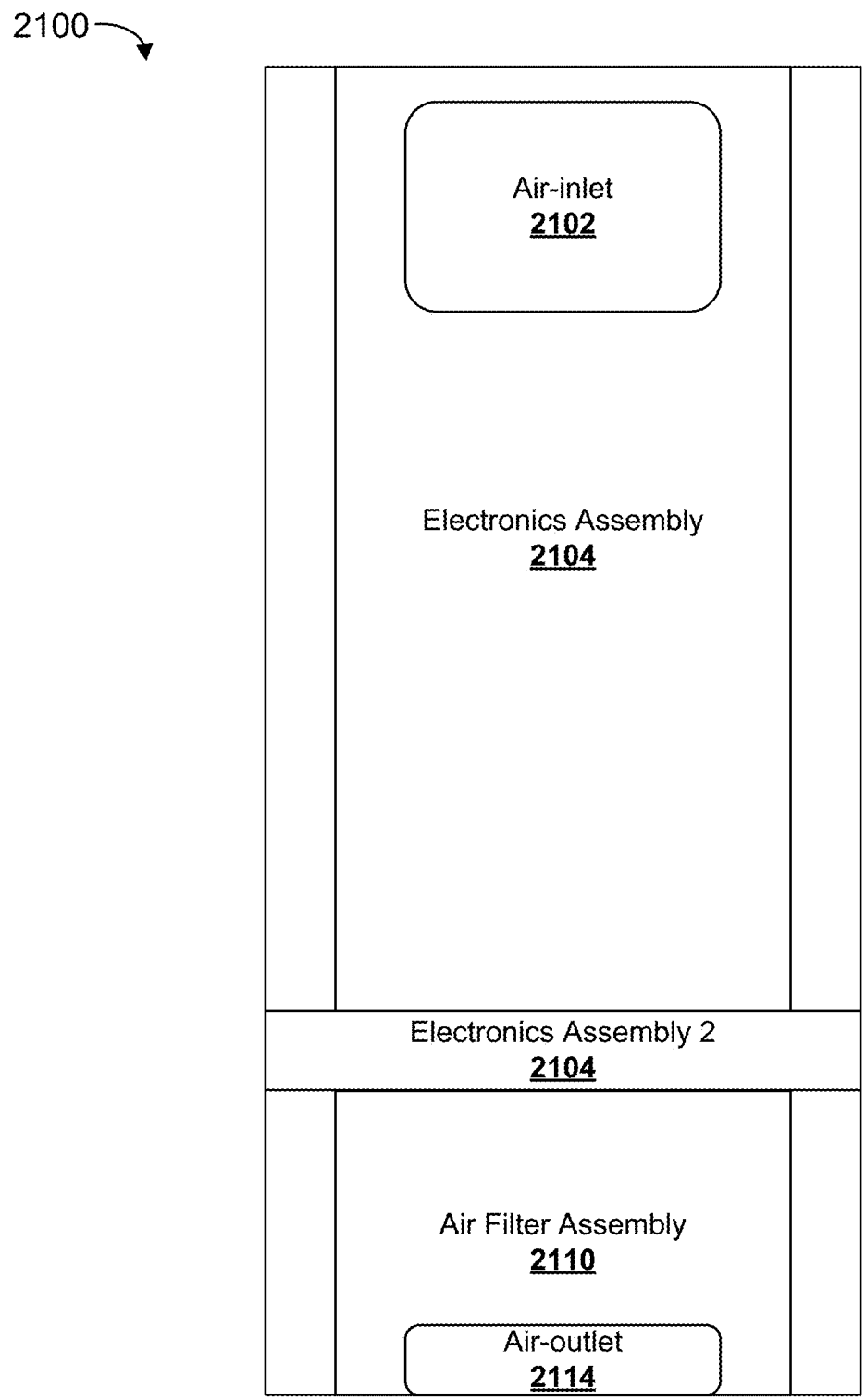
FIG. 22 is a rear view of a block diagram of a composting apparatus according to another example embodiment.

Referring now to FIG. 22, shown therein is a rear view of a block diagram 2100 of the composting apparatus 2100 of FIG. 21, which includes the previously described elements of FIG. 21, as well an air outlet 2114. FIG. 22 shows the air-inlet 2102 and air-outlet 2114 with reference to the composting device body. As shown, the air inlet 2102 is generally disposed at an upper portion of the composting apparatus 2100 while the air outlet 2104 is positioned below the air inlet 2101. The air outlet 2104 is generally positioned in a lower portion of the composting apparatus 2100.

Figure 23:
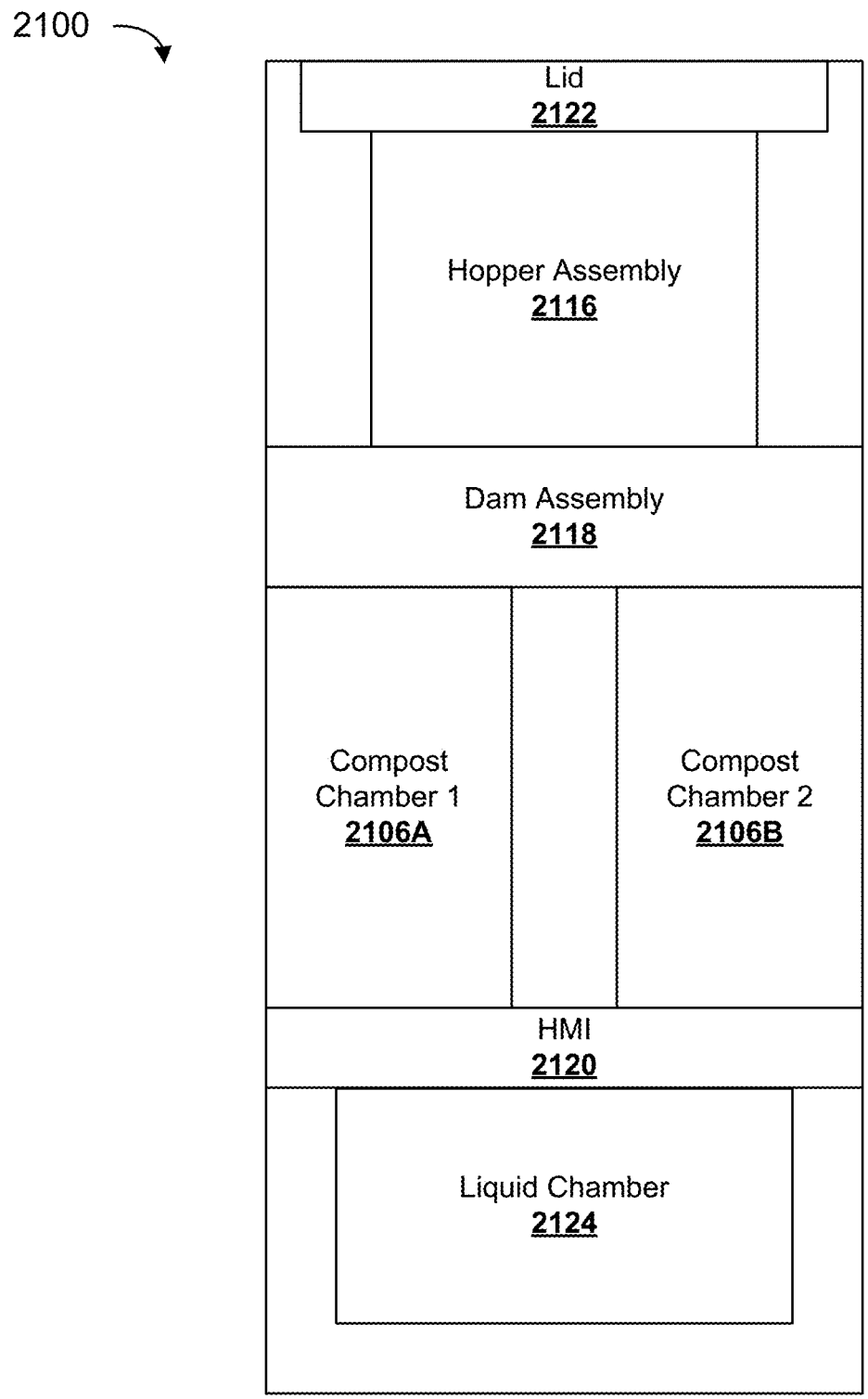
FIG. 23 is a front view of a block diagram of a composting apparatus according to another example embodiment.

Referring now to FIG. 23, shown therein is a front view of a block diagram 2100 of the composting apparatus 2100 of FIG. 21, which includes the previously described elements of FIGS. 21 and 22, as well as an HMI 2120. In this embodiment, the composting apparatus 2100 comprises a main device body. The hopper assembly 2116 may be removeable and comprise a hopper for receiving food waste. The hopper assembly 2116 may be coupled to a dam assembly 2118 such that as processed food particles exit the hopper assembly 2116, the food particles may be fed to the dam assembly 2118, which has a moveable dam that may be moved between several positions to block solid particles from entering one or more of the compost chambers 2106 prematurely. The dam assembly 2118 may be implemented as explained for composting apparatus 2100.

The composting apparatus 2100 further comprises first and second compost chamber cavities (not shown) as well as first and second compost chambers 2106A, 2106B as described for composting apparatus 2100. However, in this embodiment, the plurality of compost chambers 2106 can be removeable in order to empty them once the compost is generated and also to clean them as needed. The composting apparatus 2100 may further comprise a human-machine-interface 2120 (HMI) such as the HMI which is accessible to the user. In such embodiments, the HMI 2120 may be accessible on an outer panel (not shown) of the composting apparatus 2100 or, on an inner panel (not shown) proximal to the lid 2122 of the composting apparatus 2100. Optionally, or in addition thereto, the HMI 2102 may be accessible via an external mobile device (not shown).

In another aspect, in at least one embodiment there is provided a method and apparatus for eliminating odors from the compost and liquid chambers 2106, 2124 in accordance with the teachings herein. Typically, filters can be used to eliminate odors, however filters can become saturated over time and need to be changed frequently. This can be time consuming and costly. Therefore, a method of odor elimination without the need to frequently change filters is provided.

Figure 24A:
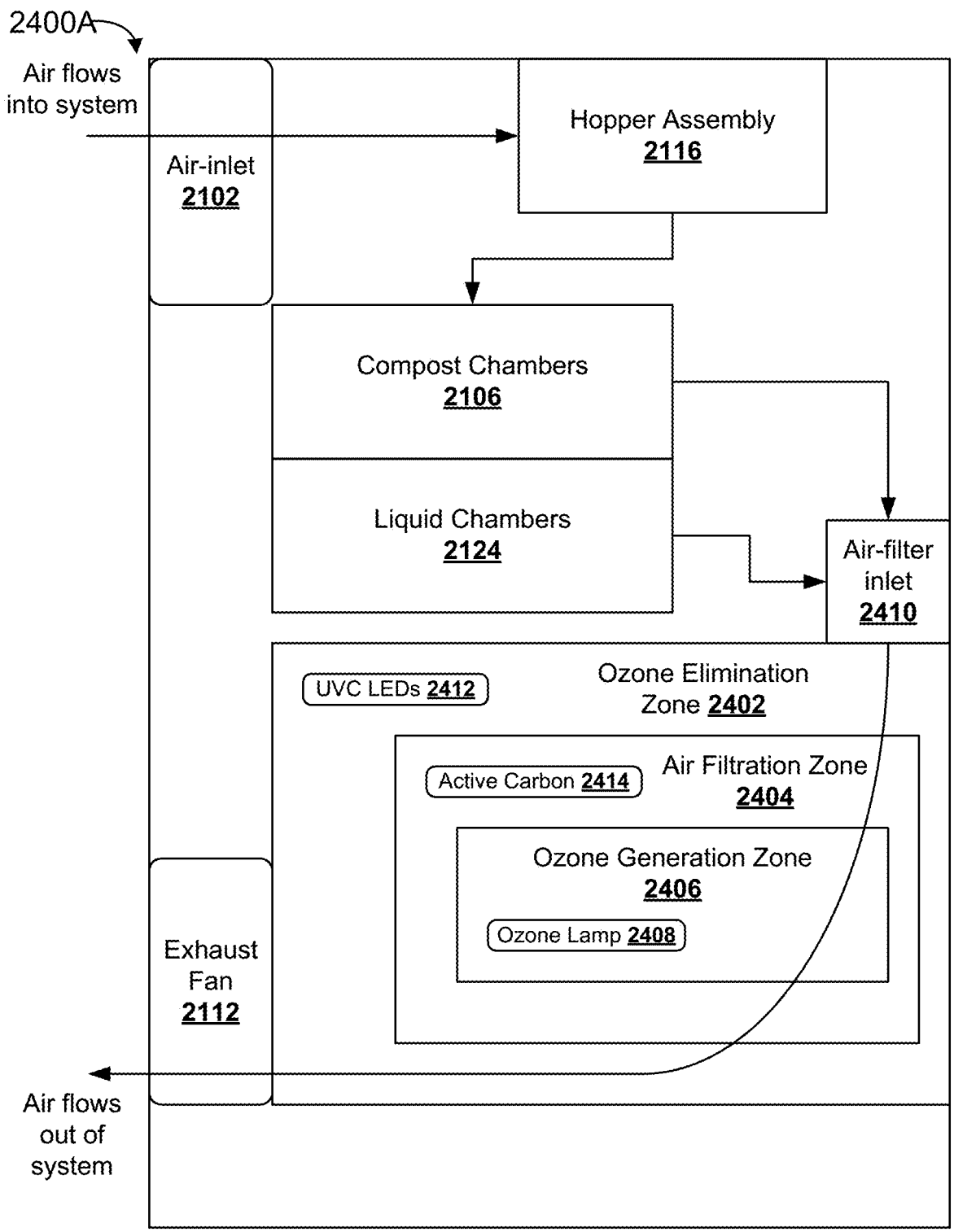
FIG. 24A is a block diagram of an odor elimination system, according to an example embodiment.

Referring now to FIG. 24A, shown therein is a block diagram of an odor elimination system 2400A, according to an example embodiment, which may be applied to at least one of the composting apparatus embodiments described herein, and includes the previously described elements of FIGS. 21 to 23, as well as an ozone elimination zone 2402, an air filtration zone 2404, an ozone generation zone 2406, an ozone lamp 2408, a filter 2414, an air-filter inlet 2410, and ultraviolet lamps 2412. The lamps may be any suitable light source that can generate light having desired wavelengths as described below. Air flows into the odor elimination system 2400 via an air-inlet 2102. The air is then diverted to the hopper assembly 2116 and towards the plurality of compost chambers 2106 and liquid tanks 2124 which contain solids and liquids, respectively, that generate odors. Accordingly, the air which comes from the plurality of compost chambers and liquid tanks 2124 can have odors which should be eliminated or greatly reduced. As such, the odorous air follows an air flow path to the odor elimination system 2400. The odor elimination system 2400 can comprise an ozone generation zone 2402; an air filtration zone 2404 and an ozone elimination zone 2406.

Ozone can be used to remove the odor from the air. In this embodiment, an ozone lamp 2408 can be used to generate ozone. Ozone can be produced from the ozone lamp 2408 which emits UV light having wavelengths between about 100 nm and about 240 nm. However, it may be preferable to use about 185 nm wavelength of UV-C light for more efficient ozone generation. The power level for the emitted UV light may be about 0.1 W to about 10 W depending on the application of the composting apparatus (e.g., residential versus commercial). Ozone can also be used for breaking down some greenhouse gases such as methane which can be present in the air from the compost chambers. As air from the air-filter inlet 2410 enters the ozone-rich ozone generation zone 2402, the odors from the air can be reduced. In at least one embodiment, the compost chambers 2106 may not be directly exposed to ultraviolet light from the ultraviolet sources 2412 but may instead be exposed to ozone mixed with air.

Once the air containing ozone exits the ozone generation zone 2402, the air reaches the air filtration zone 2404 consisting of the filter 2414. The types of filters that can be used include carbon filters. Carbon filters are filters with granular activated carbon (GAC) that can be used to remove certain chemicals, particularly organic chemicals, from water. GAC filters also can be used to remove chemicals that give objectionable odors or tastes to water such as hydrogen sulfide (rotten eggs odor) or chlorine gas. Carbon air filters can be effective at filtering Volatile Organic Compounds (VOCs) from the air. These are gaseous substances that most other mechanical filters like HEPA filters may not be effective at removing.

Finally, as the air, which still contains ozone, exits the air filtration zone 2404, it is allowed to enter the ozone elimination zone 2406. In the ozone elimination zone 2406, ozone in the air that was generated by the ozone generation zone 2402 becomes eliminated as ozone can be harmful to humans and pets. Any excess ozone that can leak out of the air filtration zone 2404 can be eliminated within the ozone elimination zone 2406. In one embodiment, the ozone elimination zone 2406 comprises one or more Ultraviolet-C (UVC) lamps 2412 that emit a UV light having a different wavelength of light compared to the wavelength used for ozone generation. Typically, about 254 nm wavelength UV light can be effective in destroying ozone. The 254 nm wavelength is typically generated by UV lamps 2412, as LEDs operate at longer wavelengths. This wavelength is also used for ozone destruction as it is more effective than the UVC LEDs 2412. However, since ozone is destroyed by UV light wavelengths between about 240 nm and about 315 nm, UV lamps or UVC LEDs 2412 can be used for ozone destruction depending on the requirements of the composting apparatus 2100. The power level for the emitted UV light may be about 0.1 W to about 20 W depending on the application of the composting apparatus 2100 (e.g., residential versus commercial).

In at least one embodiment, the ozone elimination zone 2402 may comprise a sterilization zone (not shown) to kill off pathogens. For example, UV lights may be included to provide disinfection/sanitation. The UV sterilization may be performed using UV lights inside the condenser (not shown) or, in embodiments without a condenser, using UV lights inside air-filters that may be positioned where the condenser would have otherwise been located. In at least one embodiment, UV lights may also be placed above the liquid tank 2124 to prevent odor generation or molding. UV LEDs may be used to provide increased lifetime. UV lights may also be preferably sealed off so that they cannot be accessed by users who may otherwise damage them. It can be understood that various wavelengths of light can be used for accomplishing various functions. In one embodiment, other wavelengths of light can be used as well; for example, 275 nm can be used in the liquid chamber 2124 to prevent parasitic growth. The ultraviolet light can be used to generate ozone and prevent pathogens growth outside of the compost chambers 2106. Tests can be performed to determine the power level for the emitted UV light that is required such as from about 0.1 W to about 20 W depending on the application of the composting apparatus (e.g., residential versus commercial).

In at least one embodiment, there may also be additional sterilization that is performed at the end of the composting cycle which may be done either by illuminating the compost with UV light from UV LEDs and/or exposing the compost to an elevated temperature of about 80 to 90° C. However, this may not be needed if the pathogen level is low in the composted material.

Typically, 254 nm wavelength UV light is effective in destroying pathogens and other forms of life at the molecular level. This can be useful to prevent mould or other pathogens from being created in certain parts of the device. The ozone elimination zone 2402 may comprise a plurality of UV lamps 2412 to breakdown excess ozone since ozone is harmful to pets and people at certain levels.

Accordingly, in such embodiments, the air from the air-filter inlet 2410 may be passed through the ozone generation zone 2402 to remove any odors, passed through the air filtration zone 2404 to further remove odors; and then passed through the ozone elimination zone 2406 which eliminates any ozone that has been carried forward from the ozone generation zone 2402. In at least one embodiment, the ozone elimination zone 2406 may further comprise a sterilization zone which can kill any pathogenic bacteria. Finally, the cleaned air is allowed to exist the system via an air-outlet or exhaust fan.

Figure 24B:
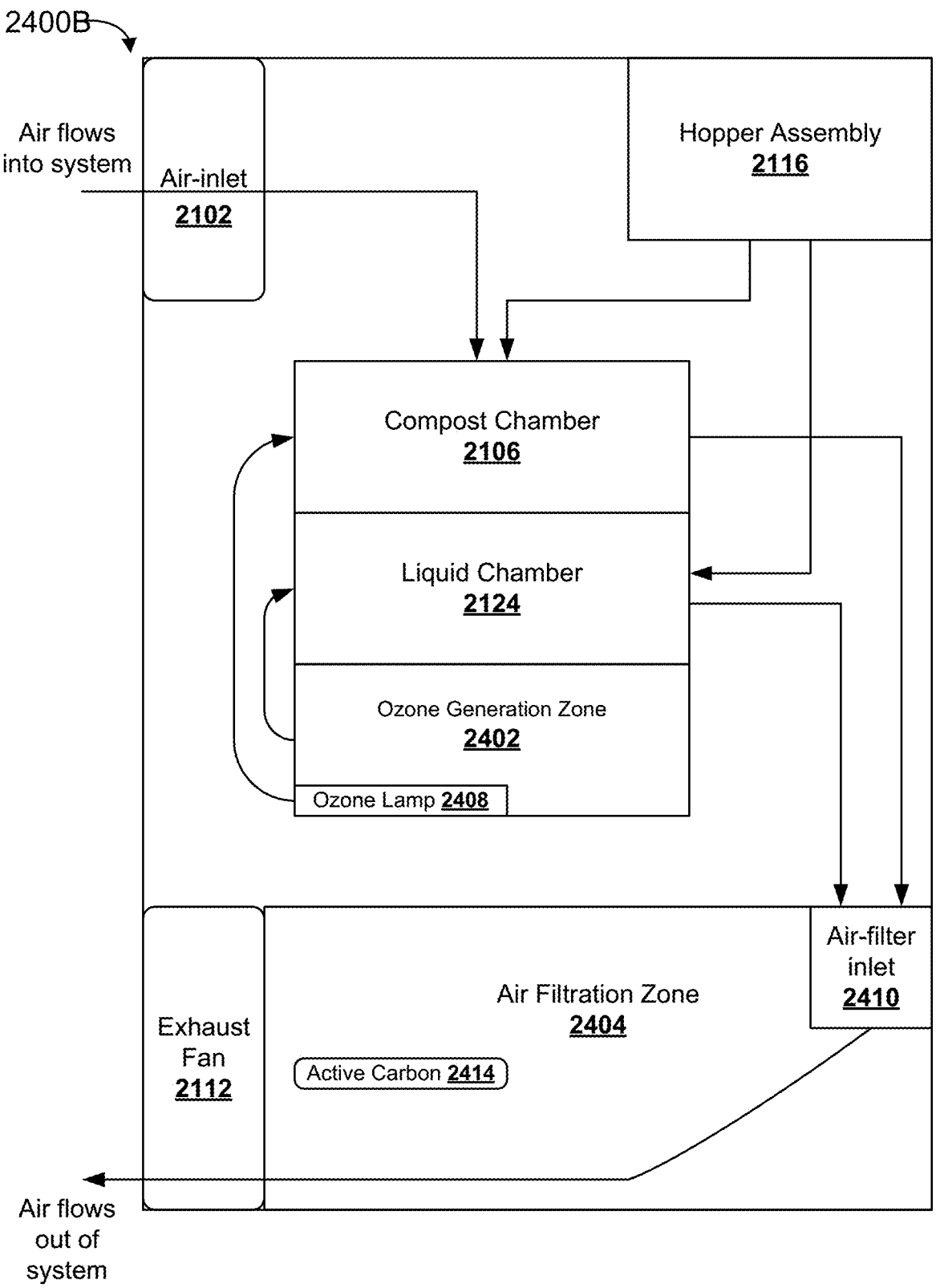
FIG. 24B is a block diagram of an odor elimination system, according to an example embodiment.

Referring now to FIG. 24B, shown therein is a block diagram of an odor elimination system 2400B, according to an example embodiment, which may be applied to at least one of the composting apparatus embodiments described herein, and includes at least some of the previously described elements of FIGS. 21 to 23. Ambient air enters the main body through inlet fans 2102 on both sides of the device body, and flows directly into the compost chamber(s) 2106 (for single and multiple compost chamber designs). Main exhaust fan 2112 can be turned ON by the processor (not shown) when sensors (not shown) detect that specific conditions are met, to generate positive airflow outwards from the inside of the device body into the ambient environment. For example, at least one of the sensors described with reference to FIG. 13 may be used as individual sensos or in a sensor module for detecting one or more conditions at the same time. These sensors may be typically located between the odor source and odor elimination zones (e.g., ozone generation zone and/or air filtration zone) and the conditions that are monitored may be based on physical conditions such as, but not limited to, temperature, humidity, moisture content, gas pressure, gas resistivity, solid volume, solid weight or any combination thereof, for example, and/or chemical conditions such as, but not limited to, gas composition and/or gas concentrations, for example. All exhaust air flows firstly through the air filtration zone 2404 before entering the exhaust fan module 2112 to exit the device body of the system 2400B. The hopper assembly 2116 acts as an internal air circulation source. When the motor inside the hopper assembly 2116 is turned ON by the processor, airflow is generated towards both the compost chamber(s) 2106 and the liquid chamber 2124. The ozone lamps 2408 are located inside the ozone generation ozone 2402 at various locations of the system 2400B. The ozone lamps (2408) are turned ON by the processor when the aforementioned sensors detect that one or more criteria are met (e.g., one or more certain conditions are occurring) by comparing the measured values with thresholds related to those conditions where the thresholds are determined empirically. Ozone flows into compost chamber(s) and liquid chamber due to gravity or airflow. Ozone reacts with odors produced inside the compost chamber(s) 2106 and the liquid chamber 2124. If excessive ozone is generated, e.g., any ozone that does not completely react with the odors, will react with the active carbon 2414 inside the air filtration zone 2410 and get consumed."

Figure 25:
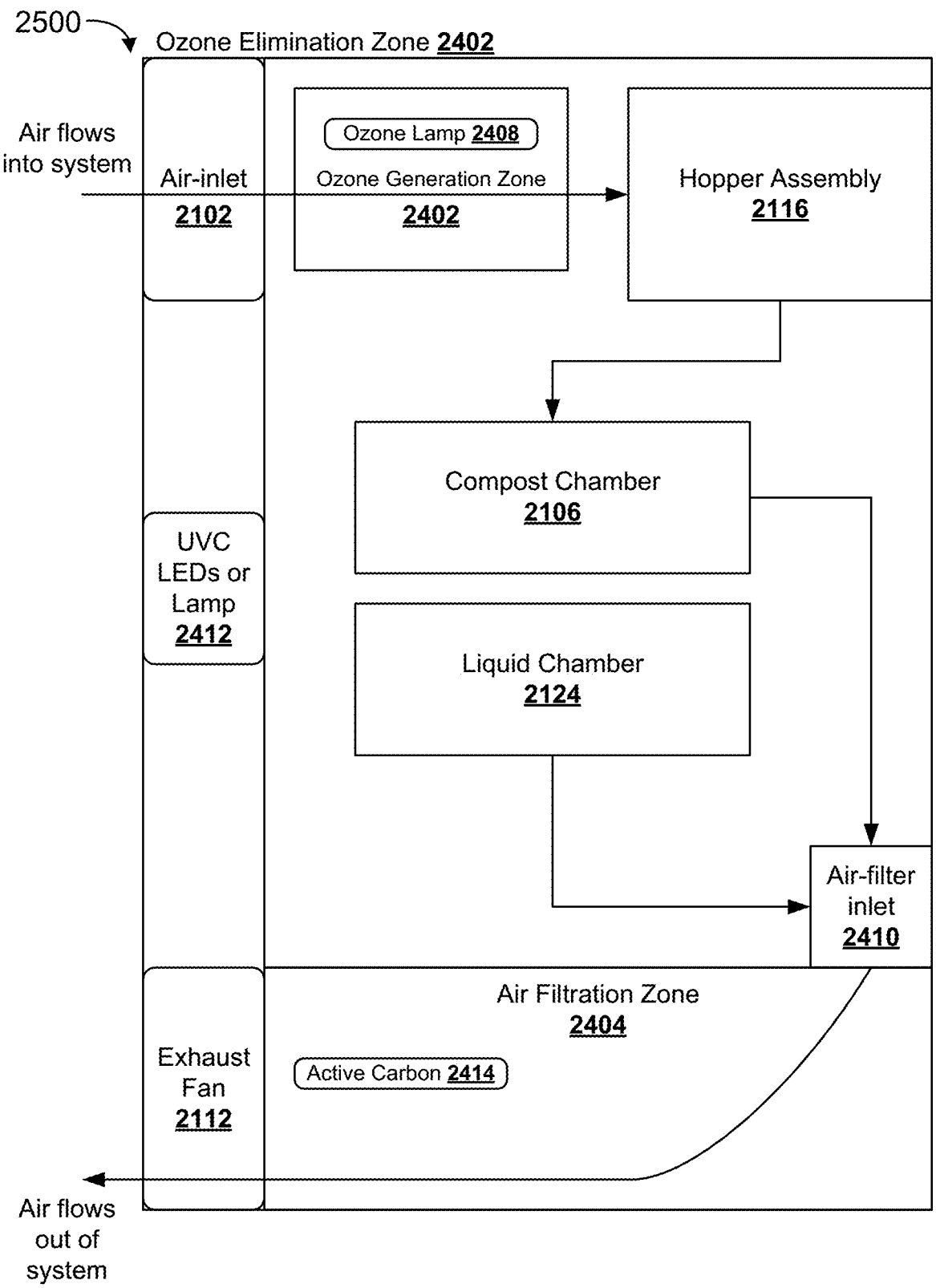
FIG. 25 is a block diagram of an odor elimination system, according to an example embodiment.

Referring now to FIG. 25, shown therein is a block diagram of an odor elimination system 2500, according to another example embodiment, which includes at least some of the previously described elements of FIGS. 21 to 24. In this embodiment, ozone is generated near the inlet of the airflow system. As such, the generated ozone flows through various physical components starting with the hopper assembly 2116 through the plurality of compost chambers 2106, and the liquid tanks 2124, and is then broken down to oxygen before the air exits. In this embodiment, the ozone can be beneficial to the composting process and also for reducing pathogen levels.

Air flows into the system via the air-inlet 2102. The air is then exposed to the ozone generation zone 2402. The ozone generation zone 2402 can comprise an ozone lamp 2408 which generates ozone. As described previously, about 185 nm wavelength of UV-C light can be used for the more effective ozone generation. In at least one embodiment, multiple light sources can be used to create the ozone. In at least one embodiment, ozone is generated outside compost chambers 2106 and delivered to the compost chambers 2106.

The ozonated air is then diverted to the hopper assembly 2116 and towards the plurality of compost chambers 2106 and liquid tanks 2124 which generate odors. The air which is output from the plurality of compost chambers 2106 and liquid tanks 2124 can have odors which should be eliminated. As such, the odorous air is exposed to the ozonated air, reducing or eliminating any odors from the air. As ozonated air from the ozone generation zone 2402 enters the composting chambers 2106 and liquid chambers 2124, the odors from the chambers 2106 can become reduced or eliminated.

Once the air exits the compost chambers 2106, the air reaches an air filtration zone. In one embodiment, the air filtration zone 2404 comprises at least one filter 2414. In one embodiment, there is at least one active carbon filter 2414 in the air filtration zone to capture odors that the ozone is not able to remove. The operation of carbon filters was described previously.

Finally, as the air exists the air filtration zone 2404, it follows a flow path and enters the ozone elimination zone 2402. The ozone elimination zone 2402 can be implemented as described previously. In at least one embodiment, the ozone elimination zones 2402 can be provided after the air inlet 2102, and before the exhaust fans 2112 as this can prevent any unwanted ozone from escaping out through the inlet 2104 or exhaust 2112. The ozone elimination zone 2402 comprises a plurality of UV lamps 2412 to breakdown excess ozone since ozone is harmful to pets and people at certain levels. In one embodiment, other wavelengths of light can be used as well; for example, 275 nm can be used in liquid chamber 2124 to prevent parasitic growth.

In at least one embodiment, the ozone elimination zone 2402 may comprise a sterilization zone to kill off pathogens. For example, UV lights may be included to provide disinfection/sanitation. The UV sterilization may be performed using UV lights inside the condenser or, in embodiments without a condenser, using UV lights inside air-filters that may be positioned where the condenser would have otherwise been located. In at least one embodiment, UV lights may also be placed above the liquid tank to prevent odor generation or molding. UV LEDs may be used to provide increased lifetime. UV lights may also be preferably sealed off so that they cannot be accessed by users who may otherwise damage them. In at least one embodiment, there may also be additional sterilization that is performed at the end of the composting cycle which may be done either by illuminating the compost with UV light from UV LEDs and/or exposing the compost to an elevated temperature of about 80 to 90° C. Typically, 254 nm wavelength UV light is effective in destroying pathogens and other forms of life at the molecular level. This can be useful to prevent mould or other pathogens from being created in certain parts of the device. However, this may not be needed if the pathogen level is low in the composted material.

Accordingly, in embodiments that are similar to what is shown in FIG. 25, the air from the air-filter inlet 2410 is passed through the ozone generation zone 2402 to become ozonated, passed through the compost assemblies to remove any odors, passed through the air filtration zone 2404 to further remove odors; and then passed through the ozone elimination zone 2402 which eliminates any ozone that has been carried forward by the ozone generation zone. The ozone elimination zone 2402 may further comprise a sterilization zone which can kill any pathogenic bacteria. Finally, the cleaned air is allowed to exist the system via an air-outlet (not shown) or exhaust fan 2112).

Referring now to FIGS. 26A-26D, shown therein is a block diagram of a composting apparatus 2600, according to an example embodiment, which has certain components/ features that may also be applied to at least one of the composting apparatus embodiments described herein (e.g., single and multi-compost chamber designs), and includes at least some of the previously described elements of FIGS. 21 to 25, as well as a top compartment 2602, a bottom compartment 2604, a compost controller 2606, a chamber motor 2608, a heat blower 2610, a heating pad 2612, a waste processing unit 2614 and a state of health sensor 2616 (SOH). For example, a sensor module having one or more sensors may be used to implement the SOH sensor and it may detect up to four different attributes (both physical and chemical) of the air that flows out of the compost chamber, to determine the state of health of the composting progress. The SOH sensor may be training using classification algorithms to determine gas composition and gas concentration as well, from its native data readouts, to evaluate the state of health of the composting process.

In this embodiment, the composting apparatus 2600 may be made of two compartments. The top compartment 2602 may be removable by a user and can be attached to the bottom compartment 2604. The top compartment 2602 includes the waste processing unit 2614 which chops food waste into smaller chunks and separates liquids from solids to prepare the food waste for further processing in the compost chambers 2106. When the top compartment 2602 is removed from the bottom compartment 2604, the user can access the compost chambers 2106 and the liquid tank 2124 inside the bottom compartment 2604.

The bottom compartment 2604 may include a composter controller 2606 and chamber motors 2608. The composter controller 2606 includes electrical circuitry, such as a processor, and controls the operation of the various elements within the composting apparatus 2600. The chamber motors may include a food chopping motor (not shown) and two composting motors (not shown). The food chopping motor may spin at a rate of, for example, about 3000 to about 4000 revolutions per minute (RPM) under full load (e.g., about 300-about 500 Watts (W)). The food chopping motor provides rotational powers to certain processing components (e.g., blades) in the waste processing unit 2614 and ensures that the food is milled to a suitable degree to be processed by the composting apparatus 2600. In contrast, the composting motors may operate at a rate of, for example, about 1-about 2.5 RPM. This ensures that the food within the compost chambers 2106 does not settle by mixing and airing the stored food. The composting motors may be, for example Longway Motors (p/n: 60KTYZ-038). The bottom compartment 2604 may be permanently attached to an outlet via an AC cable and internal power supply unit (not shown) to provide electrical protection and power which allows the composting apparatus 2600 to operate in its normal operating mode. Food processed by the food processing unit 2614 is directed to the composting chambers 2106 via the dam 2118.

The composting apparatus 2600 may further include two UV lamps 2412, described above. The UV lamps 2412 may operate at, for example, about 254 nm and about 185 nm wavelengths to prevent undesired pathogen growth and to reduce odor. The UV lamps 2412 maintain or restore the internal health of the composting apparatus 2600 by applying UV light at various locations within the liquid container and an inner air flow pathway before air reaches the air filter. In some embodiments, ozone is also applied to air that flows in the inner air flow pathway. For example, internal health may be defined as reflecting a desirable progression of the composting process by the microbial species inside the system. For example, typical desirable progression is aerobic decomposition conditions with ample oxygen supply and controlled moisture levels. Gas emissions, including composition and concentration, are also indicative of internal health, as anerobic conditions produce high levels of methane and odorous gases, and higher temperature conditions (such as above 100° C.) produce volatile organic compounds. If the system is too moist, acidic evaporates are also produced. These are example of undesirable states that do not reflect a healthy composting process. Values for determining if these conditions exist may be determined empirically. The UV lamps 2412 may be activated by the composter controller 2606 when the internal health of the composter apparatus 2600 is degraded, or generally on a periodic basis to maintain the health of the composter apparatus 2600. The health of the composter apparatus 2600 may be measured by an internal SOH 2616 as described previously. To avoid going into any of the unhealthy states, certain operational/environmental conditions are preferably be maintained, so that certain species of microbes will thrive for providing a healthy compost process. Certain operational parameters of the composting apparatus may be controlled to help maintain a healthy state. For example, UV lamps may be used to guide the system to operate back to a healthy state, or a full sterilization of the system may be done in some cases to return back to a heath state.

The SOH 2616 samples internal air directed toward the internal air filter (not shown). The SOH 2616 monitors the internal health of the composter apparatus 2600 and provides periodic measurements of humidity, temperature, and gasses emitted during food waste decomposition. Using these measurements, the internal health of the composter apparatus 2616 may be determined by the composter controller 2606. For example, as previously described, both physical and chemical attributes such as air temperature, humidity, gas pressure, gas resistivity, gas composition, gas concentration can indicate and differentiate healthy states from unhealthy states. For example, if the concentration of methane and/or acetic acid reaches a threshold, it's unhealth.

The composter controller 2606 may also be connected to sensors (not shown) located within the compost chambers 2106 and the liquid tank 2124 to determine the current fill rate. The fill rate may typically be determined using a weight sensor or a level sensor, to avoid overflow conditions where the chambers are full, but more inputs are added. In at least one embodiment, ultrasonic sensors may be used to determine both the solid and liquid levels. These sensors determine the levels and the processor can determine the fill rate to determine when the compost chambers 2106 or the liquid tank 2124 are almost full, thereby preventing overflow by notifying users to stop adding more food waste. The sensors may be, for example, TDK's CH-101 sensors but other sensors may be used that provide the same functionality and sensitivity.

The composting apparatus 2600 may further include heat blowers 2610 that blow hot air into the compost chamber(s) (e.g., for single or multi-compost chamber designs) and remove excess moisture in the processed food and eliminate excess VOC generation. For example, the hot air can prevent flies from hatching and other animals or fungi from developing. In some embodiments, the heat blowers 2610 further supply the compost chambers 2106 with oxygen (e.g., an inlet fan may be used that supplies oxygen from the ambient environment into the system) to promote compost development. The heat blowers 2610 also controlled by the composter controller 2606.

The composting apparatus 2600 may further include heating pads 2612 below the compost chambers 2106 to increase the temperature within the compost chambers 2106. The increased temperature within the compost chambers 2106 may promote compost development and further prevent unwanted growth. In some embodiments, the heating pads 2162 may be made using silicone. The heating pads 2612 are also controlled by the composter controller 2606.

Figure 26A:
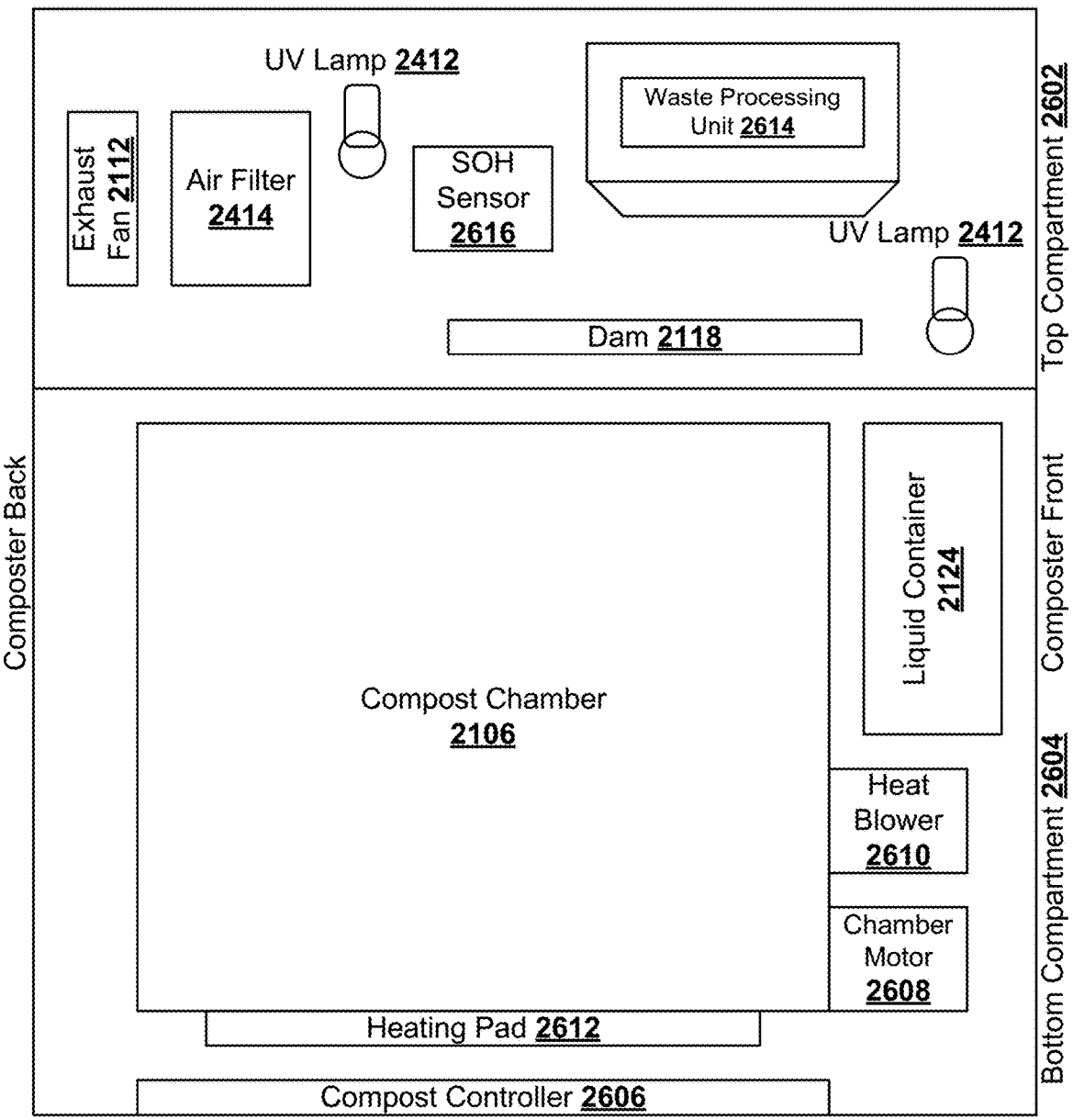
FIG. 26A-26D is a block diagram of a composting apparatus, according to an example embodiment.
Figure 26B:
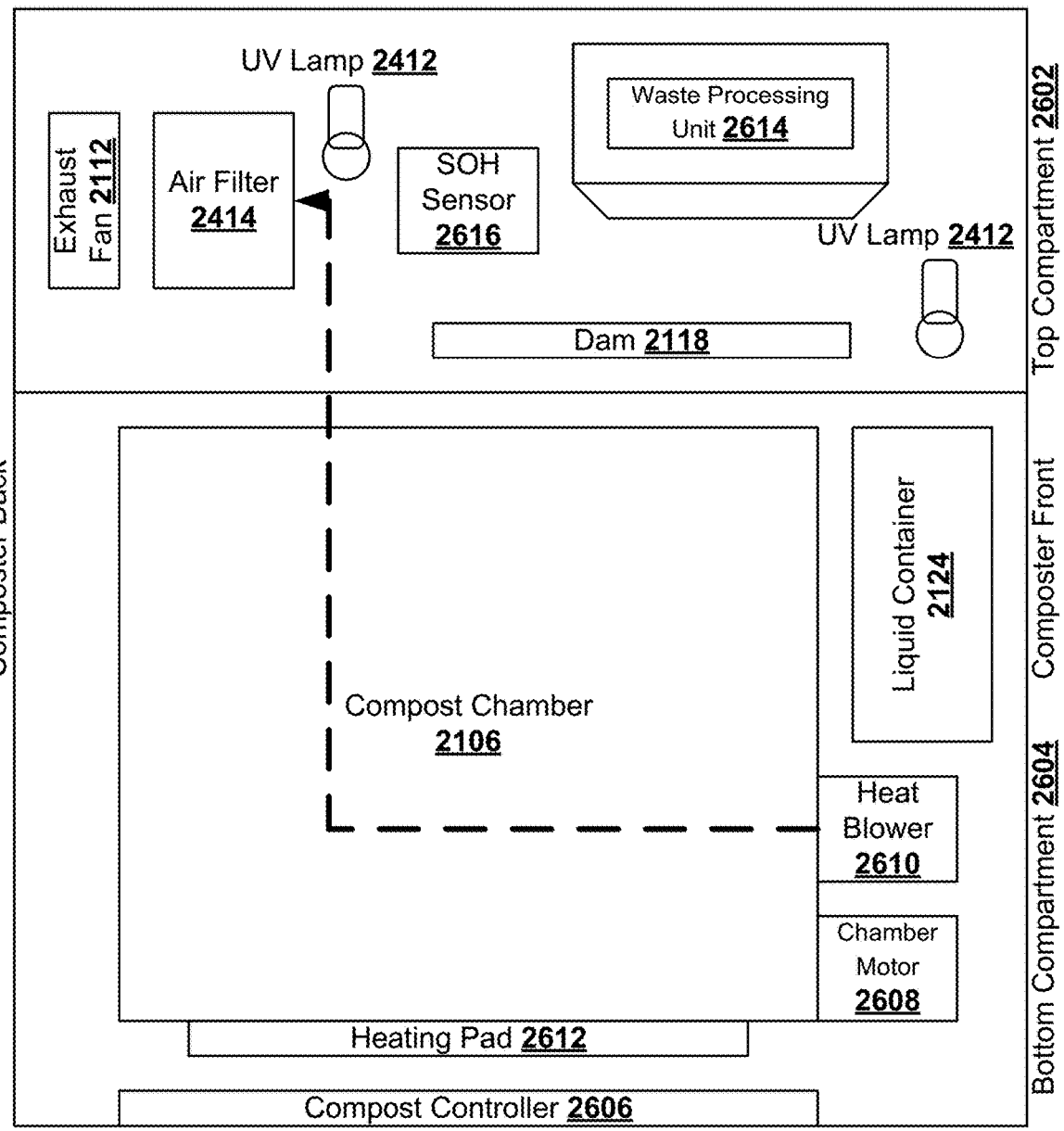

In FIG. 26B, the path of air and odors through the composting apparatus 2600 is shown therein. Each composting chamber 2106 may have a heat blower 2610 positioned near a portion (e.g., the front) of the composting apparatus 2600 and intakes outside air. The heat blower 2610 blows hot air into the composting chamber 2106 and the air is then directed through an air filter 2414 as shown by the line with the arrow. The air is then passed through an exhaust fan and exits the composting apparatus 2600. The air filter 2414 treats and eliminates any odors developed from the composted food waste.

Generally, the odor control system of the composting apparatus 2600 involves dewatering food waste to reduce water content during food intake; removing moisture in a pre-composting chamber with hot air application; conducting heat throughout the compost chambers 2106 such as via the heat blower 2610 and/or heating pad 2612; applying UV light via UV lamps 2414 to liquid collected in the liquid container 2414 and to outgoing air existing the compost chambers 2106; and applying ozone throughout the processing to maintain the internal health of the composting apparatus 2600. One or both of the heat blower 2610 and the heating pad 2612 may be optional in certain cases.

Figure 26C:
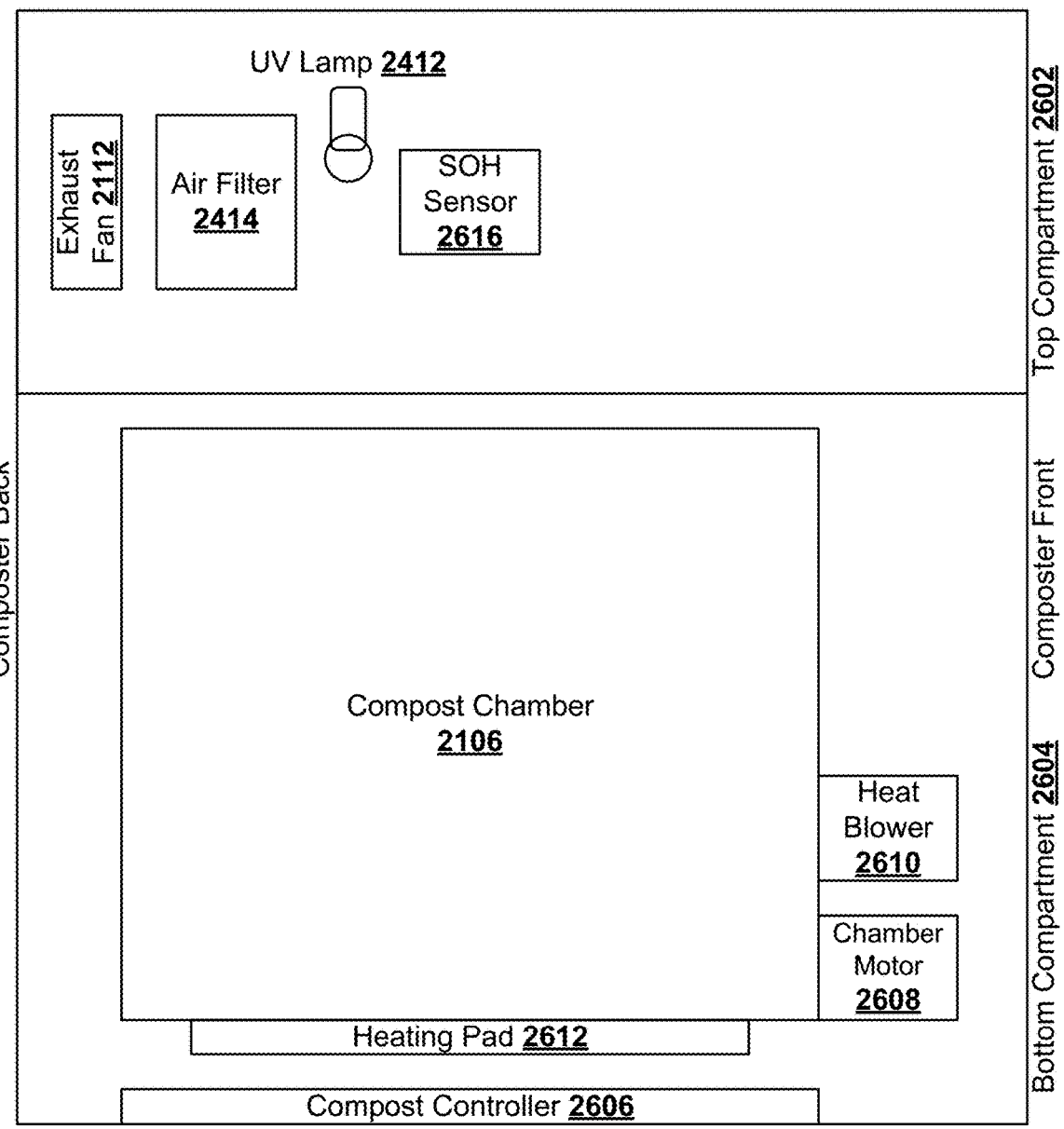

In FIG. 26C, a simplified architecture for a composting apparatus 2600c is shown, according to an example embodiment. The composting apparatus 2600 is capable of handling food waste that is already in small chunks such as, for example, spent coffee grinds.

In this embodiment, the composting apparatus 2600c may not include a waste processing unit 2614, a liquid container 2114, UV lamps 2412, liquid and solid level sensors (not shown), or a dam 2118.

Figure 26D:
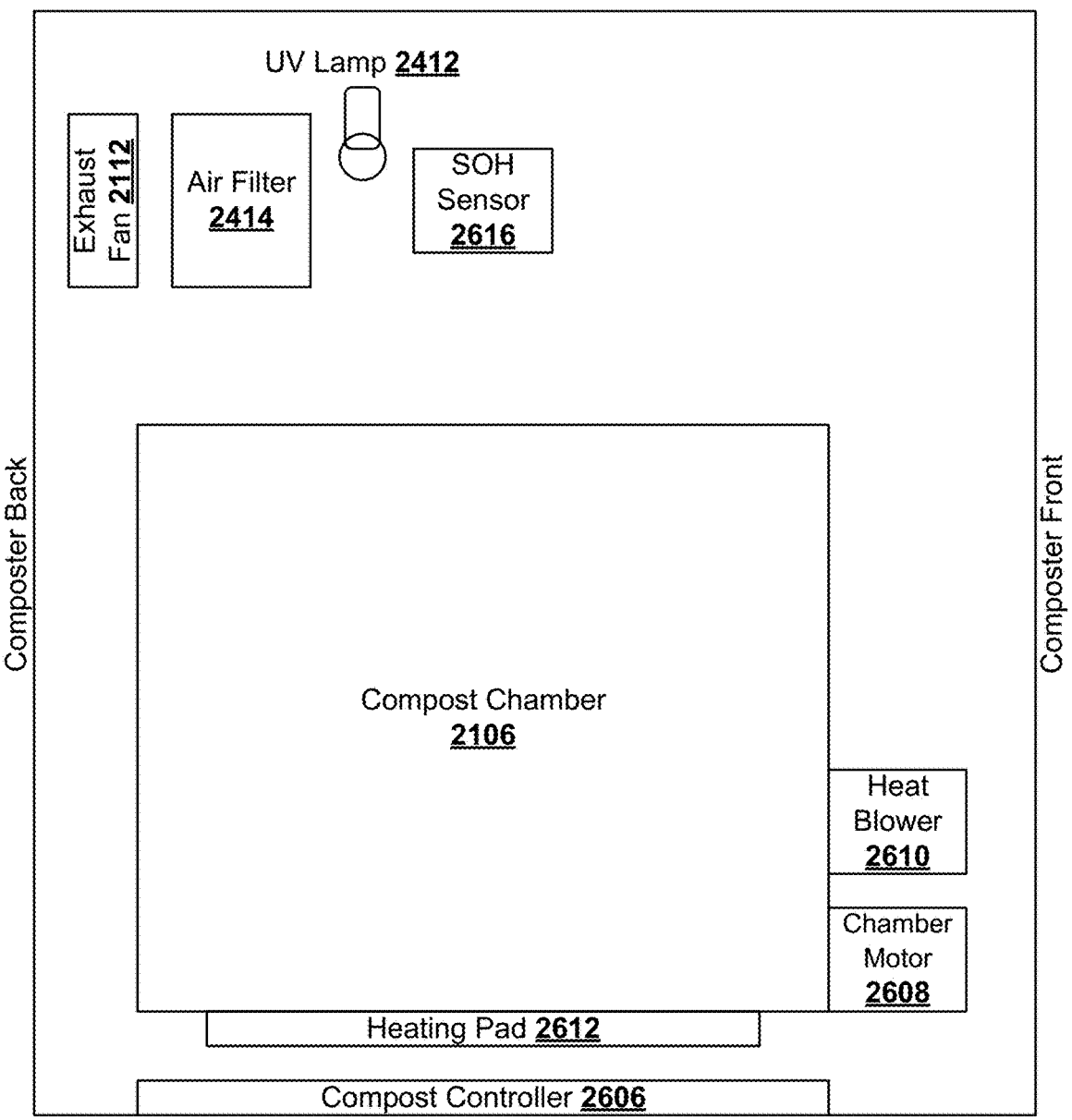

In FIG. 26D, a further simplified architecture for a composting apparatus 26007d is shown, according to an example embodiment. In this embodiment, the composting apparatus may integrate the top compartment 2602 and the bottom compartment 2604 together into a single compartment as shown. Since the top and bottom compartments are merged, a user doesn't need to detach the top to access the compost chambers. Instead, the compost chambers may be pulled out from the front or the side of the system.

Figure 27:
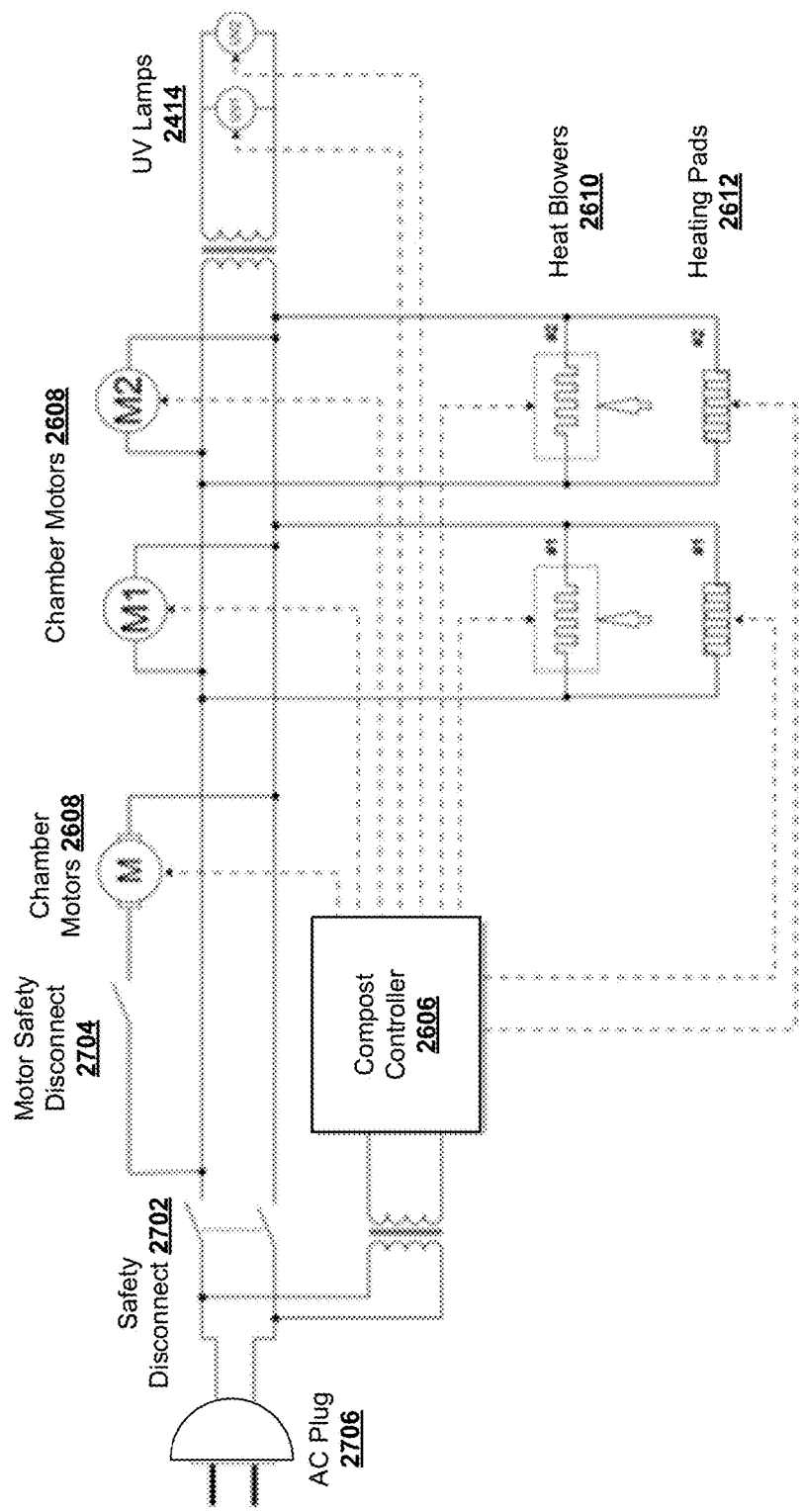
FIG. 27 is a schematic circuit diagram of a composting apparatus, according to one embodiment.

FIG. 27 is a schematic circuit diagram 2700 of a composting apparatus, according to one embodiment, which may be applied to at least one of the composting apparatus embodiments described herein and includes at least some of the previously described elements of FIGS. 21 to 26, as well as a safety disconnect 2702, a motor safety disconnect 2704, and an AC plug 2706. The schematic diagram 2700 generally shows how the compost controller 2606 is generally connected to the various electrical components within the composting apparatus 2600.

For example, the compost controller 2606 may control the heat blowers 2610, the heating pads 2612, the UV lamps 2414, and the chamber motors 2608, as described above. The compost controller 2606 may be implemented at least in part based on the main electronic control system 1011 shown in FIG. 13. The compost controller 2606 is configured to process multi-channel sensory data, schedule events based on RTOS sequences, and modulate voltages for actuators in real-time.

Figure 28:
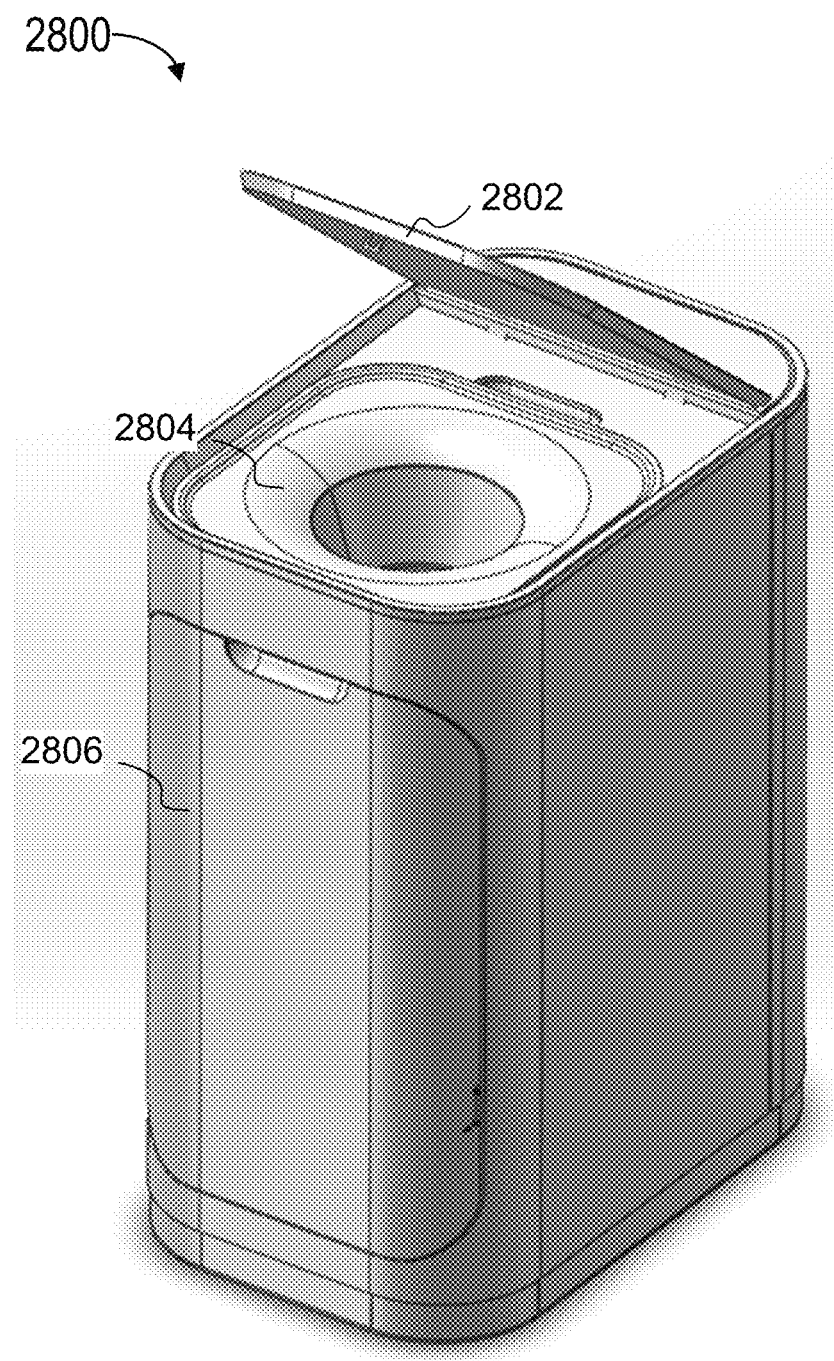
FIG. 28 is a top perspective view of a composting apparatus, according to an example embodiment.
Figure 29:
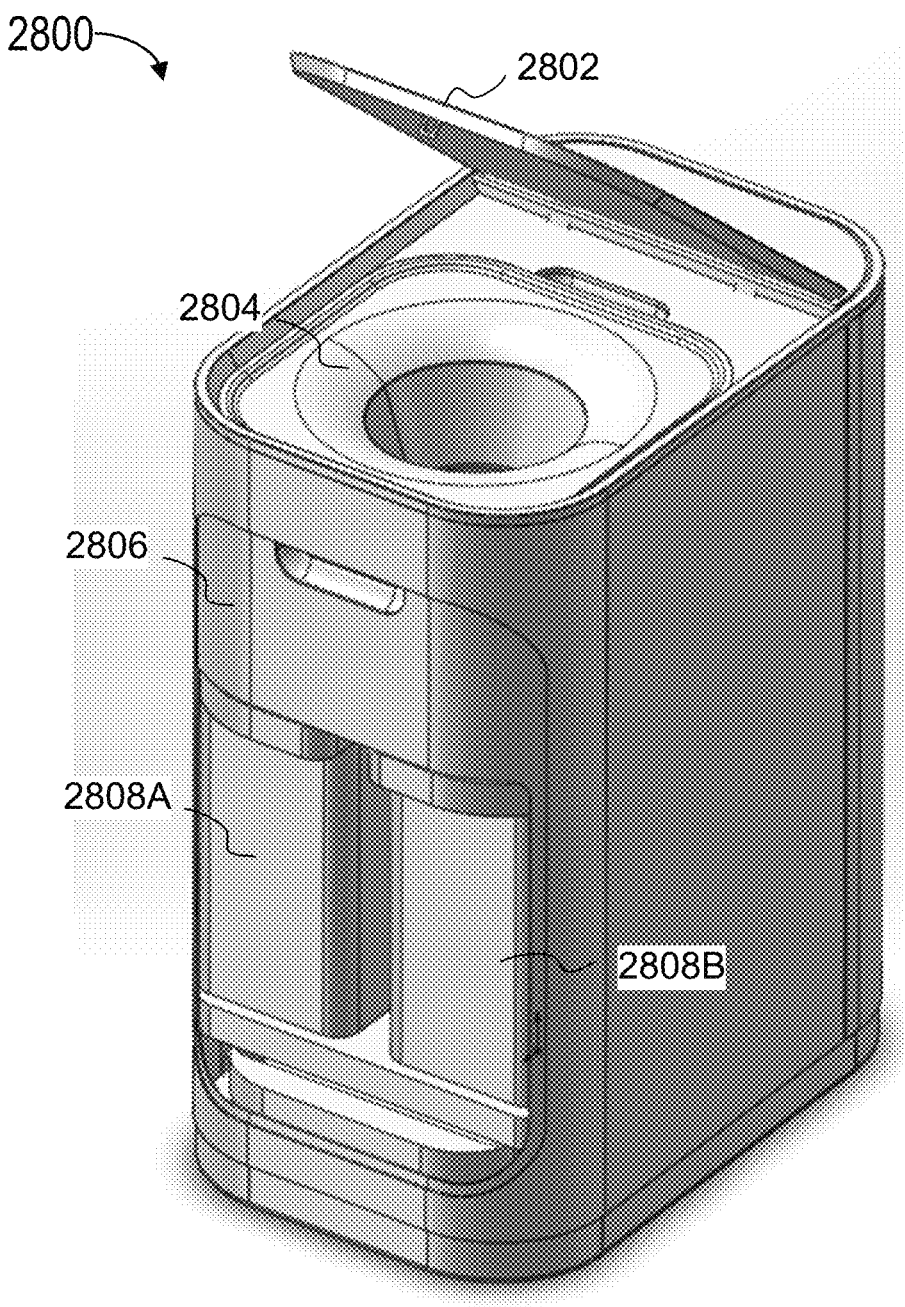
FIG. 29 is a top perspective view of the composting apparatus of FIG. 28 with the chamber door partially removed.

Referring now to FIG. 28, shown therein is a top perspective view of a composting apparatus 2800, according to an example embodiment. The composing apparatus 2800 comprises a lid 2802 and a hopper assembly 2804. The user may open the lid 2802 by using a switch that is connected to an actuator (both not shown) for moving the lid between open and closed positions. As such, the hopper assembly 2804 becomes exposed when the lid 2802 is opened so that the user is able to insert food waste. The composting apparatus 2800 may further comprise a chamber door 2806, by which the composting chambers 2808A and 2808B (see FIG. 29) may be accessed. The dual-chamber embodiment can be seen in FIG. 29 which provides a top perspective view of the composting apparatus 2800 in which a portion of the door 2806 is removed to allow for viewing a portion of the interior of the apparatus 2800.

Figure 30:
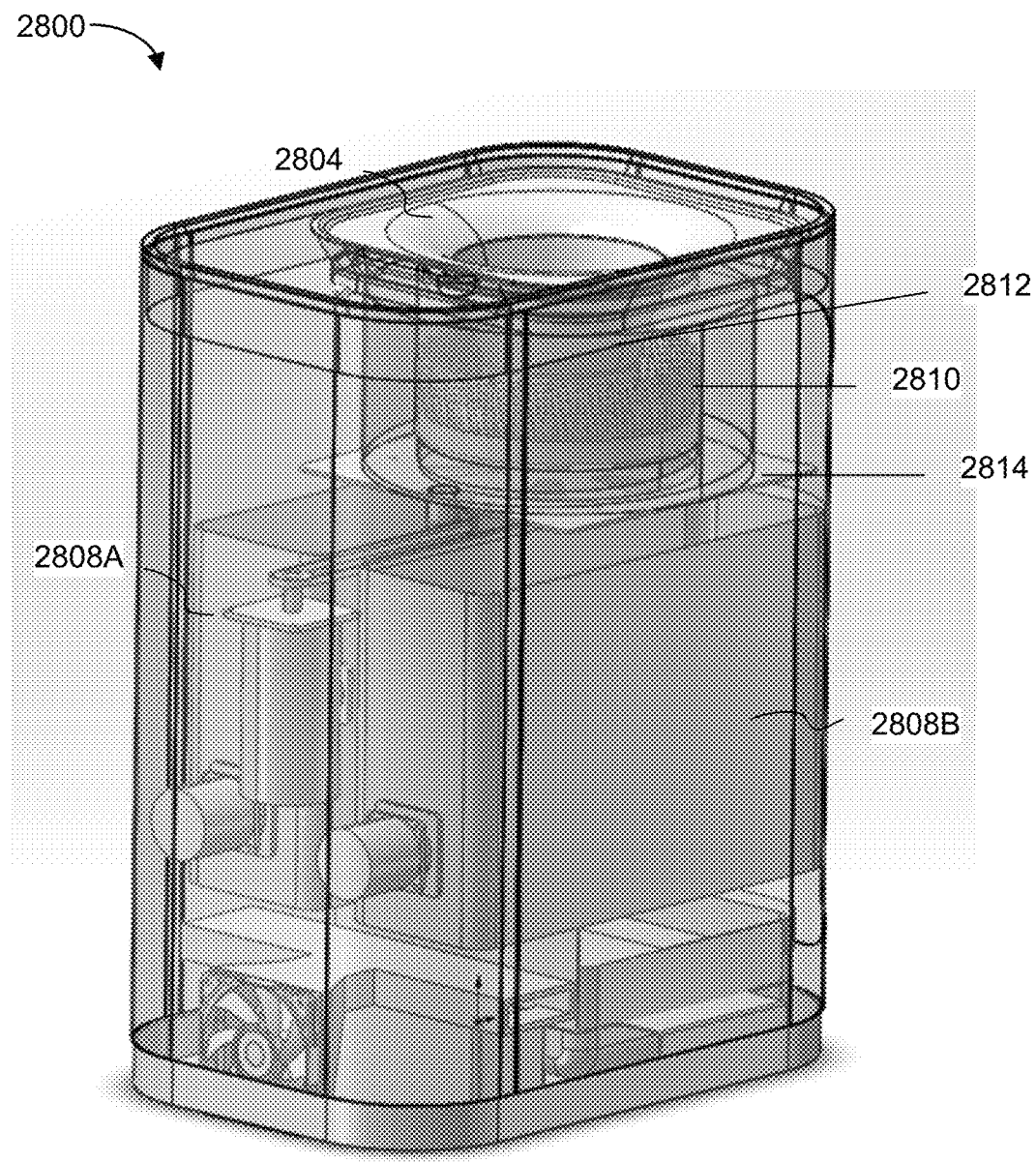
FIG. 30 is a perspective transparent view of the composting apparatus of FIG. 28 to show the inner systems.
Figure 31:
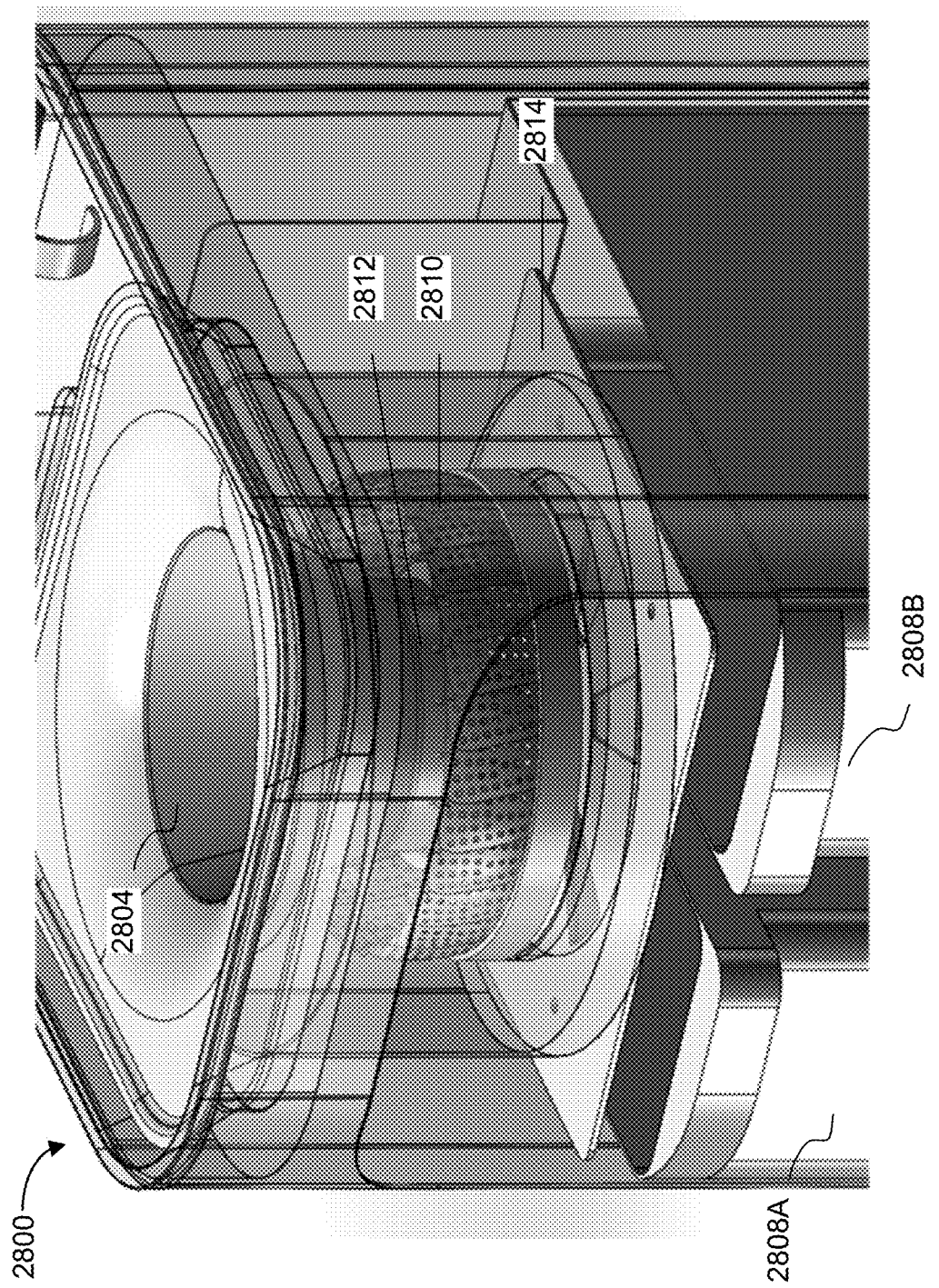
FIG. 31 is an enlarged front perspective partially transparent view of the composting apparatus of FIG. 28 to show the inner systems at the top rear of the apparatus.

Referring now to FIGS. 30, and 31 shown therein is a rear perspective transparent view and a front perspective of an upper portion of the composting apparatus 2800, respectively, to show the inner systems. The hopper assembly 2804 comprises a hopper for receiving food waste at a first end and may include a chopping assembly 2812 at a second end, opposing the first end. When food waste is collected into the hopper, it reaches the chopping assembly 2812, where the food waste becomes chopped, or reduces particle size. In at least one embodiment, the chopping assembly 2812 may comprise rotating blades, grinders, mashers, crushers or any other suitable means of reducing the particle size and volume of food waste. Once the food waste has undergone a reduction in particle size by the chopping assembly 2812, the processed food waste can enter a dewatering assembly. In at least one embodiment, the dewatering assembly may comprise a perforated mesh strainer 2810.

The composting apparatus 2800 further comprises a dam 2814 moveable between several positions such as a first position and a second position. The first position of the dam 2814 covers the first compost chamber 2808A, and the second position of the dam 2814 covers the second compost chamber 2808B. A processor can be communicatively coupled to an actuator to actuate/move the dam 2814 between the first and second positions. The dam 2814 can divert the flow into a second chamber 2808B directly, instead of having to pass through the first chamber 2808A, as the plurality of compost chambers can function as both as a pre-treatment chamber as well as a compost chamber, alternatively, as explained for a previous embodiment.

Figure 32:
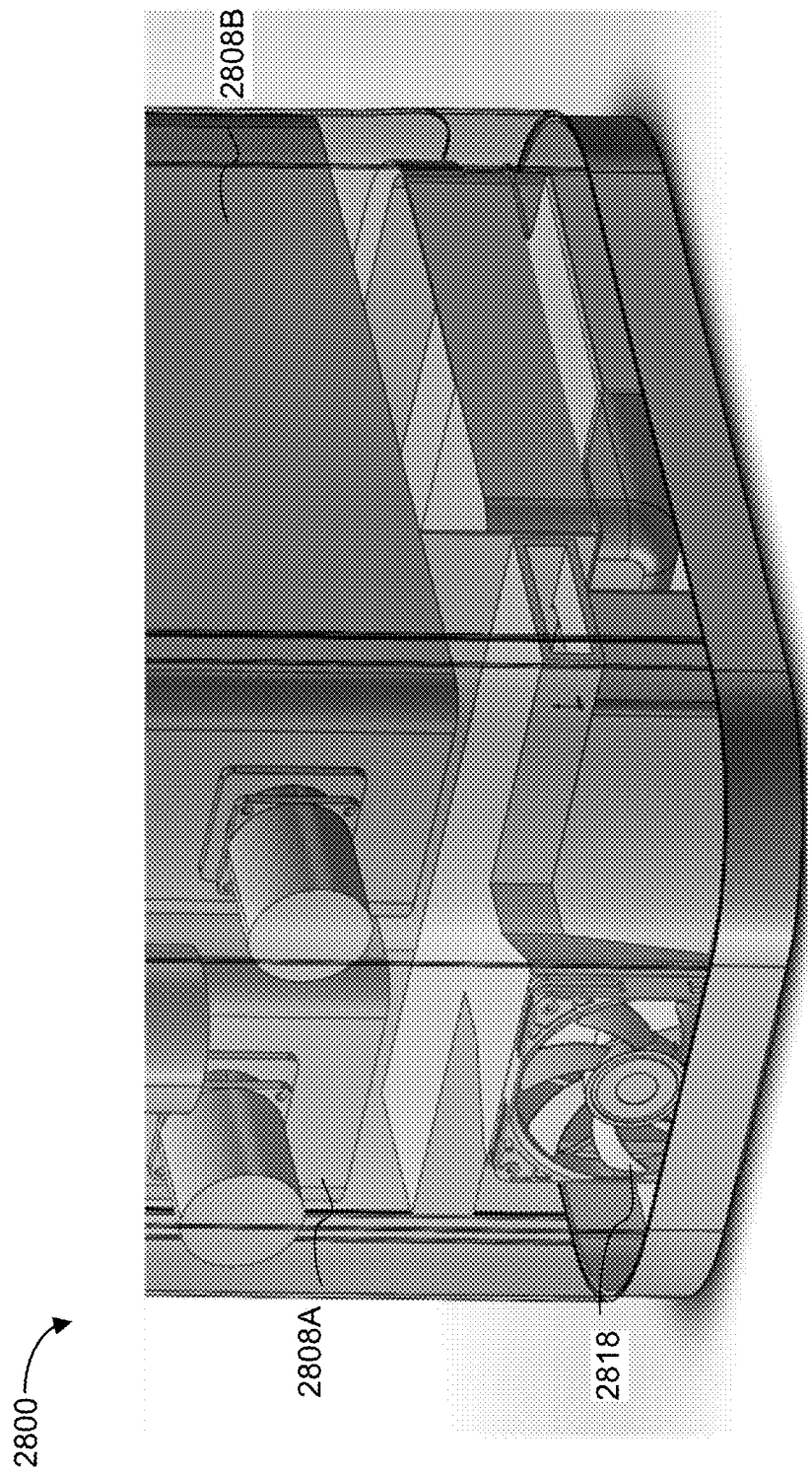
FIG. 32 is an enlarged rear perspective partially transparent view of the composting apparatus of FIG. 28 to show the inner systems at a front bottom portion thereof.

Referring now to FIG. 32, shown therein is an enlarged rear perspective transparent view of a bottom portion of the rear of the composting apparatus 2800 to show the inner systems. The composting apparatus 2800 may optionally include an air-outlet that is downstream of an exhaust fan 2818 at a bottom potion of the composting apparatus 2800. In at least one embodiment, the outlet air flow may be provided by the fan 2818. The airflow from the air-outlet allows air to flow out of the main device body from the plurality of compost chambers 2808A and 2808B. The air-outlet allows any stale air to exit the compost chambers 2808A and 2808B. The air exiting the compost chambers 2808A and 2808B may first be subject to an air filter assembly to ensure that the air exiting the inside of the compost chamber is as odor-free as possible, as explained in an earlier embodiment. Alternatively, the composting apparatus 2800 may include one of the ozone-based odor elimination systems as described previously.

Figure 33:
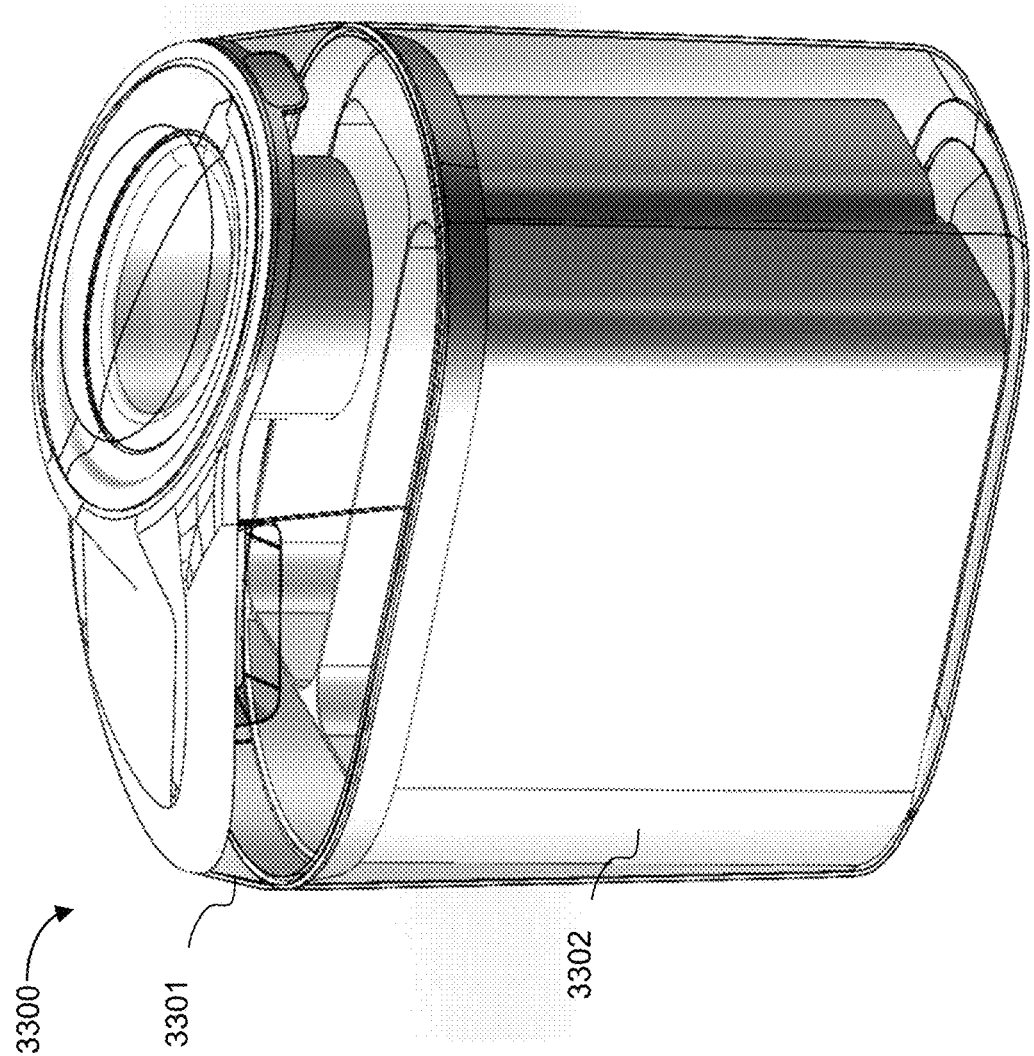
FIG. 33 is a front perspective view of the composting apparatus, according to an example embodiment.

Referring now to FIG. 33, shown therein is a vertical stack configuration of a composting apparatus 3300 including vertical composting chambers 3302. In this embodiment, the compost chambers 3302 can be inserted and removed in a vertical direction when the upper portion of the apparatus 3300 is removed. This is in contrast to the composting apparatus 2800 where the composting chambers 2808A and 2808B may be inserted and removed horizontally. The upper portion 3301 may be removed and then the plurality of compost chambers 3302 as well as the liquid chamber can be inserted or removed vertically as it may be simpler for the user to remove the chambers vertically when they are full and need to be emptied as supposed to horizontally removing the chambers. As with the composting apparatus 3200, many further components can be included in the composting apparatus 3300 such as, but not limited to, one of the odor removal systems, for example.

Figure 34:
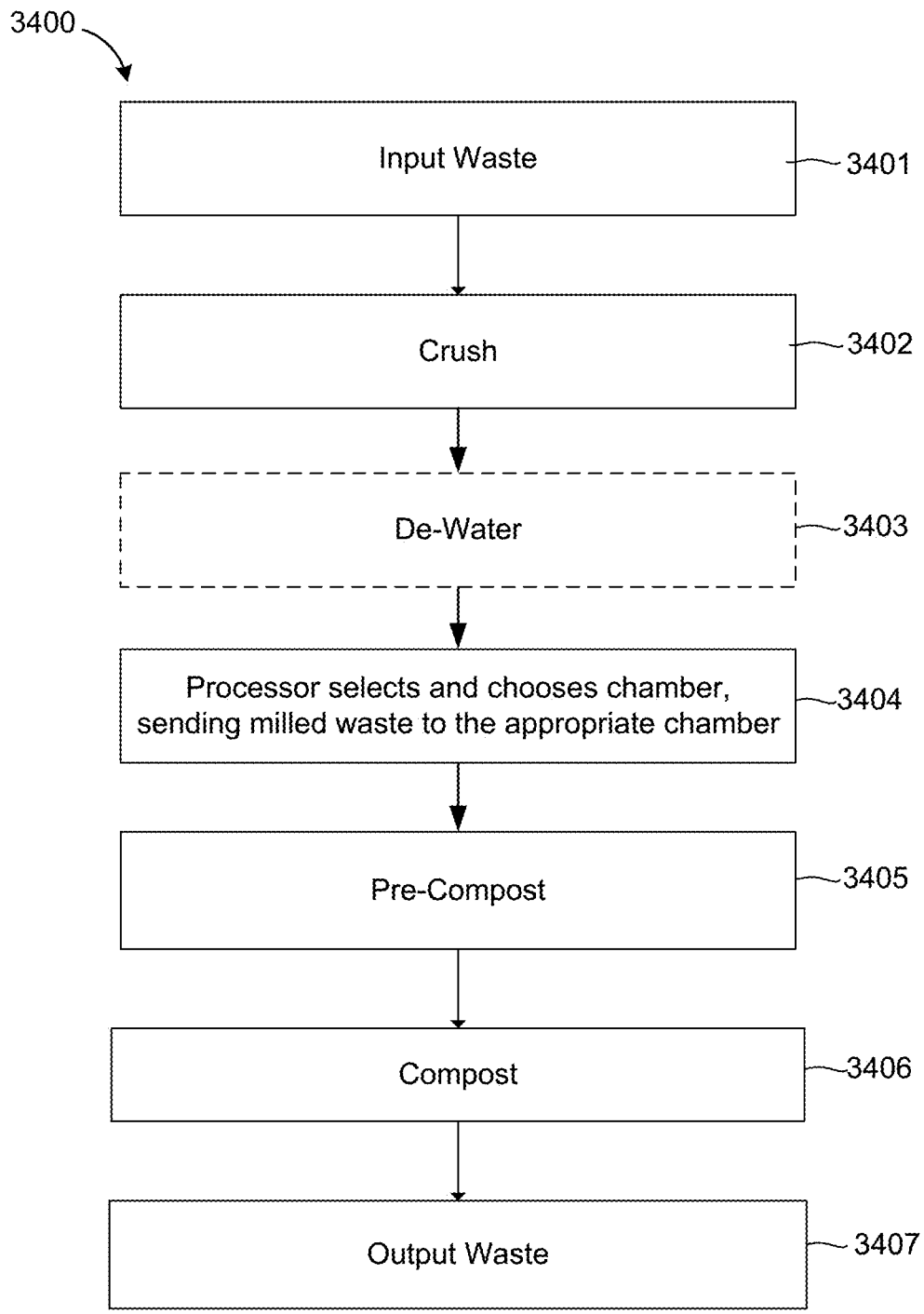
FIG. 34 is a process-flow diagram showing a method of producing compost, according to an example embodiment.

Referring now to FIG. 34, shown therein is a process-flow diagram showing a method 3400 of producing compost, according to an example embodiment. The use of method 3400 depends on the architecture of the composting apparatus. In this embodiment, the method 3400 is applicable when a plurality of compost chambers is located within the composting apparatus. At 3401, waste is input into the composting apparatus. At 3402, the volume of solid input waste can be crushed to reduce individual particle or bit size in the volume of solid waste. At 3403, the milled waste can be dewatered.

In at least one embodiment, the dewatering step 3403 can be optionally performed, where liquid molecules surrounding food waste particles are mechanically removed via pressing, tumbling or centrifugation. This results in a reduction of the bulk moisture content. Optionally, dewatering may be applied during the milling step as milled food waste bits are pressed as they are milled and crushed. Optionally, any grey water that is output from the dewatering step 3403 may go through a filter such as a perforated metal mesh. The filtered water may then flow into the liquid tank assembly to be stored. The liquid tank assembly may include a combination of a water tank and a liquid tank.

At 3404, the milled waste can enter the appropriate composting chamber. In at least one embodiment, a processor can be configured to determine which of the plurality of chambers is most suitable for the input waste. Alternatively, a user may select the chamber by directly moving an object, such as a dam, or using a control element to move the dam to direct compost to the chamber selected by the person. For instance, in one example, a user may input waste into the composting apparatus, and once the input waste is milled, the processor may determine and control one or more components of the composting apparatus to send the waste to a first chamber for composting. Subsequently, if the user again inputs waste into the composting apparatus, the processor may determine and send the waste into the second chamber. The processor selection criteria may be based on one or more conditions, including but not limited at least one of the plurality of chambers being full, at least one of the plurality of chambers being unable to accept further waste, at least one of the plurality of chambers being in an inoperable state, at least one of the plurality of chambers being currently used, at least one of the plurality of chambers being in the middle of a composting sequence, and any other condition that may improve the efficiency of the composting device. For example, in one embodiment, the plurality of chambers may be operable in offset compost cycles such that the compost in each chamber is at a different stage of the composting process. Therefore, as a first chamber is beginning the compost stage, the processor may determine to begin collecting the input waste into a subsequent compost chamber. In one embodiment, there can be one chamber at each stage of the composting process, including but not limited to, pre-composting 3405, composting 3406, and outputting waste 3407. After entering appropriate chamber, at 3405, the waste can pre-composted in a controlled environment. After the pre-composting 3405 is completed, the waste can be composted in a controlled environment. At 3407, the output compost waste can be produced.

Figure 35:
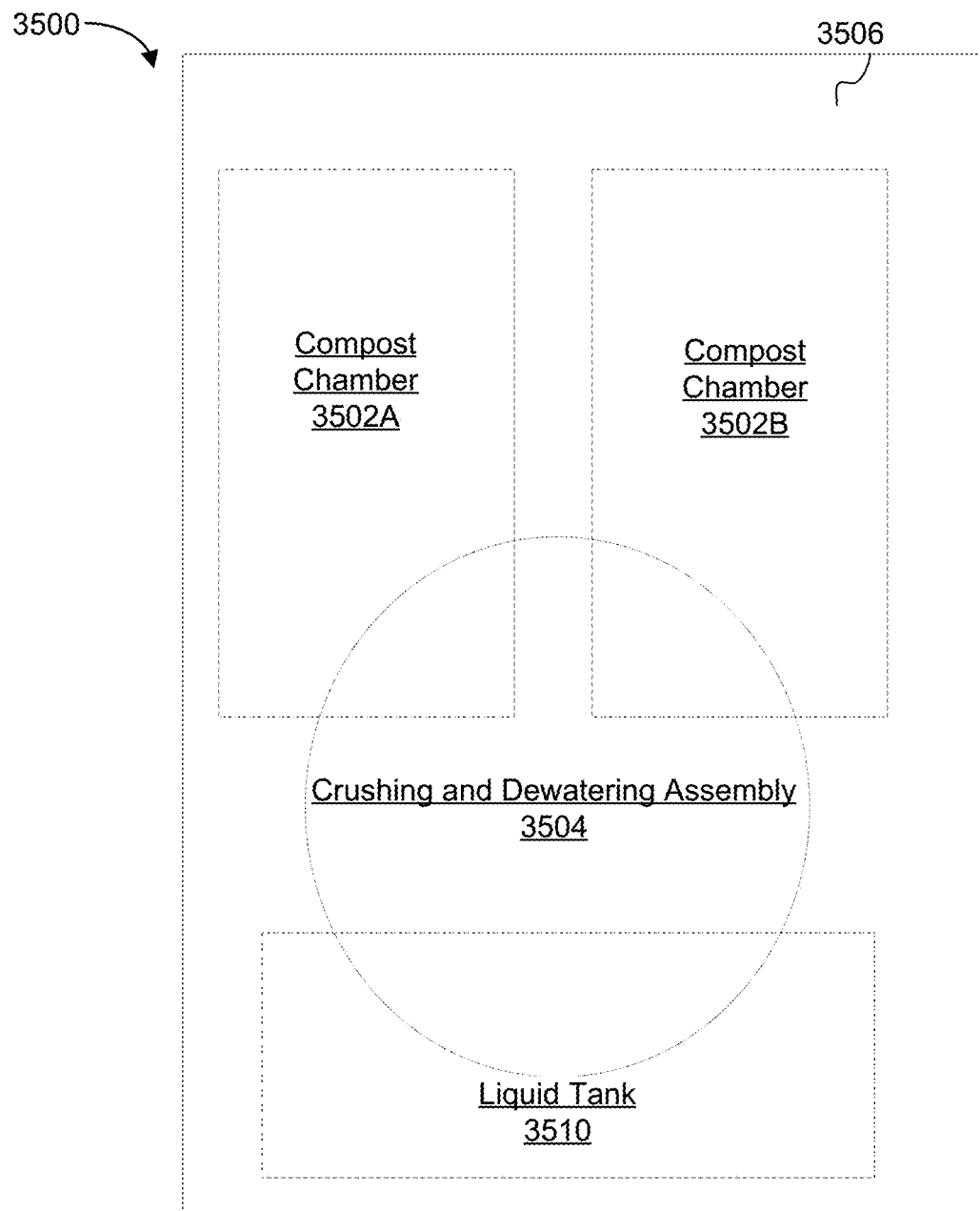
FIG. 35 is a top view of a block diagram of a composting apparatus according to another example embodiment.

Referring now to FIG. 35, shown therein is a top view of a block diagram of a composting apparatus 3500 according to another example embodiment. Shown in FIG. 35, there are a plurality of compost chambers 3502 for storing the pre-composted bits and completing the compost process; and a liquid tank 3510 for storing the liquid produced during dewatering. In this embodiment, the composting apparatus 3500 comprises a main device body 3506. The composting apparatus 3500 further comprises a first compost chamber cavity located within the main device body 3506; a first compost chamber 3502A for performing composting of waste, the first compost chamber 3502A being located in the first compost chamber cavity, a second compost chamber cavity located within the main device body 3506, adjacent to the first compost chamber cavity; and a second compost chamber 3502B for performing composting of waste, the second compost chamber 3502B being located in the second compost chamber cavity. The composting apparatus 3600 can further include a crushing and dewatering assembly 3504. For example, as food waste passes through the crushing and dewatering assembly 3504, it is crushed, milled, cut, or grinded by a crushing assembly; and dewatered by a dewatering assembly. The crushing step ensures a reduced overall volume, increased bulk density, and reduced individual particle sizes.

In at least one embodiment, the composting apparatus 3500 may optionally include the liquid tank assembly 3510 for storing liquid or grey water. For example, in embodiments where de-watering is performed, as the crushed food waste is dewatered, liquid will be produced during dewatering and the produced liquid will flow into the liquid tank assembly 3510. This liquid may be referred to as liquid compost (also called compost tea). This liquid may be stored in the liquid tank assembly 3510 to be converted into liquid compost or compost tea or may be thrown out by the user periodically.

Figures 36A, 36B:
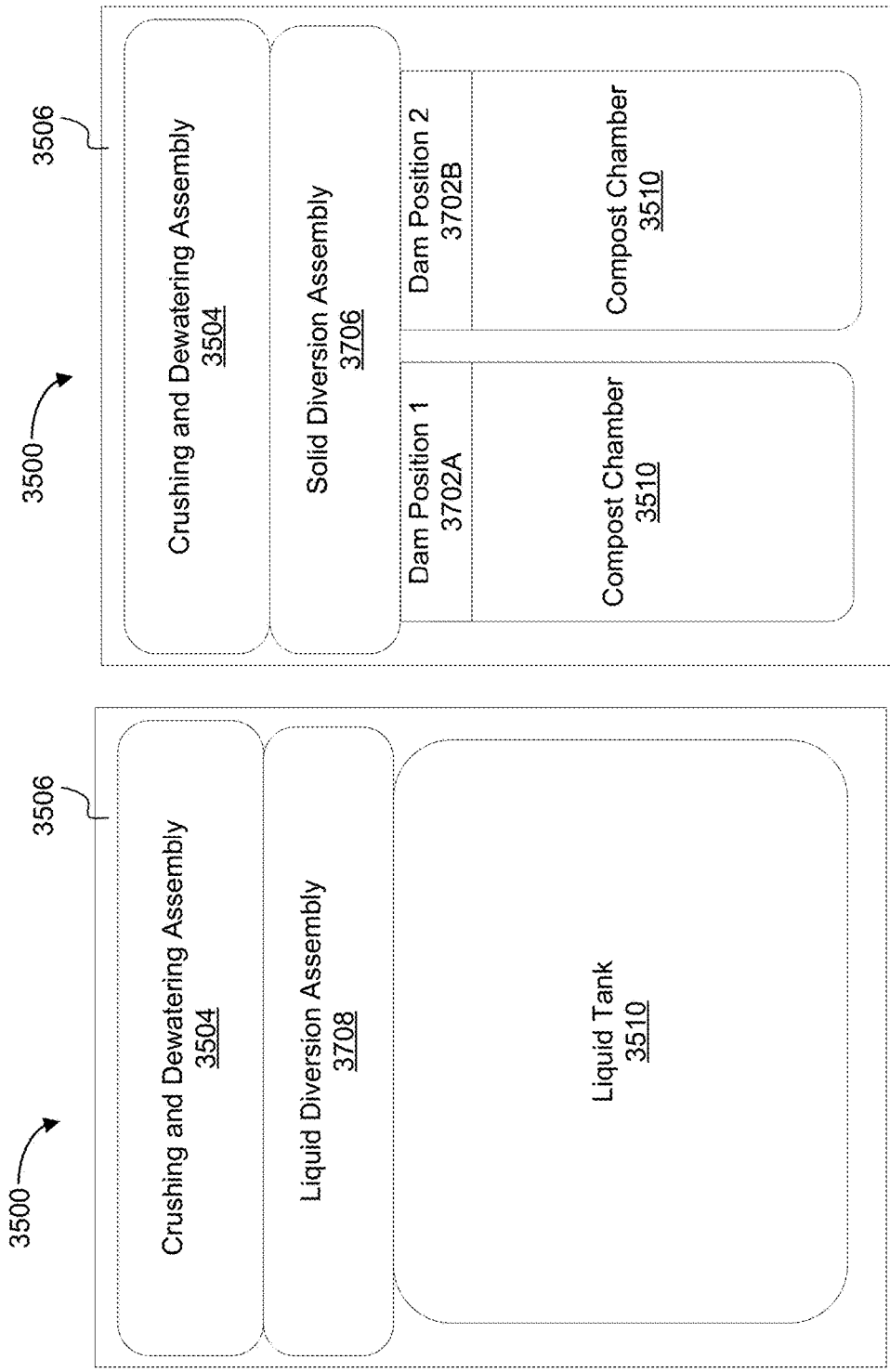
FIG. 36A is a front view of a block diagram of the composting apparatus of FIG. 35.
FIG. 36B is a rear view of a block diagram of the composting apparatus of FIG. 35.

Referring now to FIG. 36A, shown therein is a front view of a block diagram of the composting apparatus of FIG. 35. In this embodiment, the composting apparatus 3500 further comprises a liquid diversion assembly 3708. In one embodiment, the liquid diversion assembly 3708 can be located above the liquid tank 3510. As the liquid from the input waste is dewatered by the crushing and dewatering assembly 3504, the liquid diversion assembly can divert the liquid into the liquid tank 3510. For example, the liquid diversion assembly may be a dam assembly, or it may have a flushing mechanism that is similar to a toilet for example.

FIG. 36B provides a rear view of a block diagram of the composting apparatus of FIG. 35. The composting apparatus 3500 comprises a plurality of compost chambers 3510. In this embodiment, the composting apparatus 3500 comprises a solid diversion assembly 3706. The solid diversion assembly 3706 comprises a dam assembly having a dam 1702 (see FIG. 18) that is moveable between a first position 3702A and a second position 3702B. The first position 3702A of the dam covers the first compost chamber 3510A, and the second position 3702B of the dam covers the second compost chamber 3510B. A processor can be communicatively coupled to the actuator that is connected to the solid diversion assembly 3706 to actuate the dam between the first and second positions 3702A and 3702B. Alternatively, the user may manually move the dam between those positions or interact with a control element, such as a switch, which then activates the actuator to move the dam.

Figure 37:
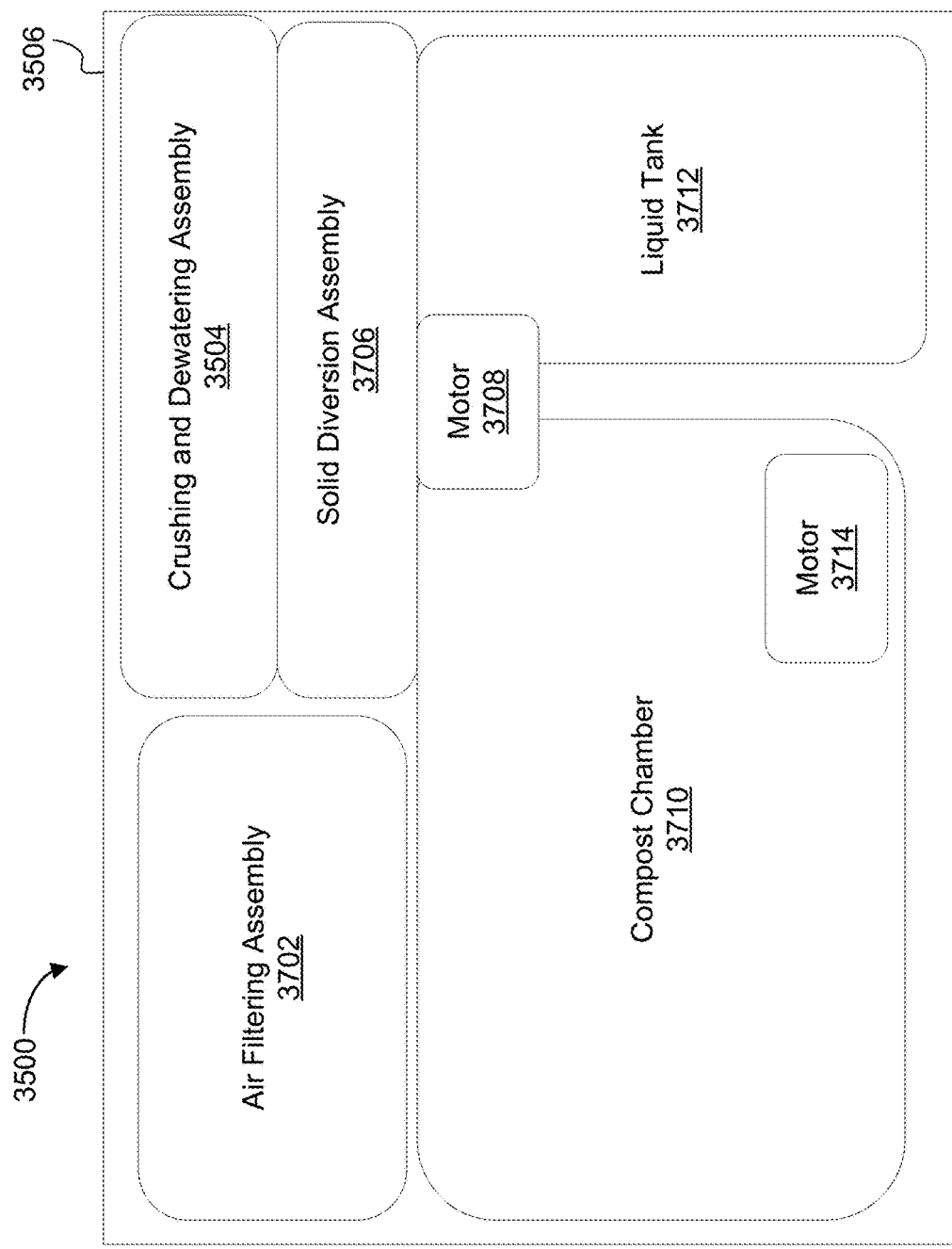
FIG. 37 is a top view of a block diagram of the composting apparatus of FIG. 35.

Referring now to FIG. 37, shown therein is a side view of block diagram of the composting apparatus 3500 of FIG. 35, which shows the previously described elements of FIGS. 35, 36A and 36B, as well as first motor 3708, a second motor 3714, and an air filtering assembly 3702 that are included in the composting apparatus 3500.

The first motor 3708 can be removably coupled to a pretreatment device (not shown), which may be used during pretreatment for crushing, volume reduction squeezing, centrifuging for dewatering, or any operable combination thereof. The pretreatment device may be removed for cleaning purposes. For example, in at least one embodiment, the pretreatment device may be the crushing and dewatering assembly 3504, and the motor 3708 is coupled to the crushing and dewatering assembly 3504. The food waste that is deposited can be pre-treated by crushing and dewatering assembly 3504 through actuation by the motor 3708 to create pre-treated bits. Post pre-treatment, the pre-treated bits may be transferred to one of the plurality of compost chambers 3710, by the use of the solid diversion assembly and the moveable dam. The plurality of compost chambers 3710 may be coupled to the second motor 3714. The motor 3714 may be coupled to an impeller or ribbon mixer in the compost chambers, in at least one embodiment. For example, a drive shaft may be configured to connect with multiple impellers with a single motor shaft. The air filtering assembly 3702 can comprise an air filter for filtering the air inside the compost chambers 3710. In at least one embodiment, the motor (and other components such as pad heater, PTC heater and sensors) may reside inside the compost chamber and connect with the main device (e.g., device housing and non-removable components) via an electrical coupler.

Figure 38:
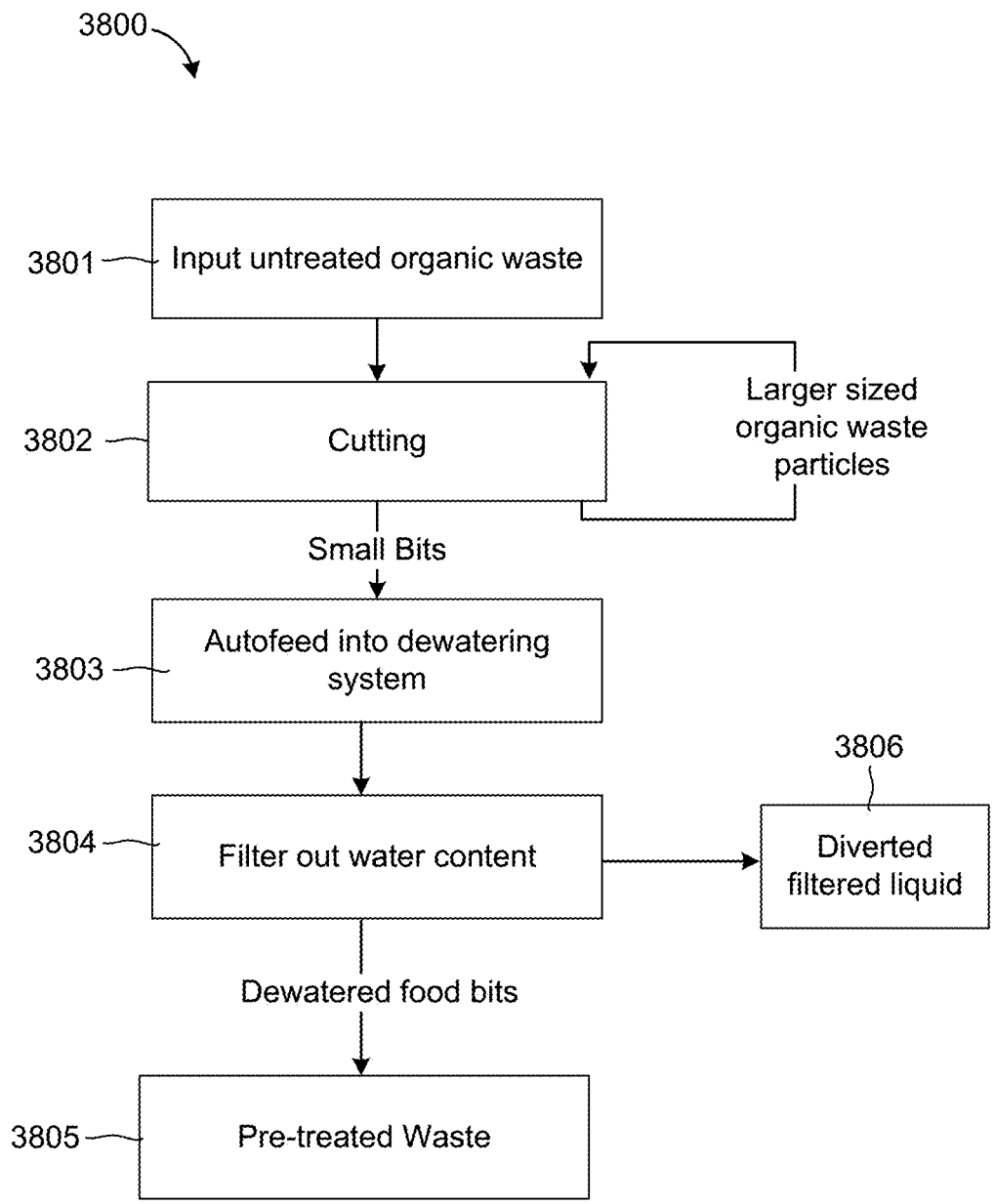
FIG. 38 is a flowchart showing a method of pre-treating organic waste, according to an example embodiment.

Referring now to FIG. 38, shown therein a process-flow diagram showing a method of pre-treating food waste, according to an example embodiment. The food waste is pre-treated before being diverted into compost chamber for pre-composting. The aim of pre-treatment is to control the size and water content of food waste to enhance pre-composting and composting efficiency and quality. In the first step at 3801, food and organic waste is input into system. At this stage, the input waste is untreated, and hence, the water content and size can be unpredictable and uncontrollable. As the untreated waste is input into the composting apparatus, the crushing assembly crushes the input waste by cutting or chopping at step 3802. In one embodiment, the input waste can be chopped multiple times within a short period of time by a set of choppers (e.g., a chopper assembly) as described below. Smaller-sized organic waste particles can be pushed out of the crushing assembly and be automatically fed into the dewatering assembly, while larger-size organic waste particles can be re-circled within the crushing system until no large pieces remain in the crushing assembly. For example, this might be achieved by performing cutting actions during a vortex particle flow within an RPM range such as between about 500 to about 1000. In the next stage and at step 3803, the size-reduced organic waste particles enter the dewatering assembly where water content of the organic waste particles is reduced and controlled to be within a designated range. The compost tea collected during the dewatering step can be filtered out at step 3804. The liquid that is filtered out can optionally be diverted by the liquid diversion assembly into the liquid tank at step 3806. After the dewatering and liquid diversion steps, the pre-treatment stage is completed and the food waste is considered pre-treated waste at step 3805. The pre-treated waste can meet any pre-treating requirements and can be suitable for pre-composting.

Figure 39:
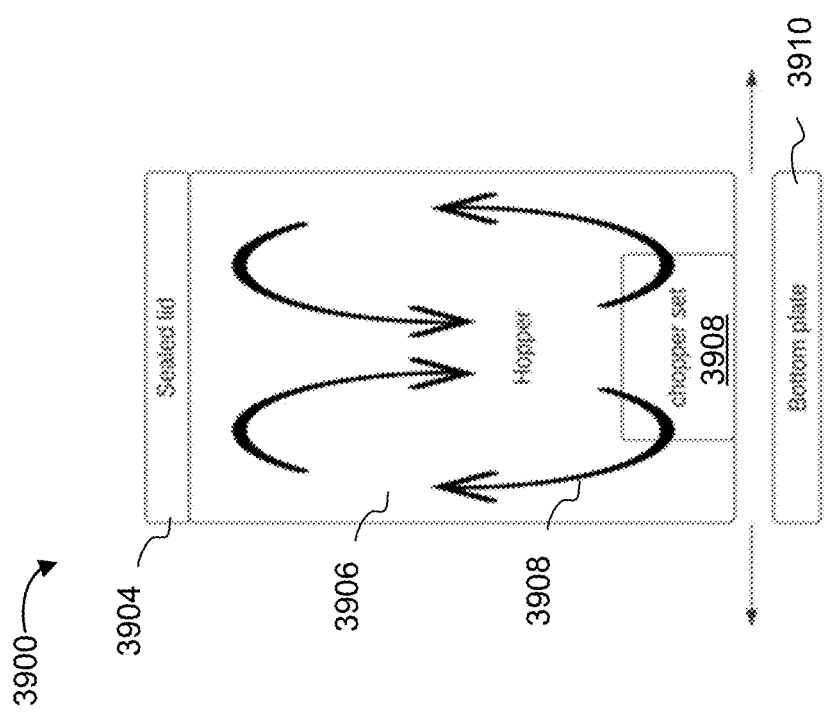
FIG. 39 is a block diagram of a crushing assembly of a composting apparatus, according to an example embodiment.

Referring now to FIG. 39, shown therein a block diagram of a crushing assembly 3900, according to an example embodiment. In this embodiment, the crushing assembly 3900 comprises a lid 3904, a hopper 3906, a set of choppers 3908, and a bottom plate 3910. The hopper 3906 can be a container with at least one opening (e.g., a first opening) on the top side for receiving input waste and at least one opening (e.g., a second opening) on the bottom side for outputting crushed waste particles. The target of use of the hopper 3906 is to contain food waste, so the hopper is designed with a volume that is sufficient to contain a designated amount of organic waste and allow circulation (see arrows 3908) of organic waste during cutting. The top opening of the hopper 3906 is sealed with a removeable lid 3904, which can be controlled to allow access to the hopper 3906. To input food waste into the hopper 3906, the lid 3904 can be opened manually or automatically such as by a motion sensor activation or switch activation. During the chopping stage, the lid 3904 closes, either manually or automatically and seals the top opening of the hopper 3906 to prevent organic waste from expunging out (e.g., exiting/ejecting) from the top opening of the hopper 3906. The bottom plate 3910 can be placed on, but not necessarily affixed onto the main shaft, to avoid particles from getting stuck between the plate 3910 and the choppers 3908. In one example embodiment, the bottom plate 3910 can rotate at a speed between about 0 rpm and about the blade rpm due to friction.

The crushing assembly 3900 may further comprise a set of choppers (also referred to as "chopper set") located inside the hopper 3906. The set of choppers can include one or more cutters, spinning blades and cutting discs, or combination thereof. The chopper can be configured to chop, cut, mill or grind organic waste and split it into a plurality of pieces, or bits. The chopper can also be configured to reduce the particle size of the pieces, or bits. The chopper set 3908 can be located at a bottom of the hopper 3906, in one embodiment. In an alternative embodiment, the chopper set can be located or the top or the side walls of the hopper 3906. In an embodiment, the crushing assembly 3900 can include a plurality of chopper sets 3908. In this embodiment, each of the chopper sets can be located at a different location within the hopper 3906 to achieve even circulation 3908 and faster crushing.

The crushing assembly 3900 may further comprise a bottom plate 3910 positioned under the hopper 3906. The bottom opening of the hopper 3906 is sealed with the bottom plate 3910, which can be structured and/or controlled to prevent bits of organic waste from dropping and exit the crushing assembly before crushing is completed. The bottom plate 3910 may be designed to seal the bottom opening of the hopper 3906. When combined with the lid 3904, and the bottom plate 3910, the hopper 3906 forms a semi-enclosed environment with the only exit in the gap between the hopper's bottom opening and bottom. The bottom gap may have a radial opening angle between about 1 and about 360 degrees. A plurality of openings may be included to direct the flow of particles that are expunged out of the hopper 3906. The bottom plate may further comprise a mesh grating having a plurality of openings sized to allow small organic waste particles to fall through and blocking larger sized particles to be recirculated 3908 in the hopper 3906. The grating can be optionally interchangeable to allow varying particle sizes to be accepted or blocked.

Figure 40:
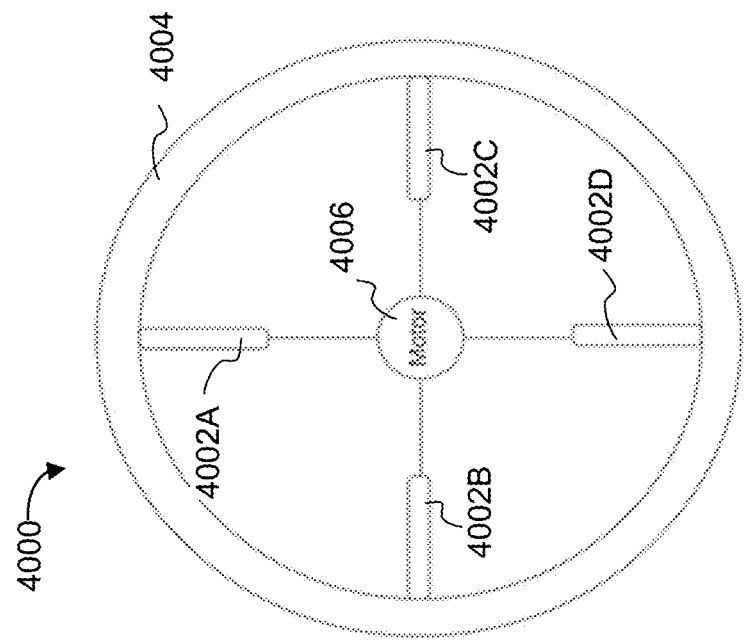
FIG. 40 is a block diagram of a dewatering assembly of a composting apparatus, according to an example embodiment.

Turning now to FIG. 40, shown therein is a block diagram of a dewatering assembly 4000, according to an example embodiment. The dewatering assembly 4000 includes two subsystems, including a filter mesh assembly 4004 and a mesh wiping assembly 4002. The filter mesh assembly 4004 can be a cylindrical drum with through holes or perforations located on the curved surface of the cylindrical drum. The mesh can have perforation or holes with sizes ranging from about 0.5 mm to about 20 mm. The mesh wiper assembly 4002 can include at least one wiper 4002, or optionally a plurality of wipers 4002A-4002D that are located in proximity to, or in contact with, the mesh assembly 4004. In at least one embodiment, the wiper assembly 4002 may comprise a set of rubber or silicone tips at 4002A, 4002B, 4002C and 4002D to ensure any crushed food bits stuck to the inner wall of the filter mesh are being pushed away. The filter mesh assembly 4004 may further comprise a plate 4008 which can be a flat disc located at the bottom opening of the cylinder drum. The plate 4008 can have a plurality of small openings or holes. The plate may be a rasp plate or grinding plate. The plate 4008 can be used to cut the food waste into smaller bits; as well as used to push the food waste out and feed it into the dewatering system.

The filter mesh assembly 4004 and the mesh wiping assembly 4002 can be coupled to a motor 4006 which can be configured to rotate these assemblies. In at least one embodiment, the filter mesh assembly 4004 and the mesh wiping assembly 4002 can rotate independently of one another, and their rotation axles can be aligned concentrically.

During the dewatering step, the crushed waste bits enter the dewatering system 4000. At dewatering stage, the mesh filter 4004 and the wiper assembly 4002 can rotate, for example at the same angular velocity as one another. As a result, the crushed waste bits can become caught on the inner wall of the filter mesh 4004 while the water content in the input will be pass through the holes of the filter mesh 4004 and leave the dewatering system 4000. The longer the assemblies rotate along with the crushed waste bits, the more liquid can be filtered out, and the water content of the waste bits will be decreased over time. The dewatering step can provide sufficient reduction of water content, such as to a level below about 50%, for example. The crushed bits after the dewatering step may be referred to as pre-treated compost.

Figure 42:
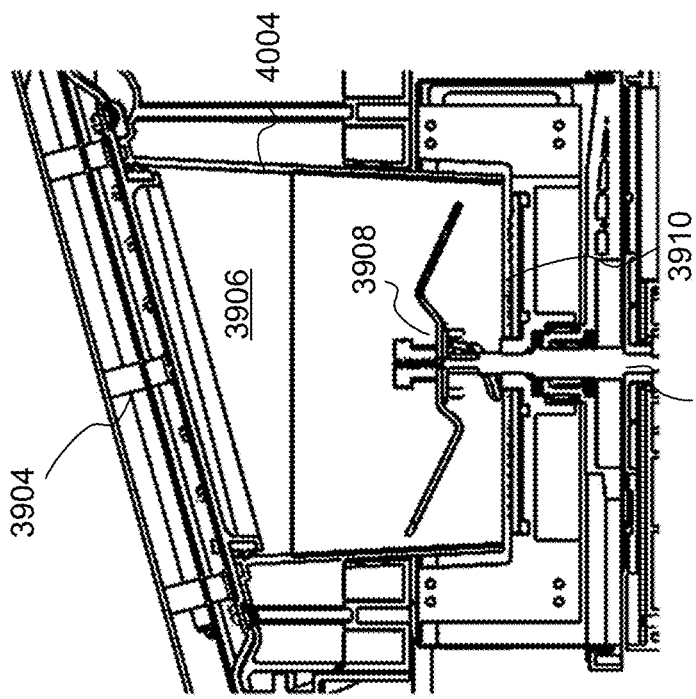
FIG. 42 is a side view of a crushing and dewatering assembly of the composting apparatus of FIG. 41.
Figure 41:
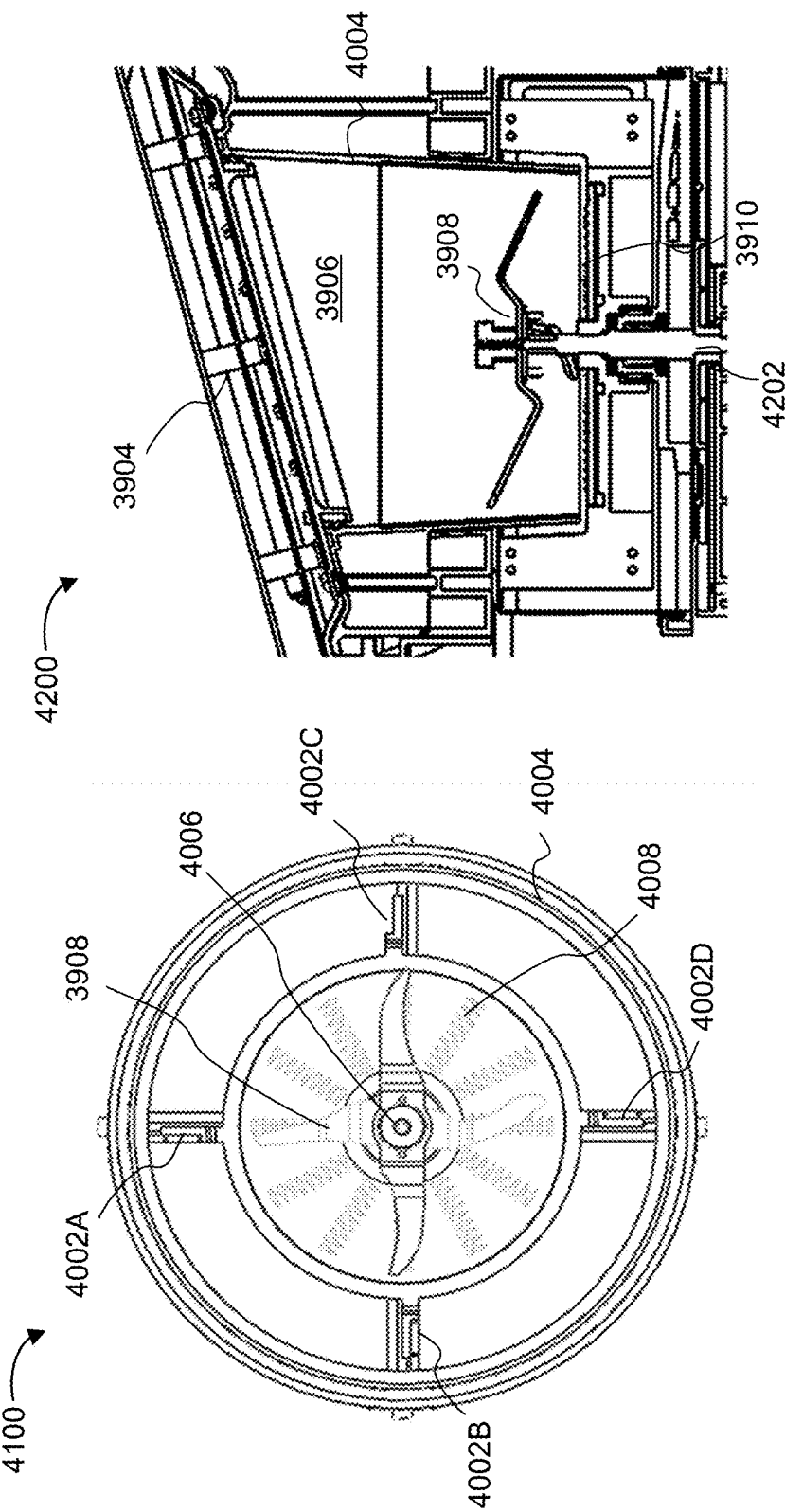
FIG. 41 is a top view of a crushing and dewatering assembly of a composting apparatus according to another example embodiment.

In at least one embodiment, the dewatering assembly 4000 may comprise a self-cleaning feature or phase. In the cleaning phase (also referred to as a cleaning stage), the filter mesh assembly 4004 and the wiper assembly 4002 can rotate at different angular velocities, causing a relative movement between the two subsystems. As a result, any crushed bits that remains on the inner wall of the filter mesh can be wiped out. The pre-treated compost waste leaves the dewatering system in a designated channel and can be automatically fed into the next set of assemblies. Meanwhile, the filter mesh is cleaned and is ready to dewater the next batch of crushed bits. FIGS. 41 and 42 provide top and side schematic views of a crushing assembly 3900 and dewatering assembly 4000 of the composting apparatus, which includes the previously described elements of FIGS. 39, 40 and 41, as well as shaft 4202 which can be connected to the motor 4006.

Figures 43, 44:
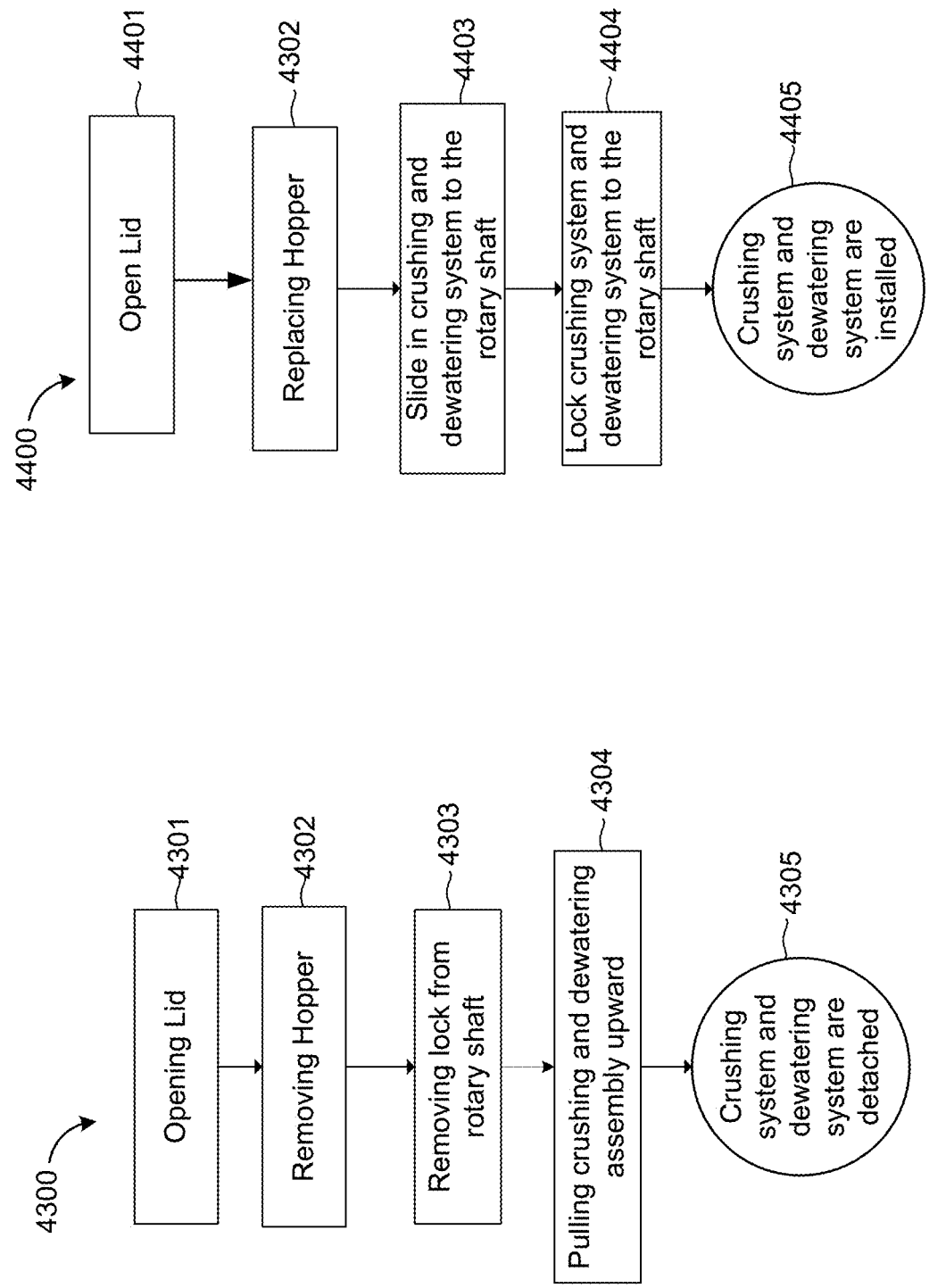
FIG. 43 is a process-flow diagram showing a method of removing crushing system and dewatering system, according to an example embodiment.
FIG. 44 is a process-flow diagram showing a method of installing the crushing system and dewatering system, according to an example embodiment.

Turning now to FIG. 43, provided therein is a process-flow diagram showing a method 4300 of detaching crushing and dewatering assemblies, according to an example embodiment. In some cases, it may be advantageous to remove and detach the crushing and dewatering assemblies, for example for cleaning, storage or maintenance. The crushing and dewatering assembly can be detached from the composting apparatus by opening the lid at step 4301, removing the hopper assembly at step 4302, unlocking a lock from a rotary shaft at step 4303, pulling the crushing and dewatering assembly upwards at step 4304, and detaching the crushing and dewatering assembly from the composting apparatus body at step 4405.

FIG. 44 provides a process-flow diagram showing a method 4400 of installing the crushing system and dewatering system, according to an example embodiment. It may be advantageous or required to install the crushing and dewatering assemblies, for example after removing the crushing and dewatering assemblies for cleaning, storage or maintenance. The crushing and dewatering assembly can be installed to the composting apparatus by opening the lid at step 4401, replacing the hopper at step 4302, sliding the crushing and dewatering assembly downwards on the shaft at step 4403, locking the crushing and dewatering assembly to the rotary shaft at step 4304, thus resulting in installing the crushing and dewatering assembly to the composting apparatus body at step 4405.

Figure 45B:
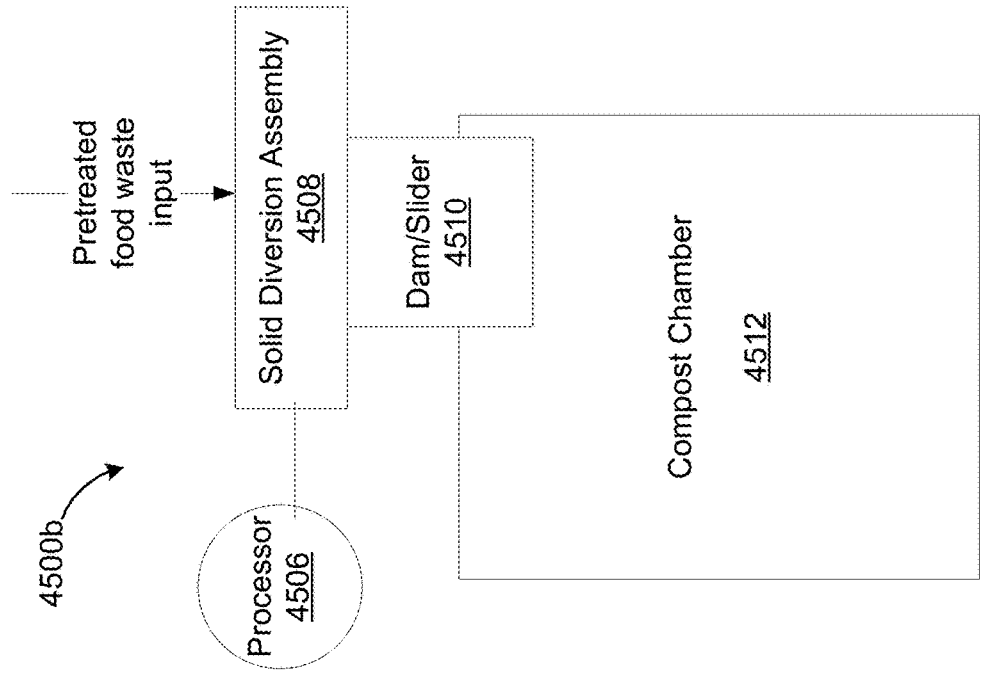
FIG. 45B is a block diagram showing a method of diverging pre-treated food waste into the appropriate chamber of the composting apparatus.
Figure 45A:
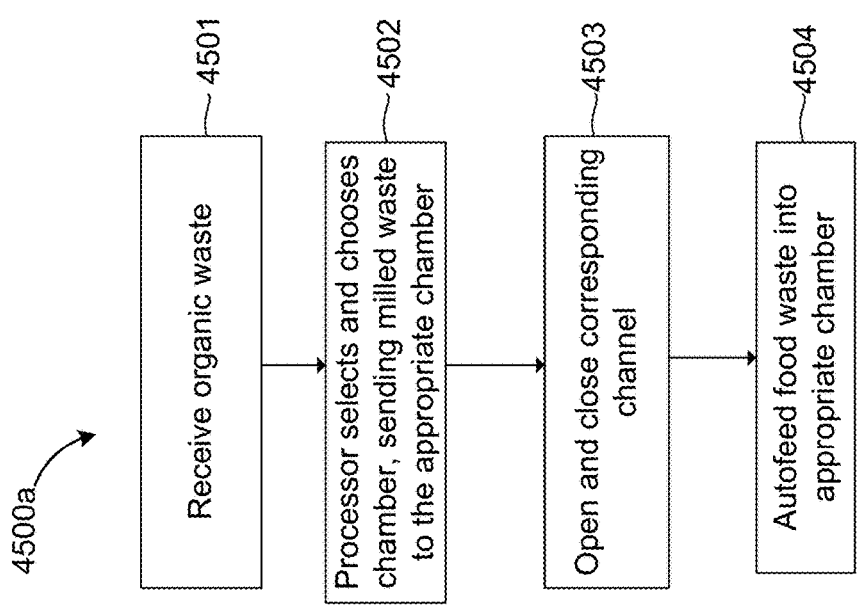
FIG. 45A is a process-flow diagram showing a method of diverging pre-treated food waste into the appropriate chamber of the composting apparatus.

FIG. 45A provides a process-flow diagram showing a method 4500a of pre-treating organic waste, according to another example embodiment. The method 4500a can comprise: inputting the waste into the composting apparatus at 4501; crushing or cutting the input waste to reduce individual particle or bit size in the volume of solid waste at 4502; smaller-sized organic waste particles can be pushed out of the crushing assembly, while larger-size organic waste particles can be re-circulated within the crushing system until the large particle size is reduced for the remaining bits; and receiving pre-treated bits at step 4503.

FIG. 45B provides a block diagram 4500b showing how to divert pre-treated food waste into the appropriate chamber of the composting apparatus. When organic waste is received; a compost chamber can be selected, via a processor, and the milled waste can be sent to the appropriate chamber by sending a control signal, from the processor, to a solid diversion assembly that is moved to provide an opening at least one appropriate chamber while also closing the at least one other chamber; thereby automatically feeding the particles into the appropriate chamber for composting. In at least one embodiment, the processor can be used to determine which of the plurality of chambers is most suitable for the input waste. The processor may then actuate a dam to block openings of any inappropriate chambers and unblock the opening(s) of the chosen chamber(s) to direct compost to the selected chamber.

Figures 46, 47:
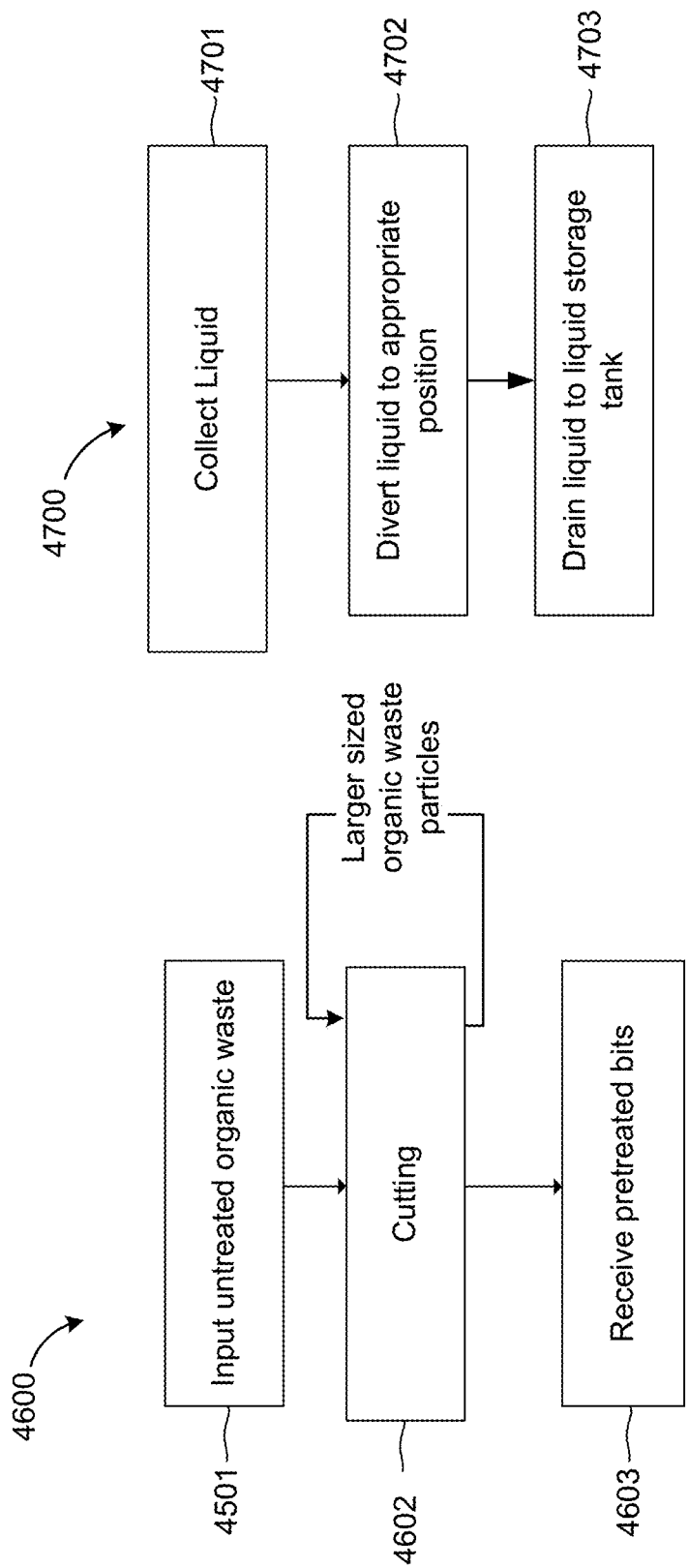
FIG. 46 is a process-flow diagram showing a method of pre-treating organic waste, according to another example embodiment.
FIG. 47 is a flowchart showing a method of diverting liquid from the compost, according to an example embodiment.

FIG. 46 provides a process-flow diagram showing a method 4600 of pre-treating organic waste, according to another example embodiment. The method 4600 can comprise: inputting the waste into the composting apparatus at 4601; crushing or cutting the input waste to reduce individual particle or bit size in the volume of solid waste at 4602; pushing smaller-sized organic waste particles out of the crushing assembly while larger-size organic waste particles can be re-circulated within the crushing system until the particles with large particle sizes are reduced in size to smaller remaining bits; and the pre-treated bits can be received at step 4603.

FIG. 47 is a flowchart showing a method 4700 of diverting liquid from the compost, according to an example embodiment. In this embodiment, method 4700 for diverting liquid from the compost can comprise: collecting liquid at 4701; diverging liquid collected to an appropriate position at 4702; and draining the liquid to a liquid storage compartment or liquid tank at 4703. In one embodiment, and as shown in FIG. 36A, the liquid diversion assembly 3708 can be located above the liquid tank 3510. As such, when the liquid from the input waste is dewatered by the crushing and dewatering assembly 3504, the liquid diversion assembly can use gravitational forces to divert the liquid into the liquid tank 3510. Alternatively, and/or in combination of, airflow generated by the dewatering assembly may be used to divert the liquid into the liquid tank.

Figure 48:
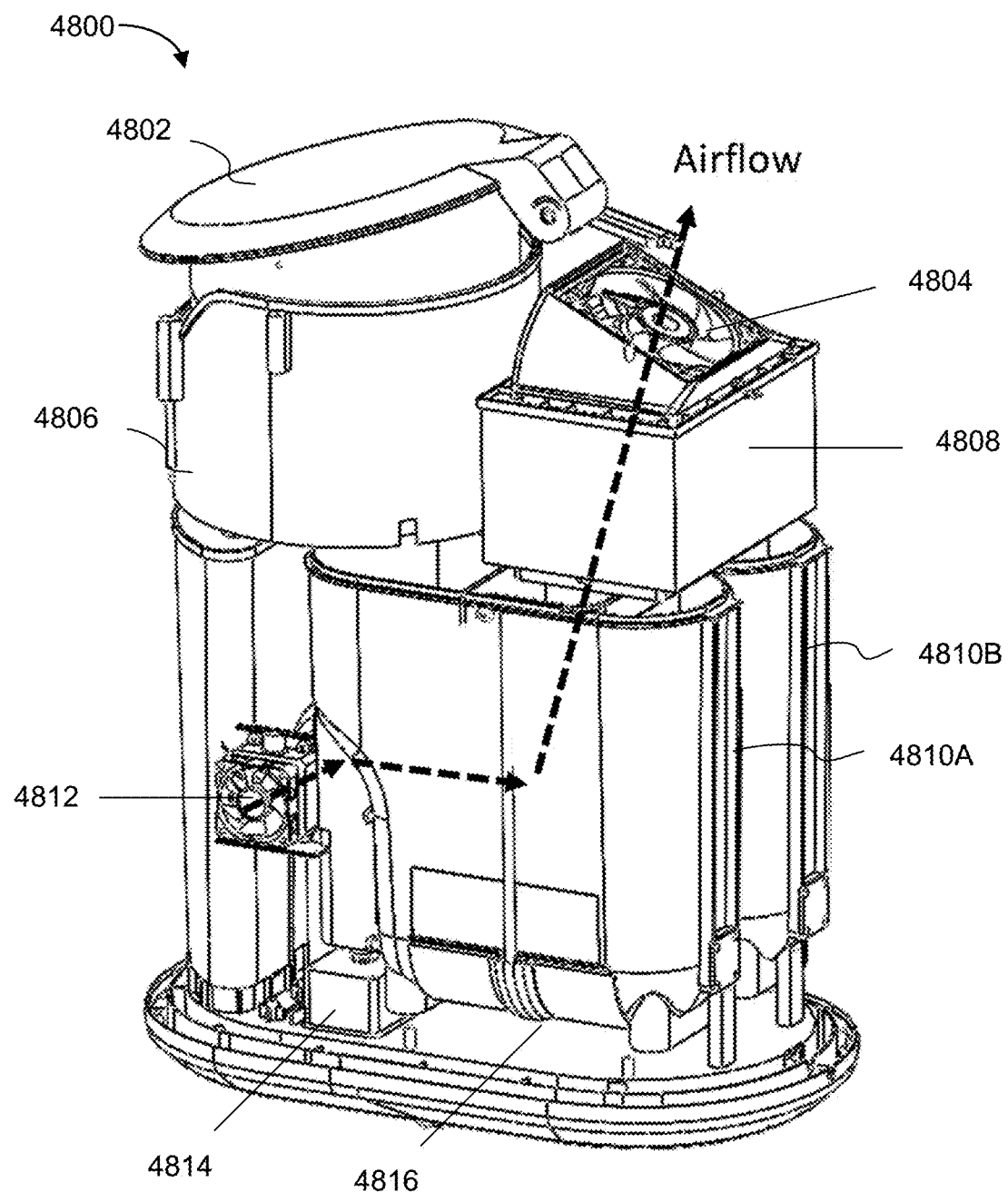
FIG. 48 is a rear perspective view of the composting apparatus according to an example embodiment, with the composter covering removed to show the flow of air through the composting apparatus.

Turning now to FIG. 48, provided therein is a rear perspective view of a composting apparatus 4800 according to an example embodiment. In this figure, the chamber covering has been removed to show the flow of air through the composting apparatus 4800 during operation. The composting apparatus 4800 includes a lid 4802 which allows access to a hopper 4806 for receiving input organic waste. The input organic waste is treated according to any of the previously described methods of pre-treatment. After the pre-treatment stage, the pre-compost is received by at least one of the plurality of compost chambers 4810A, 4810B. The compost chambers 4810A, 4810B further comprise a motor 4814 configured to couple to one or more impellers or a mixer located within the compost chambers 4810A, 4810B to mix the compost as described in any of the previous embodiments and methods of mixing the compost.

Figure 49:
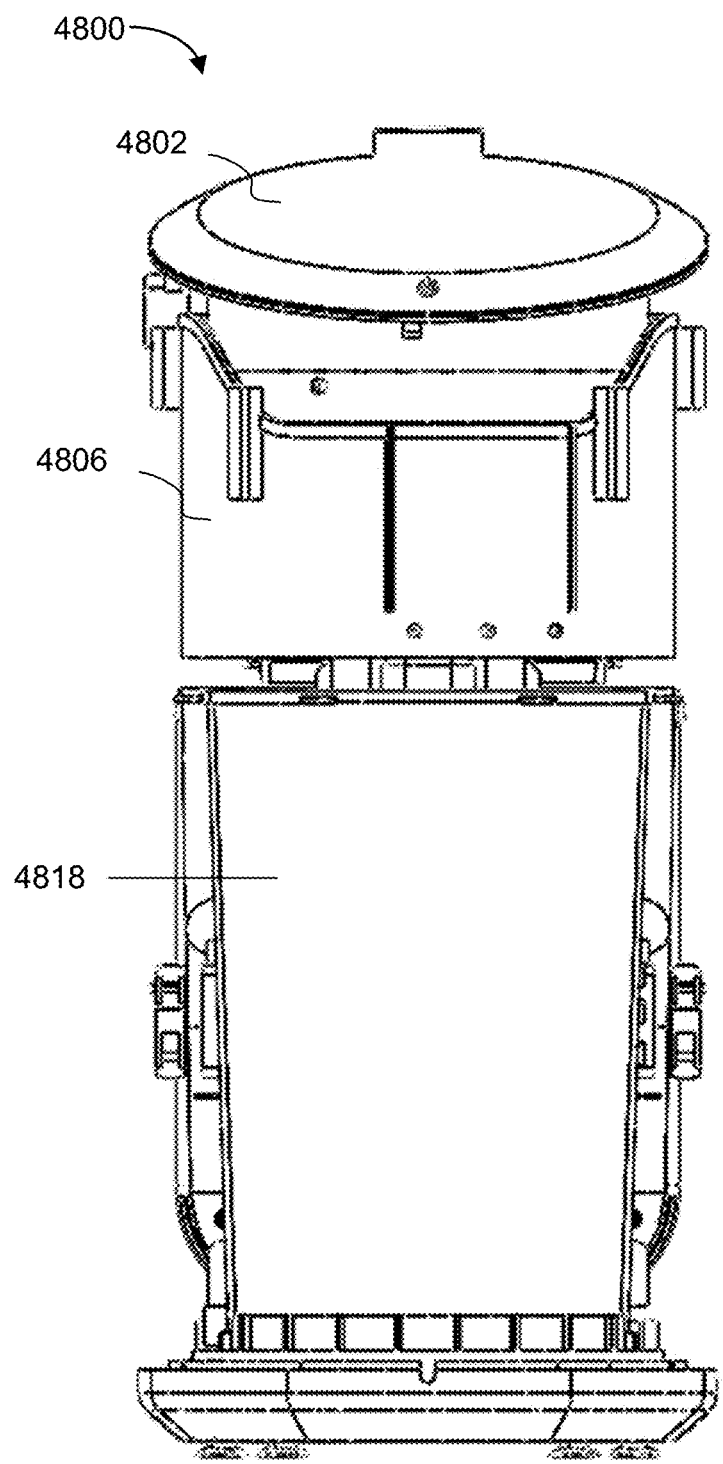
FIG. 49 is a front view of a composting apparatus of FIG. 48 with the composter covering removed to show the internal systems of the composting apparatus.

The composting apparatus 4800 further includes a heat-blower that is upstream from an air-outlet 4804. The airflow path occurs from the heat-blower 4812 through the compost chambers 4810, through the air filter 4808 and out of the air-outlet 4804. In at least one embodiment, the airflow through the air-outlet may be provided by an exhaust fan 4804. The airflow from the air-outlet allows air to flow out of the main device body from the plurality of compost chambers 4810A and 4810B. The air-outlet allows any stale air to exit the compost chambers 4810A and 4810B. The air exiting the compost chambers 4810A and 4810B may first be passed through/processed by an air filter assembly 4808 to ensure that the air exiting the inside of the compost chambers 4810A and 4810B is as odor-free as possible, as explained for earlier embodiments. Alternatively, the composting apparatus 4800 may include one of the ozone-based, or UV-based odor elimination systems as described previously. The compost chambers 4810A and 4810B may include an external heating element 4816, such as a heating pad 4816 to provide heating to the compost chambers 4810. FIG. 49 provides therein is a front view of the composting apparatus 4800, with the chamber covering removed to show some internal systems of the composting apparatus 4800. The composting apparatus 4800 includes the previously described elements of FIG. 48, as shown in a front view thereof, as well as a liquid tank 4818. The liquid tank 4818 stores the liquid produced from the hopper 4806 during dewatering by the dewatering assembly 4000.

Figure 50:
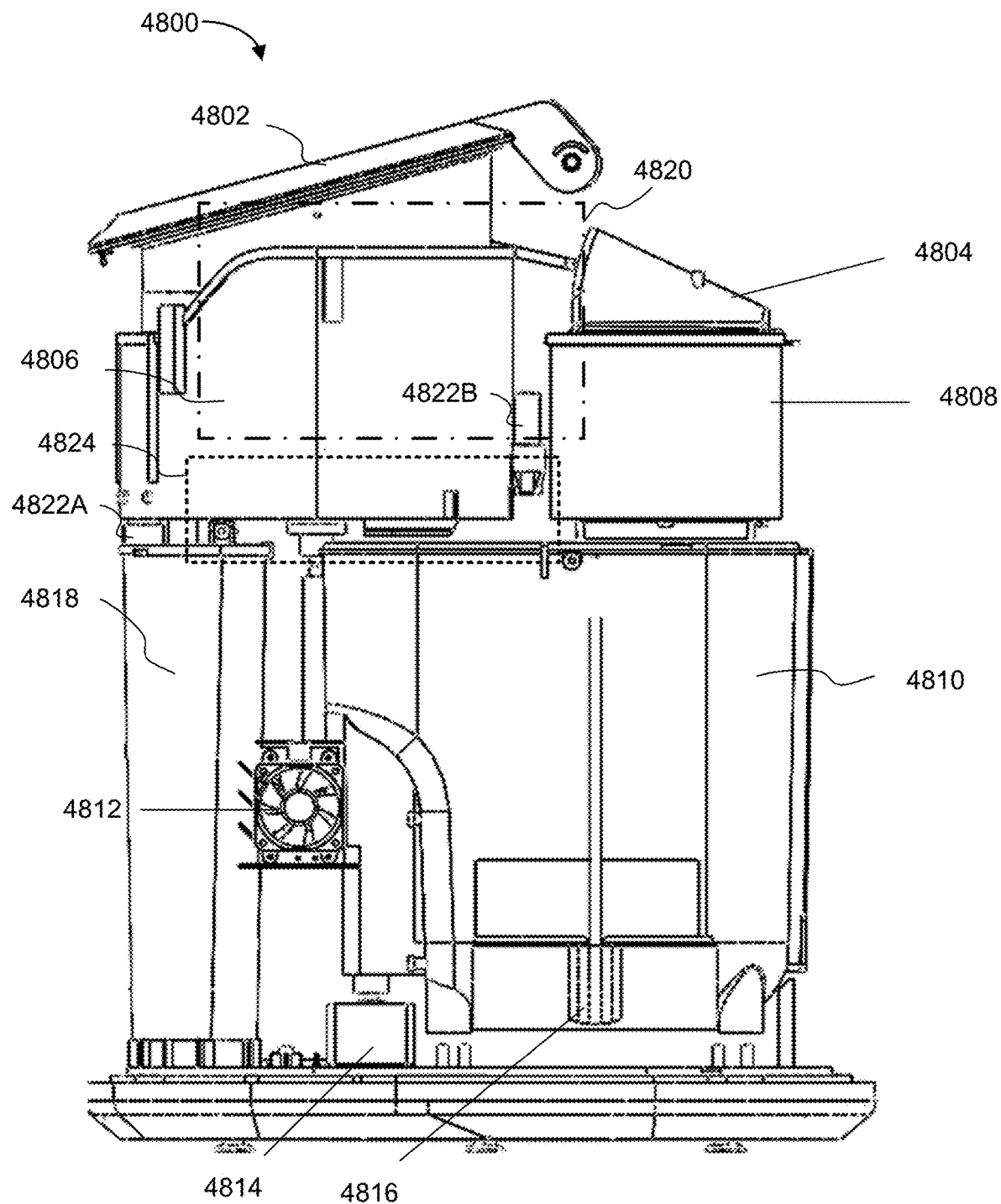
FIG. 50 is a side view of the composting apparatus of FIG. 48 with the composter covering removed to show the internal systems of the composting apparatus.

FIG. 50 is a side view of the composting apparatus 4800 of FIG. 48 with the composter cover removed to show some internal systems of the composting apparatus 4800. The composting apparatus 4800 includes the previously described elements of FIG. 48, as well as, a first UV-lamp 4822A, a second UV-Lamp 4822B, a solid diversion assembly 4824, and a waste pre-treatment assembly which includes the hopper 4806 for producing pre-treated compost.

In at least one embodiment, The UV lamps or lights 4822 may be included to provide disinfection/sanitation as described earlier. The UV sterilization may be performed using at least one UV light 4822B coupled to the air filter 4808 or, least one UV light 4822A coupled to, or placed above the liquid tank 4818 to prevent odor generation or molding within the liquid tank. In at least one embodiment, UV lights may also be placed near a condenser in embodiments which include a condenser.

Figure 51:
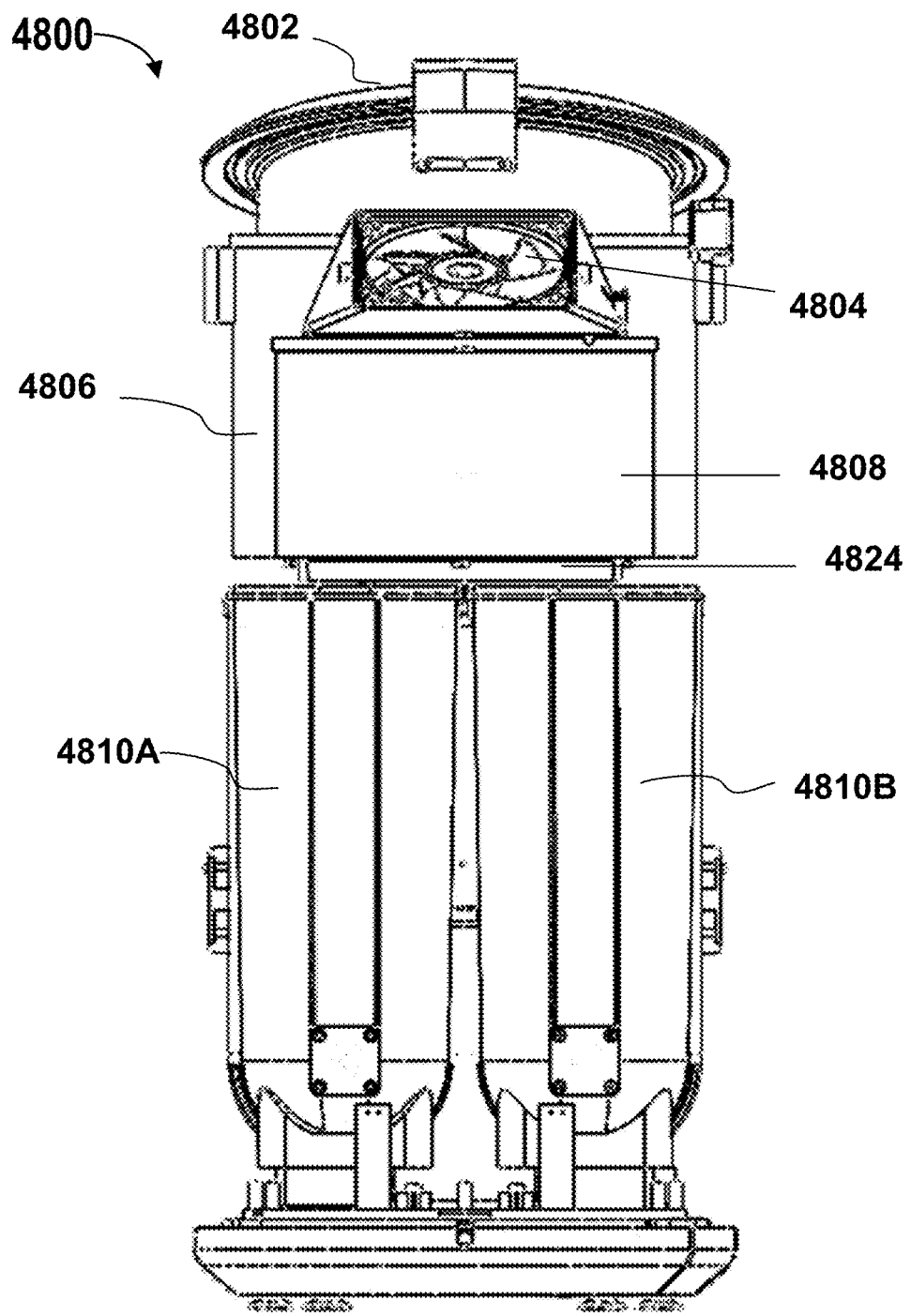
FIG. 51 is a rear view of the composting apparatus of FIG. 48 with the composter covering removed to show the dual chambers of the composting apparatus.

The solid diversion assembly 4824 comprises a dam assembly having a dam that is moveable between several positions such as a first position and a second position. The first position of the dam can cover the first compost chamber 4810A, and the second position of the dam can cover the second compost chamber 4810B. FIG. 51 provides a rear view of the composting apparatus of FIG. 48 with the composter cover removed to show the dual chambers of the composting apparatus. The dual compost chambers 4810A and 4810B and the solid diversion assembly 4824 can be seen from this view. The dam of the solid diversion assembly 4824 can cover the openings of the compost chambers 4810A and 4810B. As pre-treated compost from the hopper 4806 reaches a particular particle size, the particles can fall through the dam and into the respective appropriate chamber.

Figure 52:
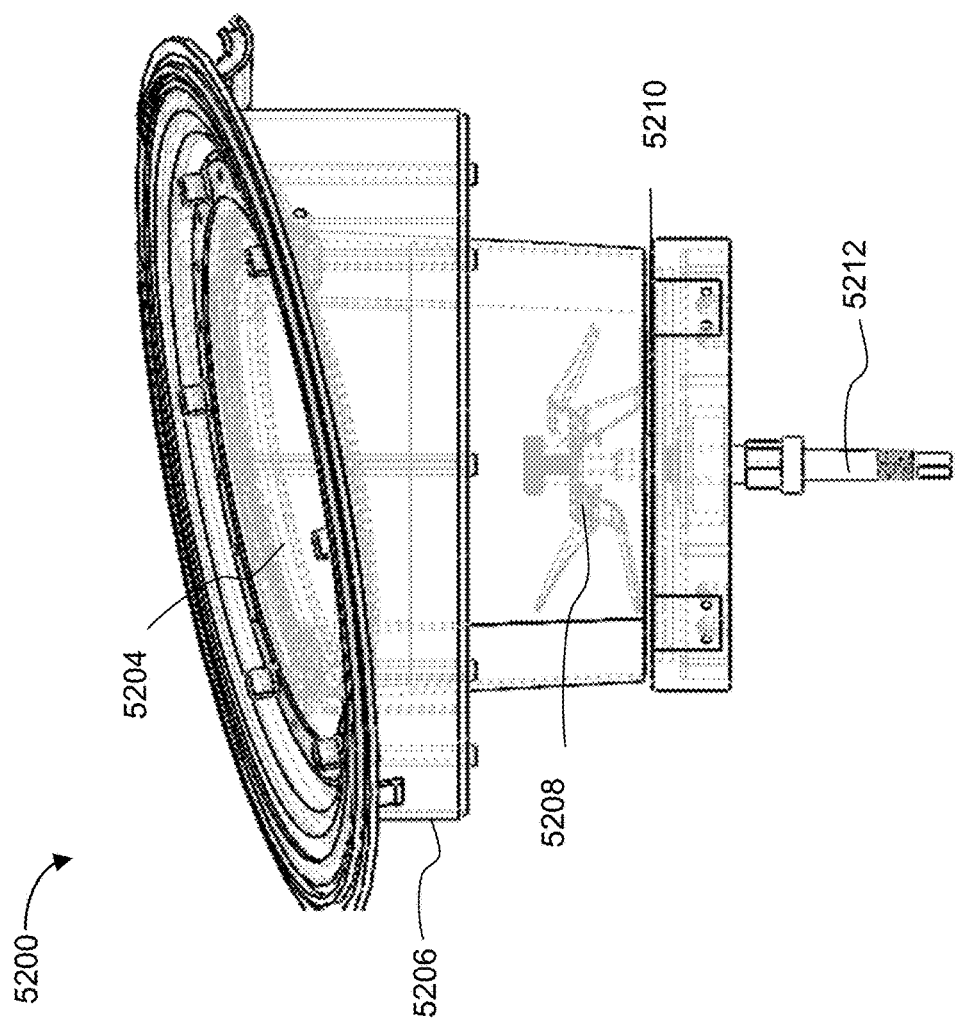
FIG. 52 is a side partially transparent view of the crushing assembly of the composting apparatus of FIG. 48 to show the inner crushing mechanism thereof.

Turning now to FIG. 52, provided therein is a partially transparent side view of the crushing assembly 5200 of the composting apparatus 4800 of FIG. 48. Food and organic waste can be input into the crushing assembly 5200 at 5204. As the untreated waste is input into the composting apparatus 4800, the crushing assembly 5200 crushes the input waste by cutting or chopping using choppers 5208. In one embodiment, the input waste can be chopped multiple times within a short period of time by a set of choppers 5208. Smaller-sized organic waste particles can be pushed out of the crushing assembly 5200 through the bottom plate 5210 and be automatically fed into the dewatering assembly, while larger-size organic waste particles can be re-circled within the crushing assembly 5200 until no large pieces remain in the crushing assembly 5200. Shaft 5212 can be used to position the crushing assembly 5200 to the main device body, as well as to provide power to the motor running the choppers 5208. The crushing assembly 5200 is also removeable as described by the method 4300 of FIG. 43. The crushing assembly 5200 can also be re-installed to the main device body as described by the method 4400 of FIG. 44.

In FIG. 52, the crushing assembly 5200 is shown in isolation, without the lid or the remaining composting device body. The crushing assembly 5200 can comprise a hopper 5206, a set of choppers 5208 located inside the hopper 5206, and a bottom plate 5210. The hopper 5206 can be a container with at least one opening on the top side for receiving input waste and at least one opening on the bottom side for outputting crushed waste particles.

The set of choppers can include one or more cutters, spinning blades and cutting discs, or any combinations thereof, as shown in FIG. 52. The choppers can be configured to chop, cut, mill or grind organic waste and split it into a plurality of pieces or bits. The choppers can also be configured to reduce the particle size of the pieces, or bits. The chopper set 3908 can be located at a bottom of the hopper 5206, in at least one embodiment and as shown in FIG. 52.

Figure 53:
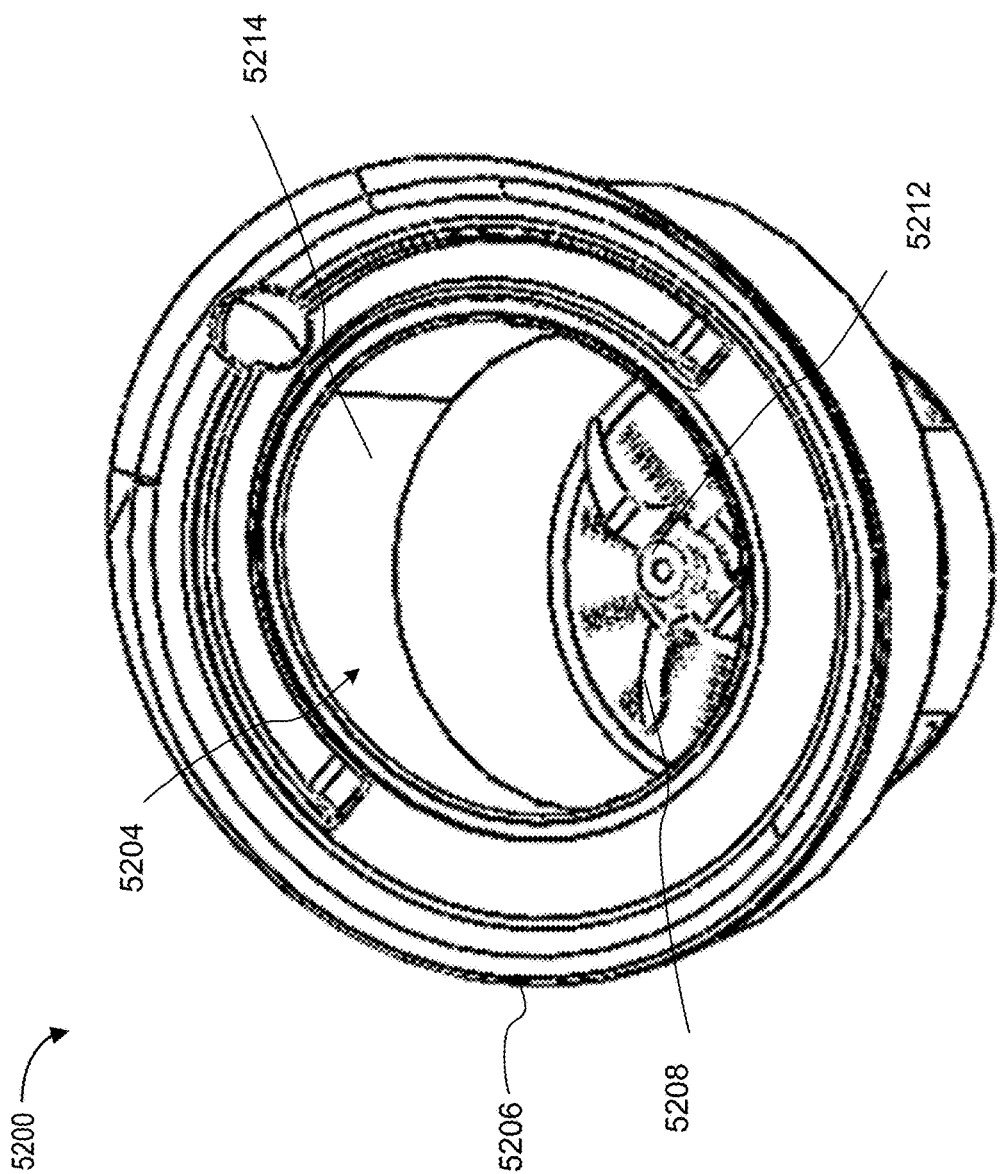
FIG. 53 is a top perspective view of the crushing assembly of the composting apparatus of FIG. 48, shown in isolation.

The crushing assembly 5200 may further comprise a bottom plate 5210 positioned under the hopper 5206. The bottom opening of the hopper 5206 is sealed with the bottom plate 5210, which can be controlled to prevent bits of organic waste from dropping and exit the crushing assembly before crushing is completed as described previously. The bottom plate 5210 may be designed to seal the bottom opening of the hopper. FIG. 53 provides a top perspective view of the crushing assembly 5200 of the composting apparatus 4800 of FIG. 48, shown in isolation. The crushing assembly 5200 includes the previously described elements of FIG. 52, as well as an inner wall of the crushing assembly 5214.

Figure 54:
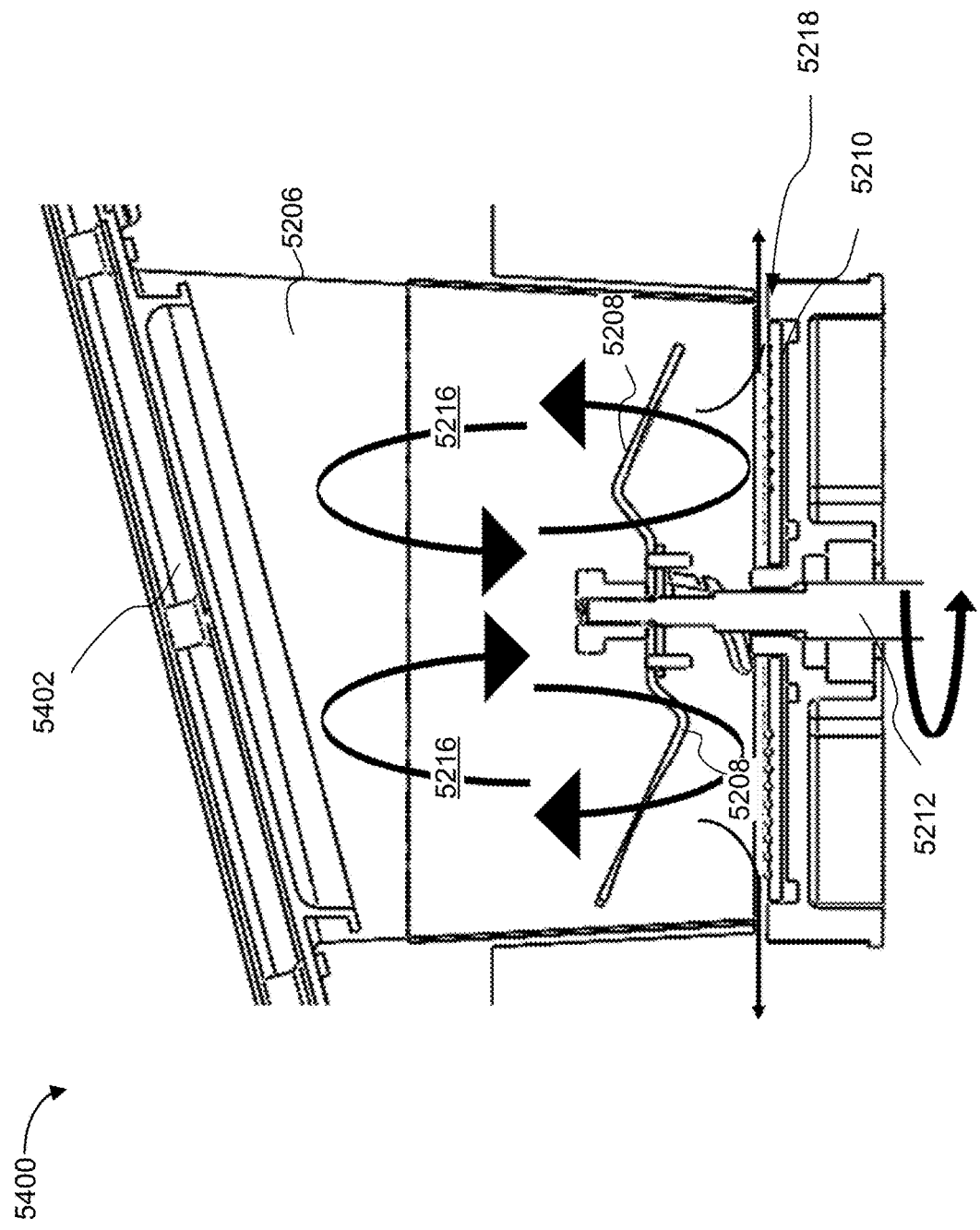
FIG. 54 is a side cross-sectional view of the crushing assembly of the composting apparatus of FIG. 48, according to an example embodiment.

FIG. 54 is a side cross-sectional view of the crushing assembly 5400 of the composting apparatus of FIG. 48, according to an example embodiment. The crushing assembly 5400 includes the crushing assembly 5200 previously described elements of FIGS. 52 and 53. The crushing assembly 5400 may further comprise a bottom plate 5210 positioned under, and sealing the bottom opening of the hopper 5206. The bottom plate 5210 may further comprise a mesh grating having a plurality of openings sized to allow small organic waste particles to fall through, and blocking larger sized particles to be recirculated 5216 in the hopper 5206.

The bottom plate 5210 may be designed to seal the bottom opening of the hopper. A gap 5218 may be formed between the bottom opening of the hopper 5206 and the bottom plate 5210. As such, the only exit from the hopper 5206 can be formed by the gap 5218 between the bottom opening of the hopper 5200 and the bottom plate 5210. The gap 5218 can allow small particles to escape, while preventing the large particles from escaping, thereby allowing the large particles to be recirculated within the hopper 5206, for example as shown by the arrows 5216. The small particles which escape through the gap between the hopper's bottom opening and the bottom plate can be automatically fed into the dewatering assembly.

Turning now to FIGS. 55A and 55B, which provide a front perspective view of the dewatering system 5500 of the composting apparatus of FIG. 48; and a top view of the dewatering system 5500 of the composting apparatus of FIG. 48, respectively. In this embodiment, the dewatering assembly 5500 is composed of two subsystems, including the filter mesh assembly 5504 and the mesh wiping assembly 5502. The filter mesh assembly 5504 can be a cylindrical drum with through holes 5508 located on the curved surface of the cylindrical drum. The mesh wiper assembly 5502 can include at least one wiper 5502, or optionally a plurality of wipers 5502A-5502D that are located in proximity to, or in contact with, the mesh assembly 5504. In this embodiment, the wiper assembly 5502 may comprise a set of wipers 4002A, 4002B, 4002C and 4002D, sized to fit within the cylindrical drum, and having a height corresponding to the height of the cylindrical drum to ensure any crushed food bits stuck to the inner wall of the filter mesh are being pushed away.

The filter mesh assembly 5504 and the mesh wiping assembly 5502 can be coupled to a motor which can be configured to rotate the assemblies. The filter mesh assembly 5504 and the mesh wiping assembly 5502 can rotate independently of one another, and their rotation axles can be aligned concentrically, as shown in FIG. 55. The filter mesh assembly 5504 can have a first angular velocity R1, and mesh wiping assembly 5502 can have a second angular velocity R2. At the dewatering stage, the mesh filter 5504 and the wiper assembly 5502 can rotate, for example at the same angular velocity as one another. In the dewatering stage, R1=R2. As a result, the crushed waste bits can become caught on the inner wall of the filter mesh assembly 5504 while the water content in the input will be pass through the holes of the filter mesh assembly 5504 and leave the dewatering system 5500. The longer the assemblies rotate along with the crushed waste bits, the more liquid can be filtered out, and the water content of the waste bits will be decreased over time.

In the cleaning phase, the filter mesh assembly 5504 and the wiper assembly 5502 can have different angular velocities, causing a relative movement between the two subsystems. In the cleaning stage, R1≠R2. As a result, any crushed bits that remain on the inner wall of the filter mesh assembly 5504, near 5508 can be wiped out. The pre-treated compost waste leaves the dewatering system in a designated channel and can be automatically fed into the next set of assemblies. Meanwhile, the filter mesh assembly 5504 is cleaned and is ready to dewater the next batch of crushed bits.

Figure 56B:
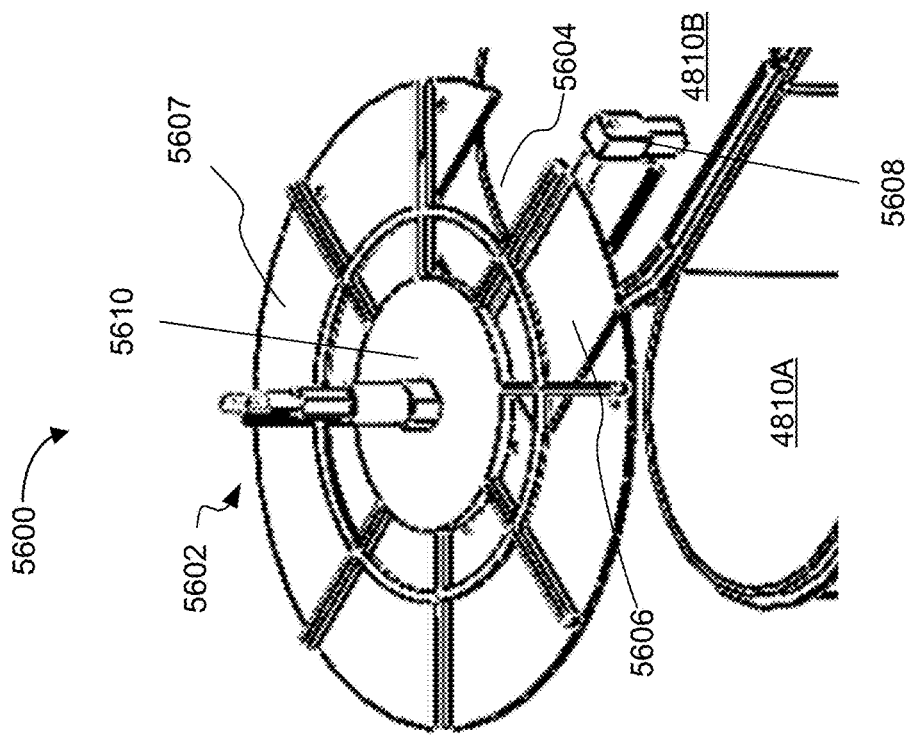
FIG. 56B is a front perspective view of the solid diversion assembly of the composting apparatus of FIG. 48.
Figure 56A:
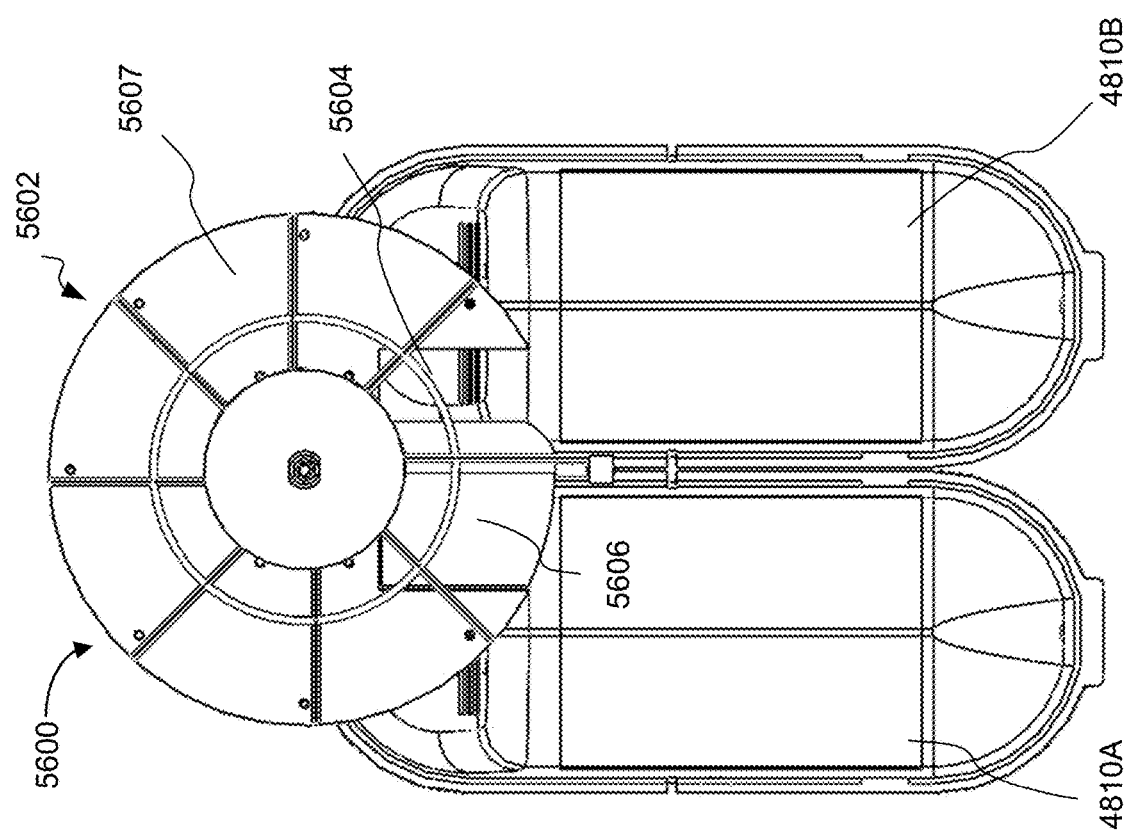
FIG. 56A is a top view of the solid diversion assembly of the composting apparatus of FIG. 48.

Turning now to FIG. 56A and FIG. 56B, provided therein is a top view of the solid diversion system 5600 of the composting apparatus of FIG. 48, and a front perspective view of the dam of the composting apparatus of FIG. 48, respectively. The solid diversion system 5600 comprises a dam 5602 that is moveable (e.g., rotatable) between a plurality of positions, or at least between a first position and a second position. The dam 5602 can comprise an open portion, or opening 5604, and a blocked portion, or blocking 5606. At the first position of the dam 5602, the blocking 5606 covers the first compost chamber 4810A, while the opening 5604 is positioned above the second compost chamber 4810B. The opening 5604 defines the path travelled by the pre-treated compost. The dam 5602 can be moveable, for example, by rotation between the first and second positions. In the second position, (not pictured) the blocking 5606 covers the second compost chamber 4810B, while the opening 5604 is positioned above the first compost chamber 4810A. This allows compost to flow into the chamber, which is under to the opening 5604, and blocking compost from entering the other chamber. A processor can be communicatively coupled to an actuator 5608 to actuate the dam 5602 between the plurality of positions. The dam 5602 can divert the flow into a second chamber 4810B directly, instead of having to pass through the first chamber 4810A, and vice versa, as the plurality of compost chambers can function as both as a pre-treatment chamber as well as a compost chamber, alternatingly, as explained for a previous embodiment. The solid diversion assembly 5600 can further comprise a dam wiper 5610. The dam wiper 5610 can be used to automatically feed the food waste into the designated compost chamber. As the waste leaves the previous system (such as the dewatering system), the food waste is dropped on the dam, and the dam wiper can be used to push all the food waste into the opening that is channeled to the compost chamber. The dam wiper 5610 can ensure complete transfer all of solids from the dam 5602 into the opening 5604.

Figure 57:
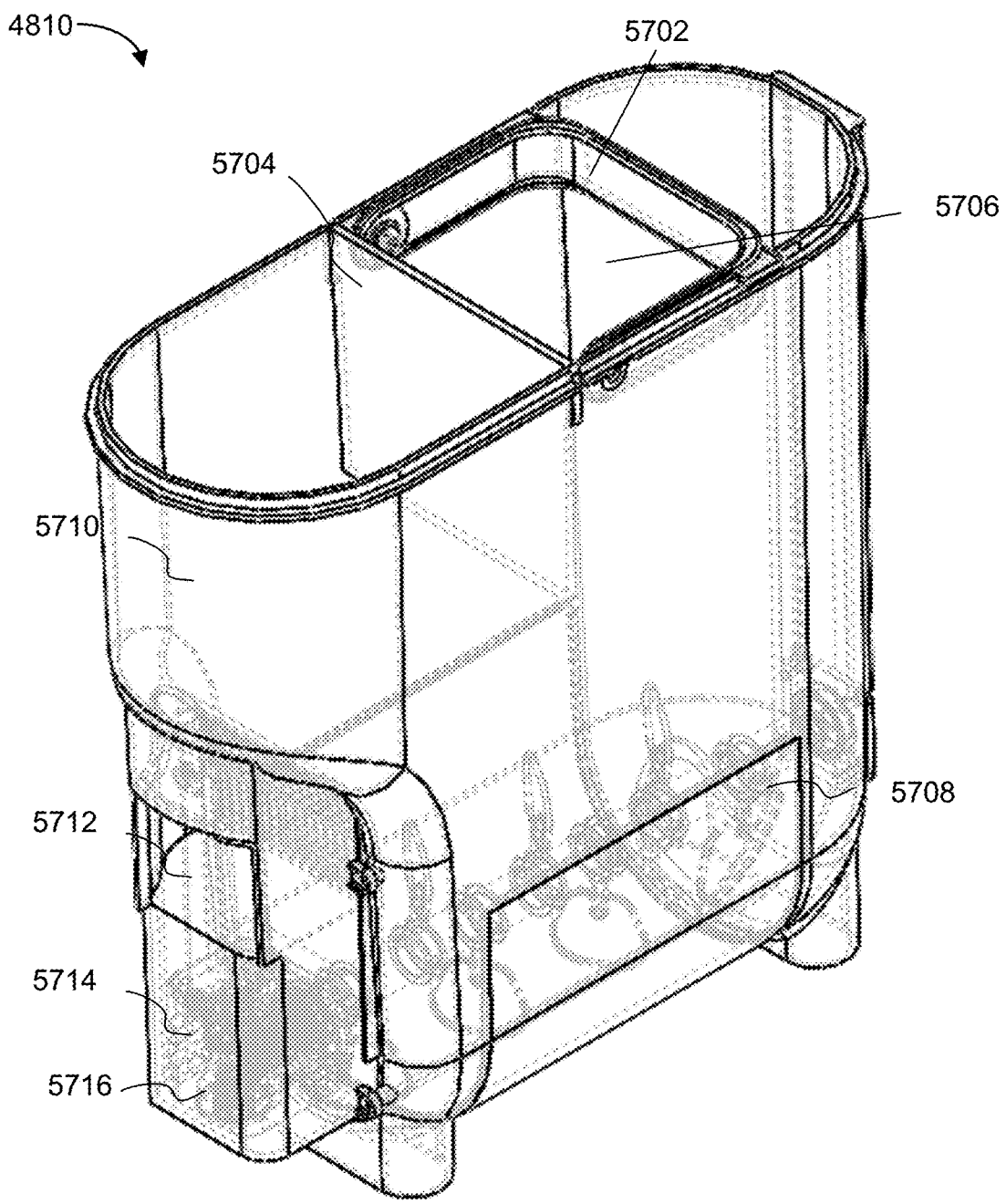
FIG. 57 is a rear perspective partially transparent view of the composting chamber of FIG. 48 to show the inner systems of the compost chamber.

Turning now to FIG. 57, provided therein is a rear perspective partially transparent view of the composting chamber 4810 of FIG. 48 to show some inner systems of the compost chamber of the composting apparatus 4800. The composting chamber 4810 can include a handle 5702, which may be optional in some cases, to easily remove and hold the composting chamber body 5710, an opening 5706 to access the composting chamber body 5710, a partition 5704 for guiding the air flow path, an air channel 5712 for receiving air into the compost chamber body 5710, a gear assembly 5714, and a coupler 5716 to mechanically couple a first portion of the gear assembly 5714 to a motor. The gear assembly 5714 has a second portion that is coupled to the mixer shaft in the compost chamber 4810. The other end of the mixing shaft is rotatably mounted to a wall portion of the chamber body 5710.

Figure 58:
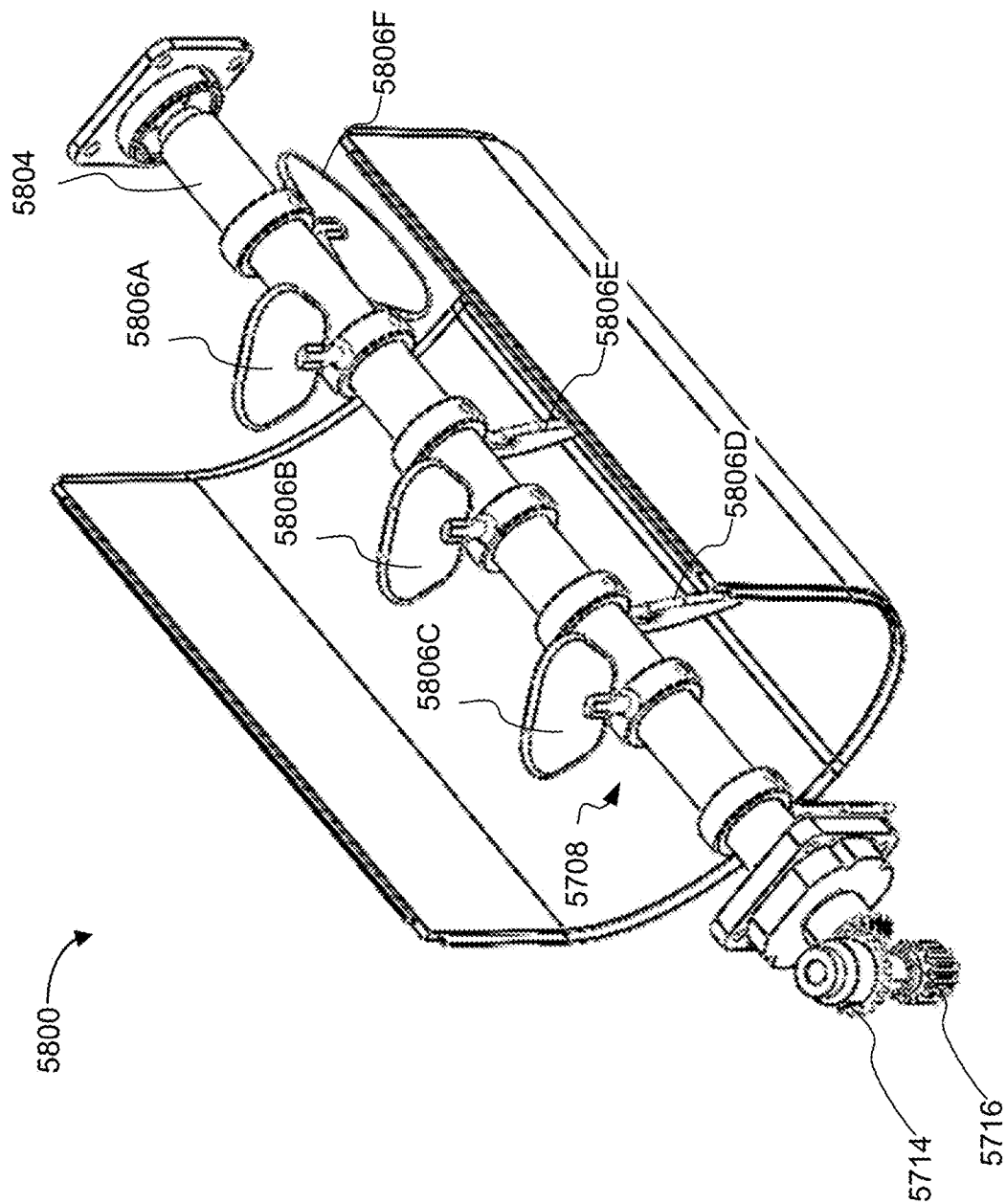
FIG. 58 is a top perspective view of the mixer assembly, according to an example embodiment.

Turning now to FIG. 58, provided therein is a top perspective view of the mixer assembly 5800, according to an example embodiment. The mixer assembly 5800 includes the mixer 5708, mixer shaft 5804, as well as the gear assembly 5714, and the coupler 5716 to mechanically couple the gear assembly 5714 to the motor. The gear assembly 5714 is also coupled to the mixer shaft 5804 through a gear interface. For example, the coupler 5716 can be a mechanical coupler with a mechanical adapter that has a toothed surface that engages with the gear assembly and can be used to transfer power from a motor to drive gear assembly 5714 which in turn drives the mixer shaft 5804. The mixer shaft 5804 may be connected to any driven mixer mechanism such as, but not limited to, one of an: impeller, pedal, auger, piston, blade, juicer, or any other crushing, grinding, mixing, transfer, or pulverizing mechanism. In one embodiment, as shown in FIGS. 57 and 58, the mixer mechanism can comprise a plurality of paddles 5806A-5806F for mixing the compost.

It should be understood that in various embodiments described herein, the removable chambers, which may be liquid or compost chambers, can be removed and inserted either from the front, side, or top of the composting apparatus.

Turning now to FIGS. 59A and 59B, provided therein is a block diagram of a muti-composting apparatus system/network which include two and three composting apparatuses, respectively; however, there may be embodiments in which more composting apparatuses are linked together. In such embodiments, a plurality of composting apparatuses are coupled or otherwise connected together to allow for the processing of larger amounts of compost. In at least one embodiment, and as shown in FIG. 59A, two composting apparatuses 5900A and 5900B are connected to one another. In at least one embodiment, and as shown in FIG. 59B, three composting apparatuses 5900A, 5900B, and 5900C are connected to one another. In at least one embodiment, the coupling may be physical such that the compost chambers are physically connected during operation to allow them to pass compost between themselves by using a screen, door and/or conduit (e.g., ese door 920 in FIG. 9 and FIG. 12). In this way, composting apparatuses that have more capacity may receive compost material from other compost apparatus allowing the workload to be spread out more optimally between the networked composting apparatuses. However, in an alternative embodiment, the coupling of the composting apparatus is through a communication link such that the compost apparatuses are networked together and can be monitored such that the different compost stages for the different composting apparatuses can be tracked and it can be determined composting apparatus have capacity to accept new waste and which composing apparatuses are getting to the end of the compost process so that the mature compost in those composting apparatuses can be removed and new waste added to them. Again, this results in a more optimal distribution of waste material among a networking of composting apparatuses allowing for more efficient composting.

In at least one embodiment, the composting apparatus described may be implemented to have various form-factors to accommodate different user needs. For example, the composting apparatus can be a stand-alone unit that may be placed in a pull-out cabinet, under the sink, on a counter-top or on the floor. For the under-sink embodiment, the composting apparatus may be optionally connected directly to the sink or to the drainage pipe inside the sink cabinet. Accordingly, in at least one embodiment, the adaptors 402 may include, but are not limited to, drain connectors, sink connectors, and/or dishwashing connectors and the adaptors 402 may have electrical connectors (e.g., wires) for connection to the power source of the dishwasher.

In another aspect, the composting apparatuses and methods described in accordance with the teachings herein may be used in food-preparation environments such as coffee shops and/or juice shops. In such cases, some of the pre-treating steps are typically already performed before waste, such as coffee grounds, are provided to the composting apparatus. In these cases, such waste can be provided directly to the compost chamber, as described previously. In this case, the input chamber of the composting apparatus may be connected to the waste output of a commercial coffee machine or a juicing machine via existing external fluidic couplers such as a ground waste output of a coffee machine or a pulp waste output of a juicer, or the composting apparatus may include a hopper that can be accessed by users who may transfer coffee grounds from coffee machines or waste from a juicing machine into the composting apparatus. In both cases, the pre-treatment process may be skipped, since the input waste is already pretreated, and the composting process may start with aeration, mixing, and optional heating and water spraying. To collect the output compost, depending on the embodiment, users may scoop the output compost out of the composting apparatus, remove the compost chamber as if it was a drawer, or, if the compost is transferred into a compost storage chamber that is removeable, pull out the compost storage chamber. Also, in such cases the composting apparatus may be coupled to existing external electrical connectors of the food-preparation environment.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A method of producing compost, wherein the method comprises:
   collecting a first portion of waste in a composting apparatus, the composting apparatus comprising:
   a main device body;
   control and power electronics including a processor and memory;

a first compost chamber cavity located within the main device body;
a first compost chamber for performing composting of waste, the first compost chamber being located in the first compost chamber cavity,
a second compost chamber cavity located within the main device body, adjacent to the first compost chamber cavity; and
a second compost chamber for performing composting of waste, the second compost chamber being located in the second compost chamber cavity;

processing the first portion of waste in the composting apparatus;
transferring the first portion of waste into the first compost chamber located within the composting apparatus;
pre-treating the first portion of waste to produce a first portion of pre-treated waste;
composting the first portion of pre-treated waste in the first compost chamber to produce a first batch of output compost;
collecting a second portion of waste in the composting apparatus;
processing the second portion of waste in the composting apparatus;
transferring the second portion of waste into the second compost chamber located within the composting apparatus;
pre-treating the second portion of waste to produce a second portion of pre-treated waste; and
composting the second portion of pre-treated waste in the second compost chamber to produce a second batch of output compost;
wherein collecting the second portion of waste in the composting apparatus occurs once the first compost chamber is filled or occurs according to an offset cycle.

2. A method of producing compost, wherein the method comprises:
receiving a first amount of waste in a composting apparatus, the composting apparatus comprising:
a main device body;
control and power electronics including a processor and memory;
a first compost chamber cavity located within the main device body;
a first compost chamber for performing composting of waste, the first compost chamber being located in the first compost chamber cavity,
a second compost chamber cavity located within the main device body, adjacent to the first compost chamber cavity; and
a second compost chamber for performing composting of waste, the second compost chamber being located in the second compost chamber cavity;
pre-treating the first amount of waste to produce a first amount of pre-treated waste;
storing the first amount of pre-treated waste into a first storage chamber for a pretreatment time period to produce a first amount of stored waste;
composting the first amount of stored waste in the first compost chamber to produce a first batch of output compost;
subsequently receiving a second amount of waste in the composting apparatus;
pre-treating the second amount of waste to produce a second amount of pre-treated waste;
storing the second amount of pre-treated waste into a second storage chamber for a pretreatment time period to produce a second amount of stored waste; and
composting the second amount of stored waste in the second compost chamber to produce a second batch of output compost;
wherein a processor determines if the first amount of pre-treated waste should instead enter the second storage chamber if the first storage chamber meets a specified criteria; and
wherein the processor determines if the second amount of pre-treated waste should instead enter the first storage chamber if the second storage chamber meets a specified criteria.

3. The method of claim 2, wherein the specified criteria comprise the storage chamber being full or based on a count-down timer.

4. The method of claim 2, wherein the pre-treating step comprises:
separating the waste into solid waste and liquid waste;
reducing a volume of the solid waste; and/or
drying the reduced volume of solid waste or performing dewatering on the volume of solid waste.

5. The method of claim 4, wherein reducing the volume of solid waste comprises: crushing, milling, grinding, or mulching the volume of solid waste to reduce individual particle size in the volume of solid waste.

6. The method of claim 4, wherein drying the volume of solid waste comprises heating and/or aerating the volume of solid waste to reduce moisture content.

7. The method of claim 4, wherein liquid waste is obtained by performing the dewatering which includes mechanically removing liquid from the waste via pressing, tumbling, or centrifugation.

8. The method of claim 2, wherein composting the stored waste comprises using naturally occurring microbes and/or introducing microbes into the first and second compost chamber and producing one or more conditions to increase an activity of the microbes for performing an aerobic decomposition process on the waste within the first and second compost chambers.

9. The method of claim 2, wherein the method further comprises: maintaining appropriate airflow through the waste in the first and second compost chambers and using a mixer to mix the waste in the first and second compost chambers.

10. The method of claim 2, wherein the method comprises removing the first compost chamber for retrieving the output compost and reinserting the first compost chamber, while the second compost chamber continues composting.

11. A composting apparatus comprising:
a main device body;
control and power electronics including a processor and memory;
a first compost chamber cavity located within the main device body;
a first compost chamber for performing composting of waste, the first compost chamber being located in the first compost chamber cavity,
a second compost chamber cavity located within the main device body, adjacent to the first compost chamber cavity; and
a second compost chamber for performing composting of waste, the second compost chamber being located in the second compost chamber cavity.

12. The composting apparatus of claim 11, wherein the composting apparatus further comprises a dam moveable between first and second positions, wherein when the dam is in the first position, the dam only covers one of the compost chambers and when the dam is in the second position, the dam only covers another of the compost chambers.

13. The composting apparatus of claim 12, wherein the processor is configured to perform a method of producing compost when software instructions stored in the memory are executed by the processor; and wherein one of both compost chambers are adapted to provide composting at a same of offset cycle.

14. The composting apparatus of claim 11, wherein the main device body further comprises a folding mesh strainer that is configured to separate liquid waste from solid waste, the folding strainer having perforations;
   wherein the folding mesh strainer comprises an open state for receiving food waste; and a closed state for collecting solid waste while the liquid waste is expelled from the perforations.

15. The composting apparatus of claim 14, wherein the liquid waste expelled from the perforations collects in a liquid chamber for storage until disposal.

16. The composting apparatus of claim 11, wherein the composting apparatus comprises a plurality of ultraviolet light sources for destruction of odors and control of undesired organisms.

17. The composting apparatus of claim 16, wherein at least a first light source of the plurality of ultraviolet light sources is configured to operate at between about 100 nm and about 240 nm wavelength for generating ozone for destruction of odors.

18. The composting apparatus of claim 16, wherein at least a second light source of the plurality of ultraviolet light sources is configured to operate between about 240 nm and about 315 nm wavelength to control growth of undesired organisms and destroy ozone.

19. The composting apparatus of claim 16, wherein the generated ozone is delivered to the first and second compost chambers for reducing odors in the first and second compost chambers by exposing the odors to the generated ozone.

20. The composting apparatus of claim 16, wherein the composting apparatus further comprises an active carbon filter for filtering volatile compounds and gases left from the destruction of the ozone.

21. The composting apparatus of claim 11, wherein the composting apparatus is further configured to provide a positive airflow through the waste in the compost chamber for preventing odors from escaping outside of the composting apparatus.

22. The composting apparatus of claim 11, wherein the composting chambers are insertable and removable horizontally, vertically or from the side of the composting apparatus.

23. The composting apparatus of claim 11, wherein the composting apparatus further comprises a liquid chamber that is insertable and removable horizontally, vertically or from the side of the composting apparatus.

24. The composting apparatus of claim 11, wherein the composting apparatus further comprises temperature sensors and a temperature control loop is used during composting sequences for maintaining a desired temperature in the compost chambers to improve quality of the compost.

25. The composting apparatus of claim 11, wherein a given compost chamber includes microbes and the given compost chamber is adapted to receive hot air for providing oxygen for aerobic decomposition process of the waste in the given compost chamber and the given compost chamber is adapted to receive water or mist to maintain a desirable moisture content level of the waste.

26. The composting apparatus of claim 11, wherein a given compost chamber includes a mixer that is configured to mix the waste therein to improve airflow though the waste to improve composting.

27. The composting apparatus of claim 11, wherein the composting apparatus includes an inlet fan for receiving ambient air within the apparatus and an exhaust fan for generating positive air flow out of the composting apparatus to the ambient environment, and at least one sensor, wherein the processor turns on the exhaust fan when a physical condition is detecting using the at least one sensor.

* * * * *